(12) United States Patent
Van Berkel et al.

(10) Patent No.: US 10,374,254 B2
(45) Date of Patent: Aug. 6, 2019

(54) COMPOSITE ELECTROLYTES

(71) Applicant: QuantumScape Corporation, San Jose, CA (US)

(72) Inventors: Kim Van Berkel, San Jose, CA (US); Tim Holme, San Jose, CA (US); Mohit Singh, San Jose, CA (US); Amal Mehrotra, San Jose, CA (US); Zhebo Chen, San Jose, CA (US); Kian Kerman, San Jose, CA (US); Wes Hermann, San Jose, CA (US); William Hudson, San Jose, CA (US)

(73) Assignee: QuantumScape Corporation, San Jose, CA (US)

( * ) Notice: Subject to any disclaimer, the term of this patent is extended or adjusted under 35 U.S.C. 154(b) by 126 days.

(21) Appl. No.: 15/192,960

(22) Filed: Jun. 24, 2016

(65) Prior Publication Data
US 2017/0005367 A1 Jan. 5, 2017

Related U.S. Application Data

(60) Provisional application No. 62/184,028, filed on Jun. 24, 2015, provisional application No. 62/240,576, filed on Oct. 13, 2015.

(51) Int. Cl.
*H01M 10/0565* (2010.01)
*H01M 10/052* (2010.01)
(Continued)

(52) U.S. Cl.
CPC ........ *H01M 10/0565* (2013.01); *H01G 11/06* (2013.01); *H01G 11/56* (2013.01);
(Continued)

(58) Field of Classification Search
CPC .......... H01M 10/0565; H01M 10/052; H01M 10/0562; H01M 2300/0068;
(Continued)

(56) References Cited

U.S. PATENT DOCUMENTS 4,183,988 A * 1/1980 Farrington .............. H01M 2/14
252/519.33
4,357,401 A * 11/1982 Andre .................... H01B 1/122
429/199
(Continued)

FOREIGN PATENT DOCUMENTS

DE 19825807 A1 12/1998
EP 0 977 296 A1 2/2000
(Continued)

OTHER PUBLICATIONS

Aetukuri, Nagaphani B. et al., "Flexible Ion-Conducting Composite Membranes for Lithium Batteries," Adv. Energy Mater., 2015, 1500265, 6 pages.
(Continued)

*Primary Examiner* — Gregg Cantelmo
(74) *Attorney, Agent, or Firm* — Squire Patton Boggs (US) LLP

(57) ABSTRACT

Set forth herein are electrolyte compositions that include both organic and inorganic constituent components and which are suitable for use in rechargeable batteries. Also set forth herein are methods and systems for making and using these composite electrolytes.

48 Claims, 45 Drawing Sheets

US 10,374,254 B2
Page 2

(51) Int. Cl.
- *H01M 10/0562* (2010.01)
- *H01G 11/56* (2013.01)
- *H01M 6/18* (2006.01)
- *H01G 11/06* (2013.01)

(52) U.S. Cl.
CPC .......... *H01M 6/181* (2013.01); *H01M 6/185* (2013.01); *H01M 10/052* (2013.01); *H01M 10/0562* (2013.01); *H01M 2300/0068* (2013.01); *H01M 2300/0082* (2013.01); *H01M 2300/0091* (2013.01); *Y02T 10/7011* (2013.01)

(58) Field of Classification Search
CPC ......... H01M 2300/0082; H01M 6/181; H01M 6/185; Y02T 10/7011; H01G 11/06; H01G 11/56
See application file for complete search history.

(56) References Cited

U.S. PATENT DOCUMENTS

| | | | |
|---|---|---|---|
| 4,654,279 A * | 3/1987 | Bauer | H01M 6/181 252/62.2 |
| 4,668,736 A * | 5/1987 | Robins | C08G 59/68 525/65 |
| 4,868,262 A * | 9/1989 | Esselborn | C08F 216/1416 526/273 |
| 4,990,413 A * | 2/1991 | Lee | H01G 9/025 252/62.2 |
| 4,990,587 A * | 2/1991 | Shaw | C08G 59/18 525/113 |
| 5,202,009 A * | 4/1993 | Andrieu | C08L 63/00 204/296 |
| 5,449,576 A | 9/1995 | Anani | |
| 6,030,720 A | 2/2000 | Chu et al. | |
| 6,066,417 A | 5/2000 | Cho et al. | |
| 6,200,707 B1 * | 3/2001 | Takada | H01M 4/621 429/212 |
| 6,210,836 B1 | 4/2001 | Takada et al. | |
| 6,277,524 B1 | 8/2001 | Kanno | |
| 6,365,300 B1 | 4/2002 | Ota et al. | |
| 6,656,641 B1 | 12/2003 | Kumar | |
| 1,930,706 A1 | 6/2008 | Yong et al. | |
| 7,416,815 B2 | 8/2008 | Ota et al. | |
| 7,901,598 B2 | 3/2011 | Ota | |
| 7,915,378 B2 * | 3/2011 | Nishio | C08G 65/12 429/312 |
| 8,524,393 B2 | 9/2013 | Kojima | |
| 8,729,866 B2 | 5/2014 | Tamane et al. | |
| 8,871,391 B2 | 10/2014 | Liang et al. | |
| 9,172,112 B2 | 10/2015 | Hama et al. | |
| 2003/0031931 A1 | 2/2003 | Obrovac et al. | |
| 2003/0157409 A1 | 8/2003 | Huang | |
| 2004/0096747 A1 | 5/2004 | Schwake | |
| 2005/0026037 A1 | 2/2005 | Riley et al. | |
| 2006/0068296 A1 * | 3/2006 | Nakagawa | H01M 4/133 429/324 |
| 2006/0166003 A1 * | 7/2006 | Khabashesku | B82Y 30/00 428/413 |
| 2006/0216603 A1 | 9/2006 | Choi | |
| 2006/0246355 A1 | 11/2006 | Min et al. | |
| 2007/0117026 A1 | 5/2007 | Kumar et al. | |
| 2007/0160911 A1 | 7/2007 | Senga et al. | |
| 2007/0172739 A1 | 7/2007 | Visco et al. | |
| 2008/0200589 A1 * | 8/2008 | Hubschmid | C08L 53/00 523/436 |
| 2009/0136830 A1 * | 5/2009 | Gordon | H01M 10/052 429/50 |
| 2009/0182066 A1 | 7/2009 | Yang | |
| 2009/0208806 A1 | 8/2009 | Izuhara et al. | |
| 2009/0226816 A1 | 9/2009 | Yoshida et al. | |
| 2010/0019194 A1 | 1/2010 | Fujiwara et al. | |
| 2010/0028768 A1 | 2/2010 | Morita et al. | |
| 2010/0151335 A1 * | 6/2010 | Senga | H01B 1/122 429/322 |
| 2010/0183924 A1 | 7/2010 | Song et al. | |
| 2011/0076570 A1 | 3/2011 | Hama et al. | |
| 2011/0229765 A1 | 9/2011 | Barker et al. | |
| 2011/0259505 A1 | 10/2011 | Lee et al. | |
| 2011/0262816 A1 | 10/2011 | Amatucci | |
| 2011/0311875 A1 | 12/2011 | Lee et al. | |
| 2012/0094185 A1 | 4/2012 | Tsuchida et al. | |
| 2012/0115763 A1 * | 5/2012 | Patil | C08G 65/20 508/556 |
| 2012/0196186 A1 | 8/2012 | Richard | |
| 2012/0208062 A1 | 8/2012 | Zhou et al. | |
| 2012/0244411 A1 | 9/2012 | Takamori et al. | |
| 2012/0276459 A1 | 11/2012 | Im et al. | |
| 2013/0004843 A1 | 1/2013 | Suzuki et al. | |
| 2013/0040208 A1 | 2/2013 | Kanno et al. | |
| 2013/0052509 A1 * | 2/2013 | Halalay | H01M 2/145 429/129 |
| 2013/0095358 A1 * | 4/2013 | Schubert | H01M 2/1686 429/94 |
| 2013/0108934 A1 * | 5/2013 | Lee | H01M 10/052 429/405 |
| 2013/0216910 A1 | 8/2013 | Obrovac | |
| 2013/0230778 A1 * | 9/2013 | Saimen | H01M 10/056 429/303 |
| 2014/0023940 A1 * | 1/2014 | Zaghib | H01M 4/134 429/405 |
| 2014/0065513 A1 * | 3/2014 | Badding | C25B 13/04 429/492 |
| 2014/0093785 A1 * | 4/2014 | Sugiura | H01M 10/0562 429/315 |
| 2014/0141341 A1 | 5/2014 | Ohtomo et al. | |
| 2014/0170504 A1 | 6/2014 | Baek et al. | |
| 2014/0193693 A1 | 7/2014 | Hoshina et al. | |
| 2014/0193695 A1 | 7/2014 | Hoshina et al. | |
| 2014/0197800 A1 | 7/2014 | Nagase et al. | |
| 2014/0363745 A1 | 12/2014 | Hirayama | |
| 2015/0017548 A1 | 1/2015 | Kato et al. | |
| 2015/0037687 A1 | 2/2015 | Kanno | |
| 2015/0056496 A1 | 2/2015 | Liang et al. | |
| 2015/0118574 A1 | 4/2015 | Visbal et al. | |
| 2015/0287986 A1 | 10/2015 | Affinito et al. | |
| 2016/0156065 A1 | 6/2016 | Visco et al. | |
| 2016/0164136 A1 | 6/2016 | Higuchi et al. | |
| 2016/0181585 A1 | 6/2016 | Choi et al. | |
| 2016/0190638 A1 | 6/2016 | Sugiura et al. | |
| 2016/0190640 A1 | 6/2016 | Visco et al. | |

FOREIGN PATENT DOCUMENTS

| | | | |
|---|---|---|---|
| JP | S57 108831 | 7/1982 | |
| JP | 2001-316583 | 11/2001 | |
| JP | 2007-273214 A | 10/2007 | |
| JP | 2007-273217 | 10/2007 | |
| JP | 2009-176541 A | 8/2009 | |
| JP | 2011-44249 | 3/2011 | |
| JP | 2012-54212 | 3/2012 | |
| JP | 2013-12416 A | 1/2013 | |
| JP | 2013-045683 | 3/2013 | |
| JP | 2013-80616 A | 5/2013 | |
| JP | 2014-241240 | 12/2014 | |
| KR | 2014-0095658 | 8/2014 | |
| WO | WO 2012/156795 A1 | 11/2012 | |
| WO | WO 2012/156795 A8 | 11/2012 | |
| WO | WO-2013158910 A2 * | 10/2013 | ............ C08L 63/00 |

OTHER PUBLICATIONS

Anonymous, "A Binding Matter," Ceramic Industry Magazine, Oct. 1, 2001, 6 pages; website: http://www.ceramicindustry.com/articles/82746-a-binding-matter.

Blanga, R. et al., "The search for a solid electrolyte, as a polysulfide barrier, for lithium/sulfur batteries," J Solid State Electrochem, Jul. 2016, 12 pages.

Boyle, Maureen A. et al., "Epoxy Resins," ASM Handbook vol. 21, Composites, 2001, pp. 79-89.

(56) References Cited

OTHER PUBLICATIONS

Camino, G. et al. "Polydimethylsiloxane thermal degradation Part 1. Kinetic aspects," Polymer, vol. 42, Issue 6, Mar. 2001, pp. 2395-2402.
Chen, Bo et al., "A new composite solid electrolyte $PEO/L_{10}GeP_2S_{12}/SN$ for all-solid-state lithium battery," Electrochimica Acta, 210, 2016, pp. 905-914.
Chen, M.-H., "Update on Dental Nanocomposites," J Dent Res, 2010, 89(6), pp. 549-560.
Cramer, N.B. et al., "Recent Advances and Developments in Composite Dental Restorative Materials," J Dent Res, 2011, 90(4), pp. 402-416.
Croce, F. et al., "Physical and Chemical Properties of Nanocomposite Polymer Electrolytes," J. Phys. Chem. B, 1999, 103, pp. 10632-10638.
Fu, Kun (Kelvin) et al., "Flexible, solid-state, ion-conducting membrane with 3D garnet nanofiber networks for lithium batteries," PNAS, vol. 113, No. 26, 2016, pp. 7094-7099.
Goodman, Sidney H., "Epoxy Resins," Handbook of Thermoset Plastics, 1999, pp. 193-268.
Inada, Taro et al., "Fabrications and properties of composite solid-state electrolytes," Solid State Ionics, 158, 2003, pp. 275-280.
Inada, Taro et al., "Silicone as a binder in composite electrolytes," Journal of Power Sources, 119-121, 2003, pp. 948-950.
International Search Report and Written Opinion of PCT/US2016/039424 dated Nov. 3, 2016; 15 pages.
Kumar, Binod et al., "Composite Electrolytes for Lithium Rechargeahle Batteries," Journal of Electroceramics, 2000, 5:2, pp. 127-139.
Langer, Frederieke et al., "Microstructure and temperature dependent lithium ion transport of ceramic-polymer composite electrolyte for solid-state lithium ion batteries based on garnet-type $Li_7La_3Zr_2O_{12}$," Solid State Ionics, 291, 2016, pp. 8-13.
Li, Qin et al., "Atomistic investigation of the nanoparticle size and shape effects on ionic conductivity of solid polymer electrolytes," Solid State Ionics, 268, 2014, pp. 156-161.
Lim, Young Jun et al., "Ceramic-Based Composite Solid Electrolyte for Lithium-Ion Batteries," 2015, 80, pp. 1100-1103.
Liu, Wei et al., "Ionic Conductivity Enhancement of Polymer Electrolytes with Ceramic Nanowire Fillers," Nano Lett., 2015, 15 (4), pp. 2740-2745.
Nairn, K. et al., "Ceramic-polymer interface in composite electrolytes of lithium aluminium titanium phosphate and polyetherurethane polymer electrolyte," Solid State Ionics, 121, 1999, pp. 115-119.
Nairn, K. et al., "Polymer-ceramic ion-conducting composites," Solid State Ionics, 86-88, 1996, pp. 589-593.
Nam, Young Jin et al., "Bendable and Thin Sulfide Solid Electrolyte Film: A New Electrolyte Opportunity for Free Standing and Stackable High-Energy All-Solid-State Lithium-Ion Batteries," Nano Lett., 2015, 15 (5), pp. 3317-3323.
Nam, Young Jin et al., *Supporting Information* "Bendable and Thin Sulfide Solid Electrolyte Film: A New Electrolyte Opportunity for Free Standing and Stackable High-Energy All-Solid-State Lithium-Ion Batteries," Nano Lett., 2015, 15 (5), pp. 3317-3323.
Peutzfeldt, Anne et al., "Resin composites in dentistry: the monomer systems," Eur J Oral Sci, 1997, 105, pp. 97-116.
Pham, Ha Q. et al., "Epoxy Resins," Ullmann's Encylclopedia of Industrial Chemistry, vol. 13, 2012, Wiley-VCH Verlag GmbH & Co. KGaA, Weinheim, pp. 155-244.
Shafizadeh, F. et al. "Thermal degradation of cellulose in air and nitrogen at low temperatures," Journal of Applied Polymern Science, vol. 23, Issue 5, Mar. 1, 1979, pp. 1431-1442.
Skaarup, Steen et al., "Mixed Phase Solid Electrolytes With Non-conducting Polymer Binder," Solid State Ionics, 1990, 40/41, pp. 1021-1102.
Skaarup, Steen et al., "Mixed Phase Solid Electrolytes," Solid State Ionics, 1988, 28-30, pp. 975-978.
Skelhorn, David, "Particulate Fillers in Elastomers," Particulate-filled polymer composites, $2^{nd}$ Edition, Shawbury : Rapra Technology Limited, 2003, pp. 303-356.
Thokchom, Joykumar S. et al., "Ionically Conducting Composite Membranes from the $Li_2O$—$Al_2O_3$—$TiO_2$—$P_2O_5$Glass-Ceramic," J. Am. Ceram. Soc., 90 [2], 2007, pp. 462-466.
Villaluenga, Irune et al., "Compliant glass-polymer hybrid single ion-conducting electrolytes for lithium batteries," PNAS, Jan. 5, 2016, vol. 113, No. 1, pp. 52-57.
Wall, L.A. et al., "The Depolymerization of Polymethylene and Polyethylene," J. Am. Chem. Soc., 1954, 76 (13), pp. 3430-3437.
Wang, Yan-Jie et al., "Characterization of [Poly(ethylene oxide)] LiClO—$Li_{1.3}Al_{0.3}Ti_{1.7}(PO_4)_3$ Composite Polymer Electrolytes with Poly(ethylene oxide)s of Different Molecular Weights," Journal of Applied Polymer Science, vol. 102, 2006, pp. 1328-1334.
Westerhout, R. W. J. et al., "Kinetics of the Low-Temperature Pyrolysis of Polyethene, Polypropene, and Polystyrene Modeling, Experimental Determination, and Comparison with Literature Models and Data," Ind. Eng. Chem. Res., 1997, 36 (6), pp. 1955-1964.
Wieczorek, Wtadystaw et al., "Composite Polymeric Electrolytes," Electronic Materials: Science and Technology, 2008, vol. 10, pp. 1-70.
Wright, Charles D., "Epoxy Structural Adhesives," Structural Adhesives: Chemistry and Technology, Springer Science & Business Media, Dec. 6, 2012, pp. 113-179.
Zhang, Hanjun (Henry) et al., "Preparation and characterization of composite electrolytes based on PEO(375)-grafted fumed silica," Solid State Ionics 178, 2008, pp. 1975-1983.
International Search Report and Written Opinion of PCT/US2014/038283 dated Nov. 17, 2014, 17 pages.
International Search Report and Written Opinion of PCT/US2016/064492 dated Feb. 7, 2017, 13 pages.
International Search Report and Written Opinion of PCT/US2017/049218 dated Jan. 4, 2018, 15 pages.
Adams and Rao, "Structural requirements for fast lithium ion migration in $Li_{10}GeP_2S_{12}$," J. Mater. Chem., 2012, DOI: 10.1039/c2jm16688g, 5 pages.
Amaresh et al., "Aluminum based sulfide solid lithium ionic conductors for all solid state batteries," Nanoscale, 2014, vol. 6, pp. 6661-6667.
Eckert et al., "Structural Transformation of Non-Oxide Chalcogenide Glasses. The Short-Range Order of $Li_2S$—$P_2S_5$Glasses Studied by Quantitative $31^P$ and $^{6,7}Li$ High-Resolution Solid-State NMR," Chem. Mater., 1990, vol. 2, pp. 273-279.
Hayashi, Akitoshi, et al., "Formation of superionic crystals from mechanically milled $Li_2S$—$P_2S_5$ glasses", Electrochemistry Communications, 2003, vol. 5, pp. 111-114.
Hirai, Koichi, et al., "Thermal and electrical properties of rapidly quenched glasses in the systems $LI_2S$—$SiS_2$—$Li_xMO_y$ ($Li_xMO_y$=$Li_xSiO_4$, $Li_2SO_4$)", Solid State Ionics, 1995, vol. 78, pp. 269-273.
Kanno, Ryoji, "Lithium Ionic Conductor Thio-LISICON, the $Li_2S$—$GeS_2$—$P_2S_5$ System", Journal of the Electrochemical Society, 2001, vol. 148, pp. A742-A746.
Kennedy, John, H., et al., "A Highly Conductive Li+-Glass System: (1-x) ($0.4SiS_2$-$0.6Li_2S$)-xLiI", J. Electrochem. Soc., Nov. 1986, pp. 2437-2438.
Liu, Zhangiang, et al., "High performance $Li_2S$—$P_2S_5$ solid electrolyte induced by selenide", Journal of Power Sources, 2014, vol. 260, pp. 264-267.
Menetrier, M, et al., "Iconic conduction in $B_2S_3$—$Li_2S$-LiI glasses", Solid State Ionics, 1992, vol. 53-56, pp. 1208-1213.
Mercier, Rene, et al., "Superionic Conduction in $Li_2S$—$P_2S_5$-LiI-Glasses", Solid State Ionics, 1981, vol. 5, pp. 663-666.
Mizuno, Fuminori, et al., "All Solid-State Lithium Secondary Batteries Using High Lithium Ion Conducting $Li_2S$—$P_2S_5$ Glass-Ceramics," Chemistry Letters, 2002, pp. 1244-1245.
Mizuno, Fuminori, et al., "High lithium ion conducting glass-ceramics in the system $Li_2S$—$P_2S_5$", Solid State Ionics, 2006, vol. 177, pp. 2721-2725.
Mizuno, Fuminori, et al., "New, Highly Ion-Conductive Crystals Precipitated from $Li_2S$—$P_2S_5$ Glasses", Advanced Materials, Apr. 4, 2005, vol. 17, No. 7, pp. 918-921.
Murayama, Masahiro, et al., "Material Design of New Lithium Ionic Conductor thio-LISICON, in the $Li_2S$—$P_2S_5$ System", Solid State Ionics, 2004, vol. 170, pp. 173-180.

(56) References Cited

OTHER PUBLICATIONS

Sakuda, Atsushi, et al., "All-solid-state lithium secondary batteries using $LiCoO_2$ particles with pulsed laser deposition coatings of $Li_2S$—$P_2S_5$ solid electrolytes", Journal of Power Sources, 2011, vol. 196, pp. 6735-6741.

Ahn, Byung Tae, et al., "Synthesis and Lithium Conductivities of $Li_2SiS_3$ and $Li_4 SiS_4$," Mat. Res. Bull., 1989, vol. 24, pp. 889-897.

Aihara, Yuichi et al., "The electrochemical characteristics and applicability of an amorphous sulfide based solid ion conductor for the next generation solid-state lithium secondary batteries," Front. Energy Res., May 13, 2016, pp. 1-8.

Andrews, Lester, et al., "Infrared Spectra of $P_4S_{10}$ and its Decomposition Products in Solid Argon," Inorganic Chemistry, 1990, vol. 29, pp. 5222-5225.

Aotani, Noboru, "Synthesis and electrochemical properties of lithium ion conductive glass, $Li_3PO_4$—$Li_2S$—$SiS_2$," Solid State Ionics, 1994, vol. 68, pp. 35-39.

Bartholomew et al., "Electrical properties of new glasses based on the $Li_2S$—$SiS_2$ system," Journal of Non-Crystalline Solids, 1999, vol. 256 & 257, pp. 242-247.

Bhandari et al., "Origin of Fast Ion Conduction in $Li_{10}GeP_2S_{12}$, a Superionic Conductor," J. Phys. Chem. C, 2016, 120, pp. 29002-29010.

Bron, P. et al., "$Li_{10}Si_{0.3}Sn_{0.7}P_2S_{12}$ —A low-cost and low-grain-boundary-resistance lithium superionic conductor," Journal of Power Sources, 329, 2016, pp. 530-535.

Bron, P. et al., "$Li_{10}SnP_2S_{12}$: An Affordable Lithium Superionic Conductor," J. Am. Chem. Soc., 2013, 135, pp. 15694-15697.

Creus et al., "Thin films of ionic and mixed conductive glasses: their use in microdevices," Solid State Ionics, 1992, vol. 53-56, pp. 641-646.

Creus et al., "The Use of Ionic and Mixed Conductive Glasses in Microbatteries," Materials Science and Engineering, 1989, B3, pp. 109-112.

De Klerk, Niek J.J. et al., "Diffusion Mechanism of Li Argyrodite Solid Electrolytes for Li-Ion Batteries and Prediction of Optimized Halogen Doping: The Effect of Li Vacancies, Halogens, and Halogen Disorder," Chem. Mater. 2016, 28, pp. 7955-7963.

Deiseroth, Hans-Jorg, et al., "$Li_6PS_5X$: A Class of Crystalline Li Rich Solids with an Unusually High Li+ Mobility," Angew. Chem. Int. Ed., 2008, vol. 47, pp. 755-758.

Du, F. et al., "Structures, Thermodynamics, and Li+ Mobility of $Li_{10}GeP_2S_{12}$: A First-Principles Analysis," J. Phys. Chem. C 2014, 118, pp. 10590-10595.

Duffy et al., "Electroless deposition and characterization of Fe/FeOx nanoparticles on porous carbon microspheres: structure and surface reactivity", J. Mater. Chem A, 2013, vol. 1, pp. 6043-6050.

Duluard et al., "Lithium conducting solid electrolyte $Li_{13}Al_{53}Ti_{17}(PO_4)_3$ obtained via solution chemistry," Journal of the European Ceramic Society, 2013, vol. 33, pp. 1145-1153.

Eckert et al., "Structural Transformation of Non-Oxide Chalcogenide Glasses. The Short-Range Order of $Li_2S$—$P_2S_5$ Glasses Studied by Quantitative $^{31}P$ and $^{6,7}Li$ High-Resolution Solid-State NMR," Chem. Mater., 1990, vol. 2, pp. 273-279.

Hassoun et al., "A structural, spectroscopic and electrochemical study of a lithium ion conducting $Li_{10}GeP_2S_{12}$ solid electrolyte," Journal of Power Sources, 229, 2013, pp. 117-122.

Hayashi, Akitoshi, et al., "Characterization of $Li_2S$—$P_2S_5$ glass-ceramics as a solid electrolyte for lithium secondary batteries," Solid State Ionics, 2004, vol. 175, pp. 683-686.

Hayashi, Akitoshi, et al., "Characterization of $Li_2S$—$SiS_2$—$Li_3MO_3$ (M=B, Al, Ga and In) oxysulfide glasses and their application to solid state lithium secondary batteries," Solid State Ionics, 2002, vol. 152-153, pp. 285-290.

Hayashi, Akitoshi, et al., "Development of sulfide glass-ceramic electrolytes for all-solid-state lithium rechargeable batteries," J. Solid State Electrochem, 2010, vol. 14, pp. 1761-1767.

Hayashi, Akitoshi, et al., "Formation of $Li^+$ superionic crystals from the $Li_2S$—$P_2S_5$ melt-quenched glasses," J. Mater Sci, 2008, vol. 43, pp. 1885-1889.

Hayashi, Akitoshi, et al., "Formation of superionic crystals from mechanically milled $Li_2S$—$P_2S_5$ glasses," Electrochemistry Communications, 2003, vol. 5, pp. 111-114.

Hayashi, Akitoshi, et al., "Improvement of chemical stability of $Li_3PS_4$ glass electrolytes by adding MA (M=Fe, Zn, and Bi) nanoparticles," Journal of Materials Chemistry A, 2013, vol. 1, pp. 6320-6326.

Hayashi, Akitoshi, et al., "Preparation of $Li_2S$—$P_2S_5$ Amorphous Solid Electrolytes by Mechanical Milling," Journal of the American Ceramic Society, 2001, vol. 84, pp. 477-479.

Hirai, Koichi, et al., "Thermal and electrical properties of rapidly quenched glasses in the systems $LI_2S$—$SIS_2$—$Li_xMO_y(Li_xMO_y = LL_fSia_f, Li_2SO_4)$," Solid State Ionics, 1995, vol. 78, pp. 269-273.

Hu, C.H. et al., "Insights into structural stability and Li superionic conductivity of $Li_{10}GEP_2S_{12}$ from first-principles calculations," Chemical Physics Letters, 591, 2014, pp. 16-20.

Hu, Y-W., et al., "Ionic Conductivity of Lithium Orthosilicate-Lithium Phosphate Solid Solutions," J. Electrochem. Soc., 1977, vol. 124, No. 8, pp. 1240-1242.

Inada, T. et al., "All solid-state sheet battery using lithium inorganic solid electrolyte, thio-LISICON," Journal of Power Sources, 194, 2009, pp. 1085-1088.

Kaib, Thomas, et al., "New Lithium Chalcogenidotetrelates, LiChT: Synthesis and Characterization of the LitConducting Tetralithium ortho-Sulfidostannate $Li_{4 1 SnS4}$," Chemistry of Materials, 2012, vol. 24, pp. 2211-2219.

Kamaya, Noriaki, et al., "A lithium superionic conductor," Nature Materials, Sep. 2011, vol. 10, pp. 682-686; and Supplementary Information, DOI:10.1038/NMAT3066, 3 pages.

Kang, Joonhee et al., "First-Principles Characterization of the Unknown Crystal Structure and Ionic Conductivity of $Li_7P_2S_8I$ as a Solid Electrolyte for High-Voltage Li Ion Batteries," J. Phys. Chem. Lett., 2016, vol. 7, pp. 2671-2675.

Kanno, R. et al., "New Lithium Solid Electrolytes, Thio-Lisicon: Materials Design Concept and Application to Solid State Battery," Solid State Ionics: Trends in the New Millennium, Dec. 7, 2002, pp. 13-22.

Kanno, Ryoji, "Lithium Ionic Conductor Thio-LISICON, the $Li_2S$—$GeS_2$—$P_2S_5$ System," Journal of the Electrochemical Society, 2001, vol. 148, pp. A742-A746.

Kanno, Ryoji, "Synthesis of a new lithium ionic conductor, thio-LISICON-lithium germanium sulfide system," Solid State Ionics, 2000, vol. 130, pp. 97-104.

Kato, Y. et al., "Discharge Performance of All-Solid-State Battery Using a Lithium Superionic Conductor $Li_{10}GeP_2S_{12}$," Electrochemistry, vol. 80, 2012, No. 10, pp. 749-751.

Kato, Y. et al., "Synthesis, structure and lithium ionic conductivity of solid solutions of $Li_{10}(Ge_{1-x}M_x)P_2S_{12}$ (M=Si, Sn)," Journal of Power Sources, 271, 2014, pp. 60-64.

Kennedy, John, H., et al., "A Highly Conductive LitGlass System: $(1-x) (0.45i5_2-0.6Li_2S)-xLi1$," J. Electrochem. Soc., 1986, pp. 2437-2438.

Kobayashi, Takeshi, et al., "Interfacial reactions at electrode/electrolyte boundary in all solid-state lithium battery using inorganic solid electrolyte, thio-LISICON," Electrochimica Acta, 2008, vol. 53, pp. 5045-5050.

Koh et al, "Synthesis of lithium-beta-alumina by various ion-exchange and conversion processes", Solid State Ionics, vol. 220, 2012, pp. 32-38.

Kondo, S., et al., "New lithium ion conductors based on $Li_2S$—$SiS_2$ system," Solid State Ionics, 1992, vol. 53-56, pp. 1183-1186.

Kuhn, A. et al., "A new ultrafast superionic Li-conductor: ion dynamics in $Li_{11}Si_2PS_{12}$ and comparison with other tetragonal LGPS-type electrolytes," Phys. Chem. Chem. Phys., 2014, 16, pp. 14669-14674.

Kuhn, A. et al., "Single-crystal X-ray structure analysis of the superionic conductor $Li_{10}GeP_2S_{12}$," Phys.Chem. Chem. Phys., 2013, vol. 15, 11620-11622.

Kuhn, A. et al., "Tetragonal $Li_{10}GeP_2S_{12}$ and $Li_7GePS_8$—exploring the Li ion dynamics in LGPS Li electrolytes," Energy Environ. Sci., 2013, vol. 6, pp. 3548-3552.

(56) References Cited

OTHER PUBLICATIONS

Kuhn, A. et al., "Ultrafast Li Electrolytes Based on Abundant Elements: $Li_{10}SnP_2S_{12}$ and $Li_{11}Si_2PS_{12}$," Feb. 19, 2014: arXiv: 1402.4586.
Kuhn, A. et al., "Ultrafast Li Electrolytes Based on Abundant Elements: $Li_{10}SnP_2S_{12}$," Supporting Information, Feb. 19, 2014: arXiv: 1402.4586.
Leal-Gonzalez, J., et al., "Structure of Lithium Sulfide, $LiGaS_2$," Acta. Cryst., 1990, pp. 2017-2019.
Liu, Zengcai, et al., "Anomalous High Iconic Conductivity of Nanoporous $R-Li_3PS_4$," Journal of the American Chemical Society, 2012, 4 pages.
Liu, Zhangiang, et al., "High performance $Li_2S-P_2S_5$ solid electrolyte induced by selenide," Journal of Power Sources, 2014, vol. 260, pp. 264-267.
McGrogan, Frank P. et al., "Compliant Yet Brittle Mechanical Behavior of $Li_2S-P_2S_5$ Lithium-Ion-Conducting Solid Electrolyte", Adv. Energy Mater., 2017, 1602011, 5 pages; DOI: 10.1002/aenm.201602011.
Menetrier, M, et al., "Iconic conduction in $B_2S_3-Li_2S-LiI$ glasses," Solid State Ionics, 1992, vol. 53-56, pp. 1208-1213.
Menetrier, M. et al., "Electrochemical Properties of $B_2S_3-Li_2S-LiI$ Vitreous Electrolytes," J. Electrochem. Soc, 1984, 131(9), pp. 1971-1973.
Mercier, Rene, et al., "Superionic Conduction in $Li_2S-P_2S_5-LiI$-Glasses," Solid State Ionics, 1981, vol. 5, pp. 663-666.
Minami, Keiichi, et al., "Electrical and electrochemical properties of the $70Li_2S \cdot (30-x)P_2S_5 \cdot _xP_2O_5$ glass-ceramic electrolytes," Solid State Ionics, 2008, vol. 179, pp. 1282-1285.
Minami, Keiichi, et al., "Electrical and electrochemical properties of glass-ceramic electrolytes in the systems $Li_2S-P_2S_5-P_2S_3$ and $Li_2S-P_2S_5-P_2O_5$," Solid State Ionics, 2011, vol. 192, pp. 122-125.
Minami, Keiichi, et al., "Lithium ion conductivity of the $Li_2S-P_2S_5$ glass-based electrolytes prepared by the melt quenching method," Solid State Ionics, 2007, vol. 178, pp. 837-841.
Minami, Tsutomu, "Fast Ion Conducting Glasses," Journal of Non-Crystalline Solids, 1985, vol. 73, pp. 273-284.
Minami, Tsutomu, et al., "Preparation and characterization of lithium ion-conducting oxysulfide glasses," Solid State Ionics, 2000, vol. 136-137, pp. 1015-1023.
Minami, Tsutomu, et al., "Recent progress of glass and glass-ceramics as solid electrolytes for lithium secondary batteries," Solid State Ionics, 2006, vol. 177, pp. 2715-2720.
Mizuno, Fuminori, et al., "All Solid-State Lithium Secondary Batteries Using High Lithium Ion Conducting $Li_2S-P_2S_5$ Glass-Ceramics," Chemistry Letters, 2002, pp. 1244-1245.
Mizuno, Fuminori, et al., "High lithium ion conducting glass-ceramics in the system $Li_2S-P_2S_5$," Solid State Ionics, 2006, vol. 177, pp. 2721-2725.
Mizuno, Fuminori, et al., "New, Highly Ion-Conductive Crystals Precipitated from $Li_2S-P_2S_5$ Glasses," Advanced Materials, 2005, vol. 17, No. 7, pp. 918-921.
Mo et al., "First Principles Study of the $Li_{10}GeP_2S_{12}$ Lithium Super Ionic Conductor Material," Chem. Mater., 2012, 24, pp. 15-17.
Morimoto, Hideyuki, et al., "Mechanochemical Synthesis of New Amorphous Materials of $60Li_2-40SiS_2$ with High Lithium Ion Conductivity," J. Am. Ceram. Soc., 1999, vol. 82, pp. 1352-1354.
Muramatsu, Hiromasa, et al., "Structural change of $Li_2S-P_2S_5$ sulfide solid electrolytes in the atmosphere," Solid State Ionics, 2011, vol. 182, pp. 116-119.
Murayama, Masahiro, et al., "Material Design of New Lithium Ionic Conductor thio-LISICON, in the $L1_2S-P_2S_5$ System," Solid State Ionics, 2004, vol. 170, pp. 173-180.
Murayama, Masahiro, et al., "Synthesis of New Lithium Ionic Conductor Thio-LISICON-Lithium Silicon Sulfides System," Journal of Solid State Chemistry, 2002, vol. 168, pp. 140-148.
Norrel et al., "Anion exchange of Oxygen by Sulfur in $GeO_2$-based glasses," Proceedings of SPIE, vol. 4990, 2003, pp. 87-96.
Oh, G. et al., "Bulk-Type All Solid-State Batteries with 5 V Class $LiNi_{0.5}Mn_{1.5}O_4$ Cathode and $Li_{10}GeP_2S_{12}$ Solid Electrolyte," Chem. Mater., 2016, 28, pp. 2634-2640.
Ohtomo, Takamasa, et al., "Characteristics of the $Li_2O-Li_2S-P_2S_5$ glasses synthesized by the two-step mechanical milling," Journal of Non-Crystalline Solids, 2013, vol. 364, pp. 57-61.
Ohtomo, Takamasa, et al., "Electrical and electrochemical properties of $Li_2S-P_2S_5-P_2O_5$ glass-ceramic electrolytes," Journal of Power Sources, 2005, vol. 146, pp. 715-718.
Ohtomo, Takamasa, et al., "Suppression of $H_2S$ gas from $Li_2S-P_2S_5$ glass electrolytes by the addition of $Li_2O$," The Electrochemical Society, Abstract #1189, Honolulu PRIME 2012, 1 page.
Ong, S. et al., "Phase stability, electrochemical stability and ionic conductivity of the $Li_{10\pm1}MP_2X_{12}$ (M=Ge, Si, Sn, Al or P, and X=O, S or Se) family of superionic conductors," Energy Environ. Sci., 2013, 6, pp. 148-156.
Ooura, Yuji et al., A new lithium-ion conducting glass ceramic in the composition of $75Li_2S \cdot 5P_2S_3 \cdot 20P_2S_5$(mol%), Solid State Ionics, 2014, vol. 262, pp. 733-737.
Patil, Deepak S. et al., "Ionic conductivity study of $LiI-Ga_2S_3-GeS_2$ chalcogenide glasses using a random-walk Approach," Pure Appl. Chem., 2014, pp. 1-11; DOI: 10.1515/pac-2014-1005.
Pradel, A., et al., "Lithium Chalcogenide Conductive Glasses, "Materials Chemistry and Physics, 1989, vol. 23, pp. 121-142.
Pradel, Annie, et al., "Ionically Conductive Chalcogenide Glasses, " Journal of Solid State Chemistry, 1992, vol. 96, pp. 247-257.
Qu, Meng et al., "Nanomechanical Quantification of Elastic, Plastic, and Fracture Properties of $LiCoO_2$", Adv. Energy Mater., 2012, DOI: 10.1002/aenm.201200107; 5 pages.
Rangasamy et al., "An Iodide-Based $Li_7P_2S_8I$ Superionic Conductor," J. Am. Chem. Soc., 2015, vol. 137, pp. 1384-1387.
Rangasamy et al., "Heteroclite electrochemical stability of an I based $Li_7P_2S_8I$ superionic conductor," Angewandte Chemie: https://www.osti.gov/pages/servlets/purl/1185568.
Rao, R. Prasada, et al., "Synthesis and Li ion Migration Studies of $Li_6PS_5X$ (X=Cl, Br, I)," Mater. Res. Soc. Symp. Proc., 2011, vol. 1331, 6 pages.
Rao, Rayavarapu et al., Variation in structure and Li+-ion migration in argyrodite-type $Li_6PS_5X$ (X = Cl, Br, I) solid electrolytes, J Solid State Electrochem (2012) 16:1807-1813; 9 pages.
Sahu, Gayatri, et al., "Air-Stable, High-Conduction Solid Electrolytes of Arsenic-Substituted $Li_4SnS_4$," Energy & Environmental Science, 2014, vol. 7, pp. 1053-1058.
Sakuda, Atsushi et al., "Evaluation of elastic modulus of Li2S-P2S5 glassy solid electrolyte by ultrasonic sound velocity measurement and compression test", 2013, Journal of the Ceramic Society of Japan 121[11]:946-949, 4 pages.
Sakuda, Atsushi, et al., "All-solid-state lithium secondary batteries using $LiCoO_2$ particles with pulsed laser deposition coatings of $L1_2S-P_2S_5$ solid electrolytes," Journal of Power Sources, 2011, vol. 196, pp. 6735-6741.
Sakuda, Atsushi, et al., "Sulfide Solid Electrolyte with Favorable Mechanical Property for All-Solid-State Lithium Battery," Scientific Reports, 2013, 3:2261, DOI: 10.1038/srep02261, 5 pages.
Seino, Yoshikatsu, et al., Electronic Supplementary Material (ESI) for Energy & Environmental Science, This journal is © The Royal Society of Chemistry, 2014, 4 pages.
Seino, Yoshikatsu, et al., "A sulphide lithium super ion conductor is superior to liquid ion conductors for use in rechargeable batteries," Energy & Environmental Science, 2014, vol. 7, pp. 627-631.
Seino, Yoshikatsu, et al., "Synthesis and electrochemical properties of $Li_2S-B_2S_3-LL_lSiO_4$," Solid State Ionics, 2006, vol. 177, pp. 2601-2603.
Seino, Yoshikatsu, et al., "Synthesis of phosphorous sulfide solid electrolyte and all-solid-state lithium batteries with graphite electrode," Solid State Ionics, 2005, pp. 2389-2393.
Seo, Inseok, et al., "Fast lithium ion conducting solid state thin-film electrolytes based on lithium thio-germanate materials," Acta Materialia, 2011, vol. 59, pp. 1839-1846.
Seo, Inseok, et al., "Structural Properties of Lithium Thio-Germanate Thin Film Electrolytes Grown by Radio Frequency Sputtering," Inorganic Chemistry, 2011, vol. 50, pp. 2143-2150.

(56) References Cited

OTHER PUBLICATIONS

Sistla, Ramesh, K. et al., "Structural studies on $xLi_2S$-$(1-x)P_2S_5$ glasses by X-ray diffraction and molecular dynamics simulation," Journal of Non-Crystalline Solids, 2004, vol. 349, pp. 54-59.

Sun, Y. et al., "Oxygen substitution effects in $Li_{10}GeP_2S_{12}$ solid electrolyte," Journal of Power Sources, 2016, vol. 324, pp. 798-803.

Suzuki, K. et al., "Synthesis, structure, and electrochemical properties of crystalline Li—P—S—O solid electrolytes: Novel lithium-conducting oxysulfides of $Li_{10}GeP_2S_{12}$ family," Solid State Ionics, vol. 288, May 2016, pp. 229-234.

Sveinbjornsson, Dadi, et al., "Ionic Conductivity and the Formation of Cubic $CaH_2$ in the $LiBH_4$—$Ca(BH_4)_2$ Composit," Journal of Solid State Chemistry, 2014, vol. 211, pp. 81-89.

Tachez, Michel, et al., "Ionic Conductivity of and Phase Transition in Lithium Thiophosphate $Li_3PS_4$," Solid State Ionics, 1984, vol. 14, pp. 181-185.

Takada, K. et al., "Compatibility of Lithium Ion Conductive Sulfide Glass with Carbon-Lithium Electrode," J. Electrochem. Soc. 2003, vol. 150, Issue 3, pp. A274-A277.

Takada, Kazunori, et al., "Electrochemical behaviors of Li+ ion conductor $Li_3PO_4$—$Li_2S$—$SiS_2$,." Journal of Power Sources, 1993, vol. 43-44, pp. 135-141.

Takada, Kazunori, et al., "Lithium ion conductive oxysulfide $Li_3PO_4$—$Li_3S_4$, " Solid State Ionics, 2005, vol. 176, pp. 2355-2359.

Takada, Kazunori, et al., "Solid State Lithium Battery with Oxysulfide glass, "Solid State Ionics, 1996, vol. 86-88, pp. 877-882.

Takahara, Hikari, et al., Application of Lithium Metal Electrodes to All-Solid-State Lithium Secondary Batteries Using $Li_3PO_4$—$Li_2$—$SiS_2$ glass, Journal of the Electrochemical Society, 2004, vol. 151, No. 9, pp. A1309-A1313.

Tarhouchi, I. et al., "Electrochemical characterization of $Li_{10}SnP_2S_{12}$: An electrolyte or a negative electrode for solid state Li-ion batteries?" Solid State Ionics, 296, 2016, pp. 18-25.

Tatsumisago, Masahiro, et al., "All-solid-state lithium secondary batteries using sulfide-based glass-ceramic electrolytes," Journal of Power Sources, 2006, vol. 159, pp. 193-199.

Teragawa, Shingo, et al., "Preparation of $Li_2S$—$P_2S_5$ solid electrolyte from N-methylformamide solution and application for all-solid-state lithium battery," Journal of Power Sources, 2014, vol. 248, pp. 939-942.

Trevey, James, et al., "Glass-ceramic $Li_2S$-$P_2S_5$ electrolytes prepared by a single step ball billing process and their application for all-solid-state lithium-ion batteries," Electrochemistry Communications, 2009, vol. 11, pp. 1830-1833.

Ujiie, Satoshi et al., "Conductivity of $70Li_2S\cdot30P_2S_5$ glasses and glass-ceramics added with lithium halides," Solid State Ionics, 263, 2014, pp. 57-61.

Ujiie, Satoshi, et al., "Preparation and electrochemical characterization of $(100-x)(0.7Li_2S\cdot0.3P_2S_5)$ xLiBr glass-ceramic electrolytes," Mater Renew Sustain Energy, 2014, 3:18, pp. 1 of 8; DOI 10.1007/s40243-013-0018-x.

Wada, H. et al., "Preparation and Ionic Conductivity of New $B_2S_3$—$Li_2S$—LiI Glasses," Mat. Res. Bull., vol. 18, 1983, pp. 189-193.

Wang, Y. et al., "Highly lithium-ion conductive thio-LISICON thin film processed by low-temperature solution method," Journal of Power Sources, vol. 224, 2013, pp. 225-229.

Wang, Y. et al., "Highly lithium-ion conductive thio-LISICON thin film processed by low-temperature solution method," *Supporting Information*, Journal of Power Sources, 224, 2013, pp. 225-229.

Wang, Yiqun et al., "X-ray photoelectron spectroscopy for sulfide glass electrolytes in the systems $Li_2S$—$P_2S_5$ and $Li_2S$—$P_2S_5$—LiBr," Journal of the Ceramic Society of Japan, 2016, vol. 124, No. 5, pp. 597-601.

Weber, Dominik A. et al., "Structural Insights and 3D Diffusion Pathways within the Lithium Superionic Conductor $Li_{10}GeP_2S_{12}$," Chem. Mater., 2016, 28, pp. 5905-5915.

Wenzel, S. et al., "Direct Observation of the Interfacial Instability of the Fast Ionic Conductor $Li_{10}GeP_2S_{12}$ at the Lithium Metal Anode," Chem. Mater., 2016, 28, pp. 2400-2407.

Xu, M. et al., "One-dimensional stringlike cooperative migration of lithium ions in an ultrafast ionic conductor," Appl. Phys. Lett. vol. 101, 2012, 031901.

Yamashita, M., et al., "Formation and ionic conductivity of $Li_2S$—$GeS_{2-Ga_2}S_3$ glasses and thin films," Solid State Ionics, 2003, vol. 158, pp. 151-156.

Yamauchi et al., "Preparation and ionic conductivities of $(100-x)(0.75Li_2S\cdot0.25P_2S_5)\cdot xLiBH_4$ glass electrolytes," Journal of Power Sources, 2013, vol. 244, pp. 707-710.

Yubuchi, So et al., "Preparation of high lithium-ion conducting $Li_6PS_5Cl$ solid electrolyte from ethanol solution for all-solid-state lithium batteries," Journal of Power Sources, 2015, vol. 293, pp. 941-945.

Zhu, Zhuoying et al., "$Li_3Y(PS_4)_2$ and $Li_5PS_4Cl_2$: New Lithium Superionic Conductors Predicted from Silver Thiophosphates using Efficiently Tiered Ab Initio Molecular Dynamics Simulations," Chem. Mater., 2017, 29 (6), pp. 2474-2484.

Extended European Search Report for EP Application No. 16871533.2 dated Jun. 26, 2019, 10 pages.

Takada et al., "Solid-state lithium battery with graphite anode", Solid State Ionics, Mar. 1, 2003, vol. 158, No. 3-4, pp. 269-274.

\* cited by examiner

COMPOSITE ELECTROLYTES

This application claims priority to U.S. Provisional Patent Application No. 62/184,028, filed Jun. 24, 2015, and also claims priority to U.S. Provisional Patent Application No. 62/240,576, filed Oct. 13, 2015, the entire contents of each provisional patent application are herein incorporated by reference in their entirety for all purposes.

BACKGROUND

As the prevalence of consumer electronics (e.g., mobile phones, tablets, and laptop computers) and electrified-vehicle (i.e., EV) automobiles (e.g., plug-in hybrids and BEVs) has increased, so too has the demand for better performing energy storage devices which are required to power these consumer electronics and vehicles. While rechargeable lithium (Li) ion batteries are popular energy storage devices for consumer electronics, currently available rechargeable lithium (Li) ion batteries are still too limited with respect to their energy density and power output for mainstream consumer adoption in automotive as well as other energy-intensive application. In order to improve upon the energy density and power output of rechargeable Li batteries, Li-metal has been proposed as a next-generation negative electrode material since such electrodes theoretically produce the highest energy densities possible by minimizing a battery's discharged voltage (i.e., V of Li in Li-metal is 0V) and maximizing the charged voltage [See, e.g., Andre, Dave, et al., *J. Mater. Chem. A*, DOI: 10.1039/c5ta00361j, (2015)]. By pairing a Li-metal negative electrode with a highly ion-conducting solid state electrolyte, the stored energy in a highly energy-dense rechargeable Li ion batteries should theoretically be accessed at commercially viable power rates.

When a Li-rechargeable battery discharges, $Li^+$ ions conduct through an electrolyte from a negative to a positive electrode and vice versa during charge. This process produces electrical energy (Energy=Voltage×Current) in a circuit connecting the electrodes and that is electrically insulated from, but parallel to, the $Li^+$ conduction path; the Voltage (V versus Li) being a function of the chemical potential difference for Li situated in the positive electrode as compared to the negative electrode. In order to use Li-metal negative electrodes, however, new solid state electrolytes are required as the known and widely used liquid electrolytes are chemically incompatible with Li-metal.

Solid state Li-rechargeable batteries which include solid state electrolytes are an attractive alternative to conventional Li-rechargeable batteries, in part due to the aforementioned higher energy densities (e.g., gravimetric or volumetric) and power rates but also due to their safety attributes which are related to the absence of an flammable organic liquid electrolyte. Although Li-metal negative electrodes maximize a battery's energy density, Li-metal is unfortunately highly reactive with most electrolytes and has a large volume change (e.g., contraction and expansion) when discharged and charged. This volume change mechanically strains, and can crack, a solid state electrolyte which contacts the Li-metal. This mechanical stability issue is worsened if the electrolyte also chemically reacts with Li-metal. To date, there are no viable commercially available solutions to either of these chemical or mechanical stability problems, nor are there solutions to other problems such as resistance/impedance gain, which are associated with interfacing Li-metal negative electrodes with solid state electrolytes.

Some solid state electrolytes have been analyzed, such as oxide- or sulfide-based electrolytes. See, for example, U.S. Pat. Nos. 8,658,317, 8,092,941, 7,901,658, 6,277,524 and 8,697,292; U.S. Patent Application Publication Nos. 2013/0085055 (issued as U.S. Pat. No. 8,940,220 on Jan. 27, 2015), 2011/0281175 (issued as U.S. Pat. No. 9,017,882 on Apr. 28, 2015), 2014/0093785 (abandoned), 2014/0170504 (abandoned), 2014/0065513issued as U.S. Pat. No. 9,502,729 on Nov. 22, 2016), and 2010/0047696 (issued as U.S. Pat. No. 8,883,357 on Nov. 11, 2014); also Bonderer, et al. Journal of the American Ceramic Society, 2010, 93(11): 3624-3631; Murugan, et al., *Angew Chem. Int. Ed.* 2007, 46, 7778-7781; Buschmann, et al., *Phys. Chem. Chem. Phys.,* 2011, 13, 19378-19392; Buschmann, et al., Journal of Power Sources 206 (2012) 236-244; Kotobuki, et al., Journal of Power Sources 196 (2011) 7750-7754; and Jin, et al., Journal of Power Sources 196 (2011) 8683-8687. Some composites of these electrolytes are also known. See, for example, Skaarup, Steen, et al., *Solid State Ionics* 28-30 (1988) 975-978; Skaarup, Steen, et al., *Solid State Ionics* 40/41 (1990) 1021-1024; Nairn, K., et al., Solid State Ionics 86-88 (1996) 589-593; Nairn, K., et al., Solid State Ionics 121 (1999) 115-119; Kumar, Binod, et al., Journal of Electroceramics, 5:2, 127-139, 2000; Wang, Yan-Jie, et al., *Journal of Applied Polymer Science*, Vol. 102, 1328-1334 (2006); Thokchom, J. S., et al., *J. Am Ceram. Soc.,* 90 [2] 462-466 (2007); Wieczorek, W. et al., Electronic Materials: Science and Technology Volume 10, 2008, pp 1-7; Li, Qin, et al, *Solid State Ionic* 268 (2014) 156-161; Aetukuri, N. B., et al., Adv. Energy Mater., 2015, pages 1-6; Lim, Y. J., et al., ChemPlusChem, DOI: 10.1002/cplu.201500106; Liu, W., et al., DOI: 10.1021/acs.nanolett.5b00600; and Nam, Y. J., et al., Nano Lett., 2015, 15 (5), pp 3317-3323), Despite their ability to conduct $Li^+$ions, these solid electrolytes have yet to demonstrate sufficiently high ion conductivity, sufficiently long cycle-ability, a high coulombic efficiency at high cumulative Li throughput, the ability to prevent the formation of lithium dendrites, or the ability to be formulated or prepared with the proper morphology (e.g., thin, flexible film) or sufficient particle connectivity (i.e., particle-particle necking) to function as required for commercial applications.

Conventional Li-rechargeable batteries uses a liquid electrolyte and a thin polymer membrane disposed between two electrodes. The polymer membrane is sometimes referred to as a separator. The polymer membrane is used primarily to prevent direct contact between the two electrodes. Small holes in the polymer membrane allow the liquid electrolyte to flow between the two electrodes for ionic conductivity. Formation of lithium dendrites can be slowed, though not prevented, by minimizing nucleation points available for the dendrites to grow from, e.g., by using smooth electrodes formed by passing these electrodes through a roll press. When dendrites start growing in such a cell, the polymer membrane is not robust enough to prevent these growing dendrites from piercing through the membrane and eventually causing the internal short between the two electrodes. What is needed, in the relevant field, then is a robust electrolyte system which may be capable of blocking dendrites from piercing through the system. What is needed, in the relevant field, is, for example, an electrolyte system which can act as a mechanical barrier to prevent the growth of dendrites in the direction between two electrodes. If a solid electrolyte is combined with one or more polymers, the mechanical properties of this combination may provide operable electrolyte characteristics (e.g., ionic conductivity, electrical resistance) and mechanical characteristics (e.g., yield strength, yield strain, ultimate strength, and ultimate strain) that are capable of withstanding dendrite growth and preventing dendrites from piercing through the composite electrolyte. The minimum mechanical characteristics needed to block lithium dendrites may depend on localized voltage values, interface geometry, and other characteristics. Furthermore, small variations in composition of composite electrolytes may yield substantial changes in these mechanical characteristics.

There is therefore a series of problems in the relevant field related to solid state electrolytes which are chemically and mechanically compatible with Li-metal electrodes, are robust, and have sufficient ionic conductivity for commercial battery applications. What is needed in the relevant field is, for example, chemically and mechanically stable thin film solid state electrolytes with sufficient conductivity for energy dense rechargeable batteries and which accommodate Li-metal's volume expansion and contraction during battery charge and discharge. The instant disclosure sets forth electrolytes, for example, composite electrolytes, in addition to methods for making and using these electrolytes and composite electrolytes. The instant disclosure sets forth other solutions to problems in the relevant field.

SUMMARY

In one embodiment, set forth herein is an electrolyte including an inorganic material embedded in an organic material. In some examples, the electrolyte has a fracture strength of greater than 5 MPa and less than 250 MPa.

In a second embodiment, set forth herein is an electrochemical device including an electrolyte or composite electrolyte described herein.

In a third embodiment, set forth herein is an electrolyte including an inorganic material and an organic material, wherein the inorganic material is embedded in the organic material, and the organic material is molded around, adsorbed to, bonded to, or entangled with the surface of the inorganic material or a particle thereof.

In a forth embodiment, set forth herein are electrochemical cells which include a positive electrode, a negative electrode, and a composite electrolyte layer. In these embodiments, at least one composite electrolyte layer is positioned between the positive electrode and negative electrode. The composite electrolyte layer includes a polymer and an inorganic solid state electrolyte such that the amount of the inorganic component is maximized in the composite without the composite mechanically degrading on account of too high of an inorganic solid loading. In some embodiments of these composites, the volumetric ratio of inorganic solid state electrolyte to polymer is greater than 1. In some of these embodiments, either or both of the positive electrode and negative electrodes directly contact the inorganic solid state electrolyte component of the composite electrolyte. In some embodiments, the adjoining sides of the electrolyte directly interfacing the positive or negative electrodes are polished, etched, or plasma treated to remove polymer at the surface and to expose a inorganic solid state electrolyte components at the surface.

In a fifth embodiment, set forth herein are thin film electrolytes that include an inorganic solid state electrolyte and a polymer. In some of these electrolytes, the film has at least one textured surface, and the polymer bonds to the at least one textured surface. In some examples, the film has a thickness that is between about 10 nm to 100 µm. In certain examples, the inorganic electrolyte is exposed at both sides of the film which have the highest surface areas.

In a sixth embodiment, set forth herein are methods of making a composite electrolyte thin film, wherein the film, has a top surface and a bottom surface, includes a polymer and an inorganic solid state electrolyte, and has a volumetric ratio of inorganic solid state electrolyte to polymer that is greater than 1. In some examples, the method includes providing a monodisperse collection of inorganic solid state electrolyte particles, providing a polymer, optionally providing a solvent, mixing the polymer and solid state electrolyte to form a mixture wherein the volumetric ratio of inorganic solid state electrolyte to polymer is greater than 1, casting or extruding the mixture, and drying the mixture to form a dried film. In some examples, the method further includes treating the surface of the dried film to expose the inorganic solid state electrolyte at the top and bottom surfaces.

In a seventh embodiment, set forth herein are methods of making a composite electrolyte thin film, which includes the following steps: providing a mixture which includes inorganic solid state electrolyte precursors, inorganic solid state electrolytes, binders, polymers, solvents, or combinations thereof, casting the mixture with a template, calcining the mixture with a template to form a calcined inorganic solid state electrolyte having void spaces, backfilling the void spaces with a polymer, wherein the polymer includes those polymers described in this patent application, wherein the volumetric ratio of inorganic solid state electrolyte to polymer is greater than 1. In some examples, the method further includes treating the surface of the dried film to expose the inorganic solid state electrolyte at the top and bottom surfaces. The treating can include a variety of known treatment methods such as, but not limited to, radiation (e.g., ultraviolet radiation) or chemical treatment (e.g., HF exposure).

In an eighth embodiment, set forth herein are methods of making a composite electrolyte thin film, wherein the film, has a top surface and a bottom surface, comprises a polymer and an inorganic solid state electrolyte, and has a volumetric ratio of inorganic solid state electrolyte to polymer that is greater than 1. In some examples, the methods herein include providing a mixture comprising inorganic solid state electrolyte precursors, inorganic solid state electrolytes, binders, polymers, solvents, or combinations thereof, casting the mixture, imprinting the mixture with a template, removing the template, sintering the mixture to form a sintered inorganic solid state electrolyte having a textured surface, backfilling the textured surface with a polymer, selected from those polymers described herein, wherein the volumetric ratio of inorganic solid state electrolyte to polymer is greater than 1. In some examples, the method further includes treating the surface of the dried film to expose the inorganic solid state electrolyte at the top and bottom surfaces.

In a ninth embodiment, set forth herein are methods of making a composite electrolyte membrane having a top surface and a bottom surface and comprising a polymer and an inorganic solid state electrolyte, wherein the volumetric ratio of inorganic solid state electrolyte to polymer is >1, including the following steps providing an organic substrate or mesh, proving an inorganic solid state electrolyte precursor slurry, casting the slurry onto the substrate or mesh, calcining the slurry on the substrate or mesh to remove the substrate or mesh and form an inorganic solid state electrolyte having void spaces, backfilling the void spaces with a polymer, selected from those polymers described herein, wherein the volumetric ratio of inorganic solid state electrolyte to polymer is greater than 1. In some examples, the method further includes treating the surface of the dried film to expose the inorganic solid state electrolyte at the top and bottom surfaces.

Figure 1:
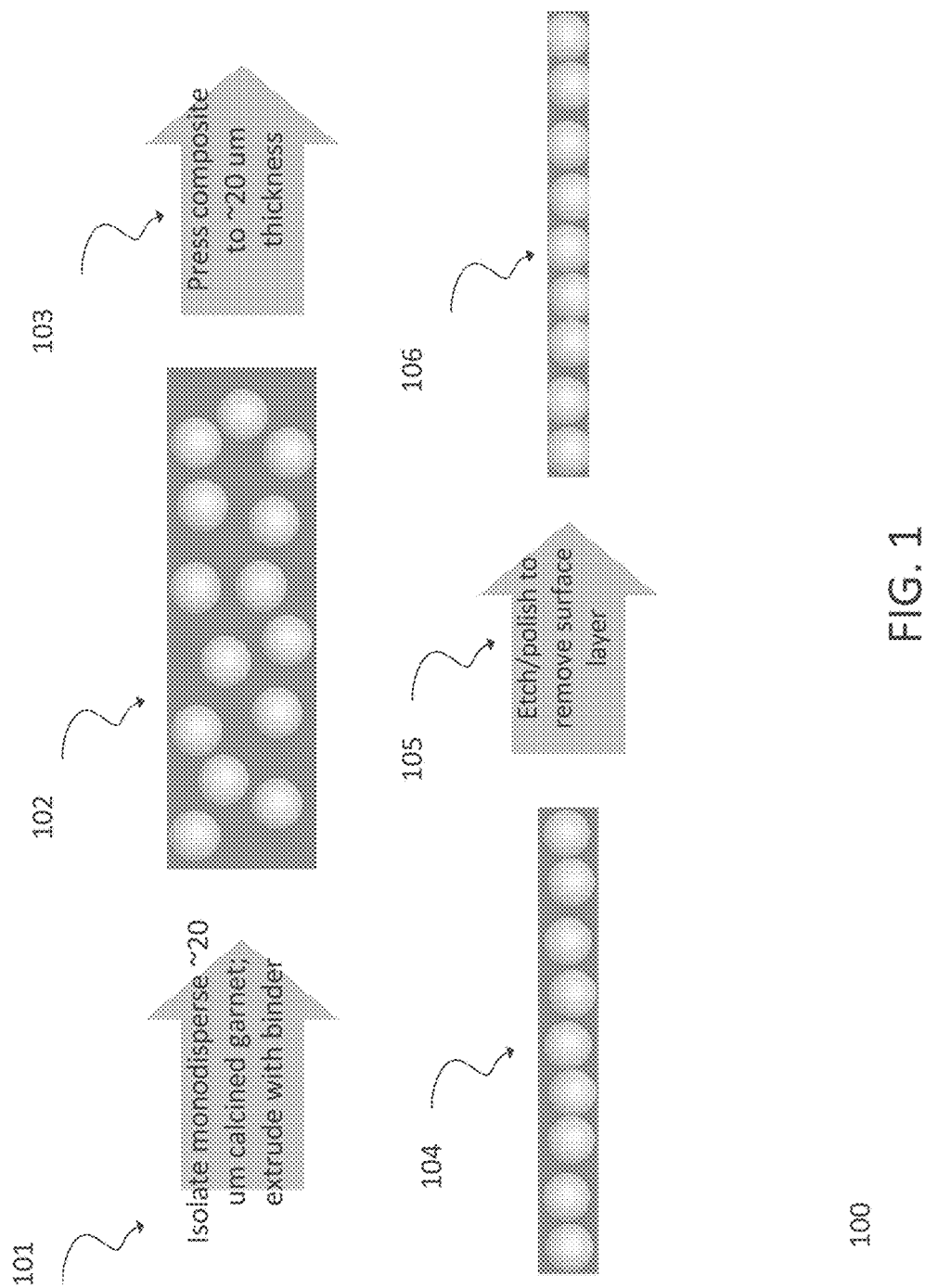
FIG. 1 shows an example method for making a single-particle thickness extruded composite film.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

The following description is presented to enable one of ordinary skill in the art to make and use the disclosed subject matter and to incorporate it in the context of particular applications. Various modifications, as well as a variety of uses in different applications will be readily apparent to those skilled in the art, and the general principles defined herein may be applied to a wide range of embodiments.

Thus, the present disclosure is not intended to be limited to the embodiments presented, but is to be accorded the widest scope consistent with the principles and novel features disclosed herein.

In the following detailed description, numerous specific details are set forth in order to provide a more thorough understanding of the present disclosure. However, it will be apparent to one skilled in the art that the present disclosure may be practiced without necessarily being limited to these specific details. In other instances, well-known structures and devices are shown in block diagram form, rather than in detail, in order to avoid obscuring the present disclosure.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph f. In particular, the use of "step of" or "act of" in the Claims herein is not intended to invoke the provisions of 35 U.S.C. 112, Paragraph f.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Definitions

As used here, the phrase "electrochemical cell," refers to, for example, a "battery cell" and includes a positive electrode, a negative electrode, and an electrolyte therebetween which conducts ions (e.g., $Li^+$) but electrically insulates the positive and negative electrodes. In some embodiments, a battery may include multiple positive electrodes and/or multiple negative electrodes enclosed in one container.

As used here, the phrase "positive electrode," refers to the electrode in a secondary battery towards which positive ions, e.g., $Li^+$, conduct, flow or move during discharge of the battery. As used herein, the phrase "negative electrode" refers to the electrode in a secondary battery from where positive ions, e.g., $Li^+$, flow or move during discharge of the battery. In a battery comprised of a Li-metal electrode and a conversion chemistry, intercalation chemistry, or combination conversion/intercalation chemistry-including electrode (i.e., cathode active material; e.g., $NiF_x$, NCA, $LiNi_xMn_yCo_zO_2$ [NMC] or $LiNi_xAl_yCo_zO_2$ [NCA], wherein x+y+z=1), the electrode having the conversion chemistry, intercalation chemistry, or combination conversion/intercalation chemistry material is referred to as the positive electrode. In some common usages, cathode is used in place of positive electrode, and anode is used in place of negative electrode. When a Li-secondary battery is charged, Li ions move from the positive electrode (e.g., $NiF_x$, NMC, NCA) towards the negative electrode (e.g., Li-metal). When a Li-secondary battery is discharged, Li ions move towards the positive electrode and from the negative electrode.

As used herein, a "binder" refers to a material that assists in the adhesion of another material. For example, as used herein, polyvinyl butyral is a binder because it is useful for adhering garnet materials. Other binders include polycarbonates. Other binders may include polymethylmethacrylates. These examples of binders are not limiting as to the entire scope of binders contemplated here but merely serve as examples. Binders useful in the present disclosure include, but are not limited to, polypropylene (PP), atactic polypropylene (aPP), isotactic polypropylene (iPP), ethylene propylene rubber (EPR), ethylene pentene copolymer (EPC), polyisobutylene (PM), styrene butadiene rubber (SBR), polyolefins, polyethylene-co-poly-1-octene (PE-co-PO), PE-co-poly(methylene cyclopentane) (PE-co-PMCP), poly methyl-methacrylate (and other acrylics), acrylic, polyvinylacetacetal resin, polyvinylbutylal resin, PVB, polyvinyl acetal resin, stereoblock polypropylenes, polypropylene polymethylpentene copolymer, polyethylene oxide (PEO), PEO block copolymers, silicone, and the like.

As used here, the phrase "composite electrolyte," refers to an electrolyte, as referenced above, having at least two components, e.g., an inorganic solid state electrolyte and a polymer bonded to the electrolyte, adhered to the electrolyte, or uniformly mixed with the electrolyte. In certain examples, the at least two components include a polymer, or organic binder, and an inorganic solid state electrolyte. A composite electrolyte may include an inorganic solid state electrolyte and a polymer, bonded thereto, adhered thereto, adsorbed there onto, or mixed therewith. A composite electrolyte may include an inorganic solid state electrolyte and a polymer, bonded thereto, adhered thereto, adsorbed there onto, or mixed therewith. A composite electrolyte may include an inorganic solid state electrolyte and the chemical precursors to a polymer which bonds to, adheres to, adsorbs onto, or mix with and/or entangles with, once polymerized, the inorganic solid state electrolyte. A composite electrolyte may include an inorganic solid state electrolyte and monomers which can be polymerized to form a polymer which bonds to, adheres to, adsorbs onto, or mix with and/or entangles with, once polymerized, the inorganic solid state electrolyte. For example, a composite electrolyte may include a solid state electrolyte, e.g., a sulfide-including electrolyte, and epoxide monomers or epoxide-including polymers. In such an example, the epoxide monomers can be polymerized by polymerization techniques known in the art, such as but not limited light-initiated or chemical-initiated, polymerization.

As used here, the phrase "inorganic solid state electrolyte," refers to a material which does not include carbon and which conducts atomic ions (e.g., $Li^+$) but does not conduct electrons. An inorganic solid state electrolyte is a solid material suitable for electrically isolating the positive and negative electrodes of a lithium secondary battery while also providing a conduction pathway for lithium ions. Example inorganic solid state electrolytes include oxide electrolytes and sulfide electrolytes, which are further defined below. Non-limiting example sulfide electrolytes are found, for example, in U.S. Pat. No. 9,172,114, which issued Oct. 27, 2015, and also in US Provisional Patent Application 62/321,428, filed Apr. 12, 2016, now U.S. Non-Provisional Application No. 15/367,103, published as U.S. Patent Application Publication No. 2017/0162901. Non-limiting example oxide electrolytes are found, for example, in U.S. Patent Application Publication No. 2015/0200420 A1, which published Jul. 16, 2015 and issued as U.S. Pat. No. 9,806,372 on Oct. 31, 2017.

As used here, the phrase "directly contacts," refers to the juxtaposition of two materials such that the two materials contact each other sufficiently to conduct either an ionic or electronic current. As used herein, "direct contact" refers to two materials in physical contact with each other and which do not have any third material positioned between the two materials which are in direct contact.

As used herein, the phrase "inorganic material embedded in an organic material," refers to an inorganic material which is surrounded by and fixed to the organic material. In different examples, the organic material may be bonded to or adsorbed onto the inorganic material; or the organic material may entangle with surface attached species which are present on the inorganic material. In yet other examples, the organic material may completely surround the inorganic material. In yet other examples, the organic material may be molded around the inorganic material. In all of these examples, the inorganic material is fixed within the organic material, or surrounded by the organic material, such the inorganic material cannot physically move without breaking bonds to or within the organic material. The composites having a fixed inorganic material in an organic material, described herein, may have unique physical properties (e.g., fracture strength) which are not present in either the inorganic or organic materials individually.

As used herein, the phrase "fracture strength," refers to a measure of force required to break a material, e.g., a composite electrolyte, by inducing a crack or fracture therein. Fracture strength values recited herein were measured using the ring on ring test in Example 19. The ring-on-ring test is a measure of equibiaxial flexural strength and may be measured as specified in the ASTM C1499-09 standard. It is measured at ambient temperature.

As used herein the term "polyamine," refers to a molecule that includes more than one amino functional group on a given molecule. For example, diethylenetriamine (DETA) includes three amino functional groups on the DETA molecule. DETA is therefore a polyamine in so far as the term is used herein.

As used herein the term "aspect ratio," refers to a the ratio of the length to width of a particle. Aspect ratio is measured by focused-ion beam cross-section scanning electron microscopy. In the SEM image of a particle, the aspect ratio is calculated by determining the best-fit ellipse for the major axis)/(minor axis) of the best-fit ellipse.

As used here, the phrase "lithium-stuffed garnet electrolyte," refers to oxides that are characterized by a crystal structure related to a garnet crystal structure. Lithium-stuffed garnets include compounds having the formula $Li_4La_{aB}M'_cM''_DZr_EO_F$, $Li_4La_BM'_cM''_DTa_EO_F$ or $Li_4La_BM'_cM''_DNb_EO_F$, wherein $4<A<8.5$, $1.5<B<4$, $0\leq C\leq 2$, $0\leq D\leq 2$; $0\leq E\leq 2$, $10\leq F\leq 13$, and M' and M'' are each, independently in each instance selected from Al, Mo, W, Nb, Sb, Ca, Ba, Sr, Ce, Hf, Rb, or Ta, or $Li_aLa_bZr_cAl_dMe''O_f$, wherein $5<a<7.7$; $2<b<4$; $0<c\leq 2.5$; $0\leq d<2$; $0\leq e<2$, $10<f<13$ and Me'' is a metal selected from Nb, Ta, V, W, Mo, or Sb and as described herein. Garnets, as used herein, also include those garnets described above that are doped with $Al_2O_3$. Garnets, as used herein, also include those garnets described above that are doped so that $Al^{3+}$ substitutes for $Li^+$. As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (t1+t2+t3=subscript 2) so that the La:(Zr/Nb/Ta) ratio is 3:2. Also, garnet used herein includes, but is not limited to, $Li_xLa_3Zr_2O_{12}+yAl_2O_3$, wherein x ranges from 5.5 to 9; and y ranges from 0 to 1. In some examples x is 7 and y is 1.0. In some examples x is 7 and y is 0.35. In some examples x is 7 and y is 0.7. In some examples x is 7 and y is 0.4. Also, garnets as used herein include, but are not limited to, $Li_xLa_3Zr_2O_{12}+yAl_2O_3$. Non-limiting example lithium-stuffed garnet electrolytes are found, for example, in US Patent Application Publication No. 2015/0200420 A1, which published Jul. 16, 2015 and issued as U.S. Pat. No. 9,806,372 on Oct. 31, 2017.

As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein the term "porous," refers to a material that includes pores, e.g., nanopores, mesopores, or micropores.

As used herein the term "infiltrated," refers to the state wherein one material passes into another material, or when one material is caused to join another material. For example, if a porous Garnet is infiltrated with carbon, this refers to the process whereby carbon is caused to pass into and, or, intimately mix with the porous Garnet.

As used here, the phrase "sulfide electrolyte," refers to an inorganic solid state material that conducts Li$^+$ions but is substantially electronically insulating. Example LXPS materials are found, for example, in International PCT Patent Application No. PCT/US14/38283, filed May 15, 2014 and published as WO 2014/186634 on Nov. 20, 2014, and entitled SOLID STATE CATHOLYTE OR ELECTROLYTE FOR BATTERY USING $Li_4MP_BS_c$ (M=Si, Ge, AND/OR Sn); also, U.S. Pat. No. 8,697,292 to Kanno, et al., issued on Apr. 15, 2014, the contents of which are incorporated by reference in their entirety.

As used here, the phrase "sulfide electrolyte," includes, but are not limited to, LSS, LTS, LXPS, LXPSO, where X is Si, Ge, Sn, As, Al, LATS, also Li-stuffed garnets, or combinations thereof, and the like, S is S, Si, or combinations thereof, T is Sn.

As used here, "LSS" refers to lithium silicon sulfide which can be described as $Li_2S$—$SiS_2$, Li—$SiS_2$, Li—S—Si, and/or a catholyte consisting essentially of Li, S, and Si. LSS refers to an electrolyte material characterized by the formula $Li_xSi_yS_z$ where $0.33\leq x\leq 0.5$, $0.1\leq y\leq 0.2$, $0.4\leq z\leq 0.55$, and it may include up to 10 atomic % oxygen. LSS also refers to an electrolyte material comprising Li, Si, and S. In some examples, LSS is a mixture of $Li_2S$ and $SiS_2$. In some examples, the ratio of $Li_2S$:$SiS_2$ is 90:10, 85:15, 80:20, 75:25, 70:30, 2:1, 65:35, 60:40, 55:45, or 50:50 molar ratio. LSS may be doped with compounds such as $Li_xPO_y$, $Li_xBO_y$, $Li_4SiO_4$, $Li_3MO_4$, $Li_3MO_3$, PS, and/or lithium halides such as, but not limited to, LiI, LiCl, LiF, or LiBr, wherein $0<x\leq 5$ and $0<y\leq 5$.

As used here, "LTS" refers to a lithium tin sulfide compound which can be described as $Li_2S$—$SnS_2$, $Li_2S$—SnS, Li—S—Sn, and/or a catholyte consisting essentially of Li, S, and Sn. The composition may be $Li_xSn_yS_z$ where $0.25\leq x\leq 0.65$, $0.05\leq y\leq 0.2$, and $0.25\leq z\leq 0.65$. In some examples, LTS is a mixture of $Li_2S$ and $SnS_2$ in the ratio of 80:20, 75:25, 70:30, 2:1, or 1:1 molar ratio. LTS may include up to 10 atomic % oxygen. LTS may be doped with Bi, Sb, As, P, B, Al, Ge, Ga, and/or In. As used herein, "LATS" refers to LTS, as used above, and further comprising Arsenic (As).

As used here, "LXPS" refers to a material characterized by the formula $Li_aMP_bS_c$, where M is Si, Ge, Sn, and/or Al, and where $2\leq a\leq 8$, $0.5\leq b\leq 2.5$, $4\leq c\leq 12$. "LSPS" refers to an electrolyte material characterized by the formula $L_aSiP_bS_c$, where $2\leq a\leq 8$, $0.5\leq b\leq 2.5$, $4\leq c\leq 12$. LSPS refers to an electrolyte material characterized by the formula $L_aSiP_bS_c$, wherein, where $2\leq a\leq 8$, $0.5\leq b\leq 2.5$, $4\leq c\leq 12$, $d\leq 3$. Exemplary LXPS materials are found, for example, in International Patent Application No. PCT/US2014/038283, filed May 16, 2014 and published as WO 2014/186634 on Nov. 20, 2014, and entitled SOLID STATE CATHOLYTE OR ELECTROLYTE FOR BATTERY USING LIAMPBSc (M=Si, Ge, AND/OR Sn), which is incorporated by reference herein in its entirety. When M is Sn and Si —both are present—the LXPS material is referred to as LSTPS. As used herein, "LSTPSO," refers to LSTPS that is doped with, or has, O present. In some examples, "LSTPSO," is a LSTPS material with an oxygen content between 0.01 and 10 atomic %. "LSPS," refers to an electrolyte material having Li, Si, P, and S chemical constituents. As used herein "LSTPS," refers to an electrolyte material having Li, Si, P, Sn, and S chemical constituents. As used herein, "LSPSO," refers to LSPS that is doped with, or has, O present. In some examples, "LSPSO," is a LSPS material with an oxygen content between 0.01 and 10 atomic %. As used herein, "LATP," refers to an electrolyte material having Li, As, Sn, and P chemical constituents. As used herein "LAGP," refers to an electrolyte material having Li, As, Ge, and P chemical constituents. As used herein, "LXPSO" refers to a catholyte material characterized by the formula $Li_aMP_bS_cO_d$, where M is Si, Ge, Sn, and/or Al, and where $2 \leq a \leq 8$, $0.5 \leq b \leq 2.5$, $4 \leq c \leq 12$, $d<3$ LXPSO refers to LXPS, as defined above, and having oxygen doping at from 0.1 to about 10 atomic %. LPSO refers to LPS, as defined above, and having oxygen doping at from 0.1 to about 10 atomic %.

As used here, "LPS," refers to an electrolyte having Li, P, and S chemical constituents. As used herein, "LPSO," refers to LPS that is doped with or has O present. In some examples, "LPSO," is a LPS material with an oxygen content between 0.01 and 10 atomic %. LPS refers to an electrolyte material that can be characterized by the formula $Li_xP_yS_z$ where $0.33 \leq x \leq 0.67$, $0.07 \leq y \leq 0.2$ and $0.4 \leq z \leq 0.55$. LPS also refers to an electrolyte characterized by a product formed from a mixture of $Li_2S:P_2S_5$ wherein the molar ratio is 10:1, 9:1, 8:1, 7:1, 6:1 5:1, 4:1, 3:1, 7:3, 2:1, or 1:1. LPS also refers to an electrolyte characterized by a product formed from a mixture of $Li_2S:P_2S_5$ wherein the reactant or precursor amount of $Li_2S$ is 95 atomic % and $P_2S_5$ is 5 atomic %. LPS also refers to an electrolyte characterized by a product formed from a mixture of $Li_2S:P_2S_5$ wherein the reactant or precursor amount of $Li_2S$ is 90 atomic % and $P_2S_5$ is 10 atomic %. LPS also refers to an electrolyte characterized by a product formed from a mixture of $Li_2S:P_2S_5$ wherein the reactant or precursor amount of $Li_2S$ is 85 atomic % and $P_2S_5$ is 15 atomic %. LPS also refers to an electrolyte characterized by a product formed from a mixture of $Li_2S:P_2S_5$ wherein the reactant or precursor amount of $Li_2S$ is 80 atomic % and $P_2S_5$ is 20 atomic %. LPS also refers to an electrolyte characterized by a product formed from a mixture of $Li_2S:P_2S_5$ wherein the reactant or precursor amount of $Li_2S$ is 75 atomic % and $P_2S_5$ is 25 atomic %. LPS also refers to an electrolyte characterized by a product formed from a mixture of $Li_2S:P_2S_5$ wherein the reactant or precursor amount of $Li_2S$ is 70 atomic % and $P_2S_5$ is 30 atomic %. LPS also refers to an electrolyte characterized by a product formed from a mixture of $Li_2S:P_2S_5$ wherein the reactant or precursor amount of $Li_2S$ is 65 atomic % and $P_2S_5$ is 35 atomic %. LPS also refers to an electrolyte characterized by a product formed from a mixture of $Li_2S:P_2S_5$ wherein the reactant or precursor amount of $Li_2S$ is 60 atomic % and $P_2S_5$ is 40 atomic %.

As used here, LPSO refers to an electrolyte material characterized by the formula $Li_xP_yS_zO$, where $0.33 \leq x \leq 0.67$, $0.07 \leq y \leq 0.2$, $0.4 \leq z \leq 0.55$, $0 \leq w \leq 0.15$. Also, LPSO refers to LPS, as defined above, that includes an oxygen content of from 0.01 to 10 atomic %. In some examples, the oxygen content is 1 atomic %. In other examples, the oxygen content is 2 atomic %. In some other examples, the oxygen content is 3 atomic %. In some examples, the oxygen content is 4 atomic %. In other examples, the oxygen content is 5 atomic %. In some other examples, the oxygen content is 6 atomic %. In some examples, the oxygen content is 7 atomic %. In other examples, the oxygen content is 8 atomic %. In some other examples, the oxygen content is 9 atomic %. In some examples, the oxygen content is 10 atomic %.

As used here, the term "necked," refers to a particle to particle connectivity for particles in a polymer or solvent matrix. As necked electrolyte particles, these particle are in sufficient contact as to provide an ion conduction path through the particles and a polymer or solvent and by way of the particle to particle contacts. Necked can include particles that are sintered together, face sharing, edge sharing, corner sharing, or otherwise bonded together and which form a percolation network when composited with a polymer or solvent.

As used here, the phrase "sulfide based electrolytes," refers to electrolytes that include inorganic materials containing S which conduct ions (e.g., $Li^+$) and which are suitable for electrically insulating the positive and negative electrodes of an electrochemical cell (e.g., secondary battery). Exemplary sulfide based electrolytes are set forth in International Patent Application PCT Patent Application No. PCT/US14/38283, SOLID STATE CATHOLYTE OR ELECTROLYTE FOR BATTERY USING $LI_4MP_BS_C$ (M=SI, GE, AND/OR SN), filed May 15, 2014, and published as WO 2014/186634, on Nov. 20, 2014, which is incorporated by reference herein in its entirety.

As used here, examples of the materials in International Patent Application PCT Patent Application Nos. PCT/US2014/059575 and PCT/US2014/059578, both entitled GARNET MATERIALS FOR LI SECONDARY BATTERIES AND METHODS OF MAKING AND USING GARNET MATERIALS, filed Oct. 7, 2014 and published as WO 2015/054320 on Apr. 16, 2015 and as WO 2015/076944 on May 28, 2015 respectively, which are incorporated by reference herein in their entirety, are suitable for use as the inorganic solid state electrolytes described herein, also as the oxide based electrolytes, described herein, and also as the garnet electrolytes, described herein.

As used here, the term "electrolyte," refers to a material that allows ions, e.g., $Li^+$, to migrate therethrough but which does not allow electrons to conduct therethrough. Electrolytes are useful for electrically isolating the cathode and anodes of a secondary battery while allowing ions, e.g., $Li+$, to transmit through the electrolyte. Solid electrolytes, in particular, rely on ion hopping through rigid structures. Solid electrolytes may be also referred to as fast ion conductors or super-ionic conductors. Solid electrolytes may be also used for electrically insulating the positive and negative electrodes of a cell while allowing for the conduction of ions, e.g., $Li+$, through the electrolyte. In this case, a solid electrolyte layer may be also referred to as a solid electrolyte separator.

As used herein, the phrase "film thickness" refers to the distance, or median measured distance, between the top and bottom faces of a film. As used herein, the top and bottom faces refer to the sides of the film having the largest surface area.

As used herein, the term "grains" refers to domains of material within the bulk of a material that have a physical boundary which distinguishes the grain from the rest of the material. For example, in some materials both crystalline and amorphous components of a material, often having the same chemical composition, are distinguished from each other by the boundary between the crystalline component and the amorphous component. The approximate diameter of the boundaries of a crystalline component, or of an amorphous component, is referred herein as the grain size.

As used herein, the phrase "$d_{50}$ diameter" refers to the median size, in a distribution of sizes, measured by microscopy techniques or other particle size analysis techniques, such as, but not limited to, scanning electron microscopy or dynamic light scattering. $D_{50}$ includes the characteristic dimension at which 50% of the particles are smaller than the recited size.

As used herein the phrase "casting a film," refers to the process of delivering or transferring a liquid or a slurry into a mold, or onto a substrate, such that the liquid or the slurry forms, or is formed into, a film. Casting may be done via doctor blade, Meyer rod, comma coater, gravure coater, microgravure, reverse comma coater, slot dye, slip and/or tape casting, and other methods known to those skilled in the art.

As used herein, the phrase "slot casting," refers to a deposition process whereby a substrate is coated, or deposited, with a solution, liquid, slurry, or the like by flowing the solution, liquid, slurry, or the like, through a slot or mold of fixed dimensions that is placed adjacent to, in contact with, or onto the substrate onto which the deposition or coating occurs. In some examples, slot casting includes a slot opening of about 1 to 100 μm.

As used herein, the phrase "dip casting" or "dip coating" refers to a deposition process whereby substrate is coated, or deposited, with a solution, liquid, slurry, or the like, by moving the substrate into and out of the solution, liquid, slurry, or the like, often in a vertical fashion.

As used herein, the term "laminating" refers to the process of sequentially depositing a layer of one precursor specie, e.g., a lithium precursor specie, onto a deposition substrate and then subsequently depositing an additional layer onto an already deposited layer using a second precursor specie, e.g., a transition metal precursor specie. This laminating process can be repeated to build up several layers of deposited vapor phases. As used herein, the term "laminating" also refers to the process whereby a layer comprising an electrode, e.g., positive electrode or cathode active material comprising layer, is contacted to a layer comprising another material, e.g., garnet electrolyte. The laminating process may include a reaction or use of a binder which adheres of physically maintains the contact between the layers which are laminated.

As used herein, the phrase "green film" refers to an unsintered film including at least one member selected from garnet materials, precursors to garnet materials, binder, solvent, carbon, dispersant, or combinations thereof.

As used herein the term "making," refers to the process or method of forming or causing to form the object that is made. For example, making an energy storage electrode includes the process, process steps, or method of causing the electrode of an energy storage device to be formed. The end result of the steps constituting the making of the energy storage electrode is the production of a material that is functional as an electrode.

As used herein, the phrase "providing" refers to the provision of, generation or, presentation of, or delivery of that which is provided.

As used herein, the phrases "garnet precursor chemicals," "chemical precursor to a Garnet-type electrolyte," or "garnet chemical precursors" refers to chemicals which react to form a lithium stuffed garnet material described herein. These chemical precursors include, but are not limited to, lithium hydroxide (e.g., LiOH), lithium oxide (e.g., $Li_2O$), lithium carbonate (e.g., $LiCO_3$), zirconium oxide (e.g., $ZrO_2$), lanthanum oxide (e.g., $La_2O_3$), aluminum oxide (e.g., $Al_2O_3$), aluminum (e.g., Al), aluminum nitrate (e.g., $AlNO_3$), aluminum nitrate nonahydrate, niobium oxide (e.g., $Nb_2O_5$), and tantalum oxide (e.g., $Ta_2O_5$).

As used herein the phrase "garnet-type electrolyte," refers to an electrolyte that includes a garnet or lithium stuffed garnet material described herein as the ionic conductor.

As used herein the phrase "antiperovskite" refers to an electrolyte characterized by the antiperovskite crystal structure. Exemplary antiperovskites are found, for example, in U.S. patent application Ser. No. 13/777,602, filed Feb. 26, 2013 and issued as U.S. Pat. No. 9,017,777 on Apr. 28, 2015. Antiperovskites include but are not limited to $Li_3OBr$ or $Li_3OCl$.

As used herein, the phrase "subscripts and molar coefficients in the empirical formulas are based on the quantities of raw materials initially batched to make the described examples" means the subscripts, (e.g., 7, 3, 2, 12 in $Li_7La_3Zr_2O_{12}$ and the coefficient 0.35 in $0.35Al_2O_3$) refer to the respective elemental ratios in the chemical precursors (e.g., LiOH, $La_2O_3$, $ZrO_2$, $Al_2O_3$) used to prepare a given material, (e.g., $Li_7La_3Zr_2O_{12} \cdot 0.35Al_2O_3$). As used here, the phrase "characterized by the formula," refers to a molar ratio of constituent atoms either as batched during the process for making that characterized material or as empirically determined.

As used herein, the term "back-fill," refers to a process whereby void spaces, textured spaces, porosity spaces, or available surface area of a sintered inorganic electrolyte is covered, contacted with, or infiltrated by a species, such as but not limited to a polymer or a binder. The covering, contacting, or infiltrating of the sintered electrolyte with a polymer may, in some examples, be assisted with the use of a solvent, or combination of solvents, and, or, dispersants, surfactants, or combinations thereof. In some examples, backfilling includes a step of infiltrating, covering or contacting the sintered electrolyte with a polymer and optionally a solvent, dispersant, surfactant, or combination thereof, followed by a step in which the sintered electrolyte having a back-filled polymer therein is dried to remove the solvent.

As used herein the term "solvent," refers to a liquid that is suitable for dissolving or solvating a component or material described herein. For example, a solvent includes a liquid, e.g., toluene, which is suitable for dissolving a component, e.g., the binder, used in the garnet sintering process.

As used herein the phrase "removing a solvent," refers to the process whereby a solvent is extracted or separated from the components or materials set forth herein. Removing a solvent includes, but is not limited to, evaporating a solvent. Removing a solvent includes, but is not limited to, using a vacuum or a reduced pressure to drive off a solvent from a mixture, e.g., an unsintered thin film. In some examples, a thin film that includes a binder and a solvent is heated or also optionally placed in a vacuum or reduced atmosphere environment in order to evaporate the solvent to leave the binder, which was solvated, in the thin film after the solvent is removed.

As used herein the phrase "sintering the film," refers to a process whereby a thin film, as described herein, is densified (made denser, or made with a reduced porosity) through the use of heat sintering or field assisted sintering. Sintering includes the process of forming a solid mass of material by heat and/or pressure without melting it to the point of complete liquification.

Composites

Set forth herein are a variety of composite electrolytes.

In some examples, set forth herein is an electrolyte including an inorganic material embedded in an organic material. In some examples, the electrolyte has a fracture strength of greater than 5 MPa and less than 250 MPa. In certain examples, the organic material does not conduct $Li^+$ ions.

In some examples herein, the organic material in the composite electrolyte is bonded to, adsorbed on, molded around, or entangled with the surface of the inorganic material, a surface attached species on the surface of the inorganic material, or an inorganic material particle.

In some examples, the organic material is bonded to the surface of the inorganic material. In certain examples, the organic material is bonded to the surface of the inorganic material by covalent, ionic, electrostatic, or van Der Waals bonds. In certain other examples, the organic material is bonded to the surface of the inorganic material by covalent, ionic, electrostatic, or van Der Waals bonds and has a lithium ion conductivity of less than 1e-8S/cm at 80° C. In yet other examples, the organic material is bonded to the surface of the inorganic material by non-covalent bonds.

In some examples, the organic material includes a functional group selected from a carboxylic acid, an ester, an amide, an amine, a silane, sulfonic acid, a phosphate, a phosphine oxide, a phosphoric acid, an alkoxide, a nitrile, a thioether, thiol, and combinations thereof. In some examples, the organic material includes a carboxylic acid. In some examples, the organic material includes an ester. In some examples, the organic material includes an amine. In some examples, the organic material includes a silane. In some examples, the organic material includes a sulfonic acid. In some examples, the organic material includes a phosphate. In some examples, the organic material includes a phosphine. In some examples, the organic material includes an epoxide. In some examples, the organic material includes a nitrile. In some examples, the organic material includes a thiol. In some examples, the organic material includes a thio-ether.

In certain examples, the inorganic material includes a surface species which reacts with a functional group selected from an epoxide, a carboxylic acid, an ester, an amide, an amine, a sulfonic acid, a phosphate, a phosphine oxide, a phosphoric acid, an alkoxides, a nitrile, a thioether, thiol, and combinations thereof.

In some of the composite electrolytes disclosed herein, the surface species on the inorganic material is selected from a thiol, a hydroxide, a sulfide, an oxide, and a combination thereof. In other examples, the surface specie is a monomer, oligomer, or polymer attached to the surface of the inorganic material.

In some of the composite electrolytes disclosed herein, the inorganic material comprises a surface species which interacts with a functional group selected from an epoxide, carboxylic acid, an ester, an amide, an amine, a sulfonic acid, a phosphate, a phosphine oxide, a phosphoric acid, an alkoxides, a nitrile, a thioether, thiol, and combinations thereof.

In some of the composite electrolytes disclosed herein, the organic material has polar functional groups.

In some of the composite electrolytes disclosed herein, the organic material is absorbed within the inorganic material.

In some of the composite electrolytes disclosed herein, the surface of the inorganic material is roughened and the organic material is adsorbed within the roughened surface of the inorganic material.

In some of the composite electrolytes disclosed herein, the organic material is molded around the inorganic material.

In some of the composite electrolytes disclosed herein, the organic material is polymerized around the inorganic material.

In some of the composite electrolytes disclosed herein, the organic material is entangled with the inorganic material.

In some of the composite electrolytes disclosed herein, the organic material is entangled with a surface species which is present on the inorganic material.

In some examples herein, the inorganic material comprises necked-particles of inorganic material.

In any of the examples herein, the electrolyte may be a solid.

In some of the composite electrolytes disclosed herein, the electrolyte is a solid thin film having a thickness between 1 nm and 100 μm. In some of the composite electrolytes disclosed herein, the electrolyte is a solid thin film having a thickness between 10, 20, 30, 40, 50, 60, 70, 80, or 90 μm. In some of the composite electrolytes disclosed herein, the electrolyte is a solid thin film having a thickness between 500 μm to 800 μm.

In some of the composite electrolytes disclosed herein, the inorganic material is a solid state electrolyte.

In some of the composite electrolytes disclosed herein, the inorganic material is a solid state electrolyte selected from a lithium-stuffed garnet oxide, an antiperovskite oxide, a lithium borohydride, a lithium iodide-containing material and a lithium sulfide-containing material. In some of the composite electrolytes disclosed herein, the inorganic material is a solid state electrolyte selected from a lithium-stuffed garnet oxide. In some of the composite electrolytes disclosed herein, the inorganic material is a solid state electrolyte selected from an antiperovskite. In some of the composite electrolytes disclosed herein, the inorganic material is a solid state electrolyte selected from lithium borohydride. In some of the composite electrolytes disclosed herein, the inorganic material is a solid state electrolyte selected from a lithium iodide-containing material. In some of the composite electrolytes disclosed herein, the inorganic material is a solid state electrolyte selected from a lithium sulfide-containing material.

In some examples, the inorganic material is a solid state electrolyte of a lithium-stuffed garnet oxide characterized by the formula $Li_uLa_vZr_xO_y \cdot zAl_2O_3$, wherein u is a rational number from 4 to 10; v is a rational number from 2 to 4; x is a rational number from 1 to 3; y is a rational number from 10 to 14; and z is a rational number from 0 to 1; wherein u, v, x, y, and z are selected so that the lithium-stuffed garnet oxide is charge neutral.

In some examples, the inorganic material in a composite electrolyte is a lithium-stuffed garnet oxide characterized by the formula $Li_uLa_3Zr_2O_{12} \cdot zAl_2O_3$, wherein $4 \leq u \leq 10$ and $0 < z \leq 1$ In some examples, the inorganic material in a composite electrolyte is a lithium-stuffed garnet oxide is characterized by the formula $Li_{6.75-7.1}La_3Zr_2O_{12}0.5Al_2O_3$ or $Li_{6.4-7.7}La_3Zr_2O_{12} \cdot 0.11Al_2O_3$.

In some examples, the inorganic material in a composite electrolyte is a solid state electrolyte selected from a lithium sulfide characterized by one of the following Formula $Li_aSi_bSn_cP_dS_eO_f$, wherein 2≤a≤8, b+c=1, 0.5≤d≤2.5, 4≤e≤12, and 0<f≤10;

$Li_gAs_hSn_jS_kO_l$, wherein 2≤g≤6, 0≤h≤1, 0≤j≤1, 2≤k≤6, and 0≤l≤10;

$Li_mP_nS_pI_q$, wherein 2≤m≤6, 0≤n≤1, 0≤p≤1, 2≤q≤6;

a mixture of $(Li_2S):(P_2S_5)$ having a molar ratio from about 10:1 to about 6:4 and LiI, wherein the ratio of [$(Li_2S):(P_2S_5)$]:LiI is from 95:5 to 50:50;

a mixture of LiI and $Al_2O_3$;

$Li_3N$;

LPS+X, wherein X is selected from Cl, I, or Br;

$vLi_2S+wP_2S_5+yLiX$;

$vLi_2S+wSiS_2+yLiX$;

$vLi_2S+wB_2S_3+yLiX$;

a mixture of $LiBH_4$ and LiX wherein X is selected from Cl, I, or Br; or $vLiBH_4+wLiX+yLiNH_2$, wherein X is selected from Cl, I, or Br; and wherein coefficients v, w, and y are rational numbers from 0 to 1.

In some examples, the inorganic material in a composite electrolyte is a solid state electrolyte selected from a lithium sulfide characterized by $Li_{10}Si_{0.5}Sn_{0.5}P_2S_{12}$ and $Li_{7.4}P_{1.6}S_{7.2}I$.

In some examples, the inorganic material in a composite electrolyte is a solid state electrolyte selected from a lithium sulfide characterized by $Li_{7.4}P_{1.6}S_{7.2}I$.

In some examples, the composite electrolyte herein includes an organic material which is a polymer. In some examples, the organic material is a polymer selected from the group consisting of polyolefins, natural rubbers, synthetic rubbers, polybutadiene, polyisoprene, epoxidized natural rubber, polyisobutylene, polypropylene oxide, polyacrylates, polymethacrylates, polyesters, polyvinyl esters, polyurethanes, styrenic polymers, epoxy resins, epoxy polymers, poly(bisphenol A-co-epichlorohydrin), vinyl polymers, polyvinyl halides, polyvinyl alcohol, polyethyleneimine, poly(maleic anhydride), silicone polymers, siloxane polymers, polyacrylonitrile, polyacrylamide, polychloroprene, polyvinylidene fluoride, polyvinyl pyrrolidone, polyepichlorohydrin, and blends or copolymers thereof. In certain examples, the polymer is polyolefins. In certain examples, the polymer is natural rubbers. In certain examples, the polymer is synthetic rubbers. In certain examples, the polymer is polybutadiene. In certain examples, the polymer is polyisoprene. In certain examples, the polymer is epoxidized natural rubber. In certain examples, the polymer is polyisobutylene. In certain examples, the polymer is polypropylene oxide. In certain examples, the polymer is polyacrylates. In certain examples, the polymer is polymethacrylates. In certain examples, the polymer is polyesters. In certain examples, the polymer is polyvinyl esters. In certain examples, the polymer is polyurethanes. In certain examples, the polymer is styrenic polymers. In certain examples, the polymer is epoxy resins. In certain examples, the polymer is epoxy polymers. In certain examples, the polymer is poly(bisphenol A-co-epichlorohydrin). In certain examples, the polymer is vinyl polymers. In certain examples, the polymer is polyvinyl halides. In certain examples, the polymer is polyvinyl alcohol. In certain examples, the polymer is polyethyleneimine. In certain examples, the polymer is poly(maleic anhydride). In certain examples, the polymer is silicone polymers. In certain examples, the polymer is siloxane polymers. In certain examples, the polymer is polyacrylonitrile. In certain examples, the polymer is polyacrylamide. In certain examples, the polymer is polychloroprene. In certain examples, the polymer is polyvinylidene fluoride. In certain examples, the polymer is polyvinyl pyrrolidone. In certain examples, the polymer is polyepichlorohydrin. In some examples, molecular weight of the polymer is greater than 50,000 g/mol.

In some examples, the polymer is preformed and selected from the group consisting of polypropylene, polyethylene, polybutadiene, polyisoprene, epoxidized natural rubber, poly(butadiene-co-acrylonitrile), polyethyleneimine, polydimethylsiloxane, and poly(ethylene-co-vinyl acetate). In some examples, the molecular weight of the polymer is greater than 50,000 g/mol.

In some examples, the organic material comprises one or more polymerizable or crosslinkable members selected from the group consisting of vinyl esters, acrylates, methacrylates, styrenic monomers, vinyl-functionalized oligomers of polybutadiene, vinyl-functionalized oligomers of polysiloxanes, and mixtures thereof.

In some examples, the organic material comprises one or more crosslinkable members selected from the group consisting of diglycidyl ethers, epoxy resins, polyamines, and mixtures thereof.

In some examples, the organic material comprises one or more polymerizable monomers selected from the group consisting of vinyl esters, acrylates, methacrylates, styrenic monomers.

In some examples, the organic material comprises one or more crosslinkable members selected from the group consisting of diglycidyl ethers, triglycidyl ethers, epoxy resins, polyamines.

In some examples, the organic material comprises one or more crosslinkable oligomers selected from the group consisting of vinyl-functionalized oligomers of polybutadiene, polysiloxanes, and mixtures thereof.

In some examples, the organic material comprises an epoxy resin.

In some examples, the organic material comprises an epoxy polymer precursor selected from the group consisting of bisphenol A diglycidyl ether (DGEBA), poly(bisphenol A-co-epichlorohydrin) glycidyl end-capped polymers, diethylenetriamine (DETA) and derivatives thereof, tetraethylenepentamine and derivatives thereof, polyethyleneimine, carboxyl-terminated poly(butadiene-co-acrylonitrile), amine-terminated poly(butadiene-co-acrylonitrile), poly(propylene glycol) diglycidyl ether, poly(propylene glycol) bis(2-aminopropyl ether), and combinations thereof.

In some examples, the organic material comprises an epoxy polymer precursor selected from the group consisting of bisphenol A diglycidyl ether (DGEBA), poly(bisphenol A-co-epichlorohydrin) glycidyl end-capped polymers, diethylenetriamine (DETA) and derivatives thereof, tetraethylenepentamine and derivatives thereof, polyethyleneimine, and combinations thereof.

In some examples, the composite further includes carboxyl-terminated poly(butadiene-co-acrylonitrile), amine-terminated poly(butadiene-co-acrylonitrile), poly(propylene glycol) diglycidyl ether, poly(propylene glycol) bis(2-aminopropyl ether), or combinations thereof.

In some examples, the organic material comprises an epoxy polymer of bisphenol A diglycidyl ether (DGEBA), diethylenetriamine (DETA), and amine-terminated poly(butadiene-co-acrylonitrile).

In some examples, the organic material comprises an epoxy polymer of bisphenol A diglycidyl ether (DGEBA), diethylenetriamine (DETA), and poly(propylene glycol) bis(2-aminopropyl ether).

In some examples, the composite includes a polymer of bisphenol A diglycidyl ether and diethylenetriamine (DETA).

In some examples, the organic material comprises a polymer of bisphenol A diglycidyl ether and diethylenetriamine (DETA).

In some examples, the composite includes a polymer of bisphenol A diglycidyl ether (DGEBA) and poly(propylene glycol) bis(2-aminopropyl ether).

In some examples, the organic material comprises a polymer of bisphenol A diglycidyl ether (DGEBA) and poly(propylene glycol) bis(2-aminopropyl ether).

In some examples, the poly(propylene glycol) bis(2-aminopropyl ether) has a molecular weight (g/mol) of about 100 to 50,000.

In some examples, the poly(propylene glycol) bis(2-aminopropyl ether) has a molecular weight (g/mol) of about 230 to 4000.

In some examples, the inorganic material has a silane attached to its surface.

In some examples, the silane is selected from trichlorosilanes, trimethoxysilanes, and triethoxysilanes. In some examples, the trichlorosilane is 3-methacryloxypropyltrichlorosilane. In some examples, the trimethoxysilane is 3-acryloxypropyltrichlorosilane.

In some examples, the trichlorosilane is 7-octenyltrimethoxysilane.

In certain examples, herein, the inorganic material has a functional group attached to its surface. In some examples, the functional group is selected from an anhydride, a disulfide, an epoxide, a carboxylic acid or an alkylhalide.

In some examples, the inorganic material is functionalized with silane and wherein the organic material is a polymer selected from polybutadiene.

In some examples, the electrolyte is directly in contact with a gel electrolyte.

In some examples, the electrolyte has a fracture strength of greater than 5 MPa and less than 250 MPa. In certain examples, the electrolyte or composite electrolyte herein has a fracture strength of 50 MPa.

In certain examples, the electrolyte or composite electrolyte herein has a fracture strength of 25 to 75 MPa.

Herein, the fracture strength is measured by a ring-on-ring test.

In some examples, the electrolyte or composite electrolyte, herein, does not form lithium metal dendrites when used in an electrochemical device, having a lithium metal negative electrode, and cycled at 1 mA/cm$^2$Li$^+$ ion current density.

In some examples, the electrolyte or composite electrolyte, herein, prevents the formation of lithium metal dendrites when used in an electrochemical device, having a lithium metal negative electrode, and cycled at 1 mA/cm$^2$Li$^+$ ion current density.

In some examples, the electrolyte or composite electrolyte, herein, does not form lithium metal dendrites for at least 20 cycles when used in an electrochemical device, having a lithium metal negative electrode, and cycled at 1 mA/cm$^2$Li$^+$ ion current density at a temperature of 45° C. and a one-way charge of at least 2 mAh/cm$^2$ per half-cycle.

In some examples, the electrolyte or composite electrolyte, herein, prevents the formation of lithium metal dendrites for at least 20 cycles when used in an electrochemical device, having a lithium metal negative electrode, and cycled at 1 mA/cm$^2$Li$^+$ ion current density at a temperature of 45° C. and a one-way charge of at least 2 mAh/cm$^2$ per half-cycle.

In some examples, the electrolyte or composite electrolyte, herein, is polished on its exterior surface.

In some examples, the electrolyte or composite electrolyte, herein, has an ASR of between 0 and 20 $\Omega \cdot$cm$^2$ when measured at 45° C.

In some examples, the electrolyte or composite electrolyte, herein, is polished on its exterior surface. In some examples, the electrolyte or composite electrolyte, herein, is chemically etched on its exterior surface. In some examples, the electrolyte or composite electrolyte, herein, is plasma-treated on its exterior surface.

In some examples, the electrolyte or composite electrolyte, herein, has a total ASR of between 0 and 200 $\Omega \cdot$cm$^2$ at 45° C. In certain examples, the electrolyte has a total ASR of between 0 and 100 $\Omega \cdot$cm$^2$ at 45° C. In certain other examples, the electrolyte has a total ASR of between 50 and 100 $\Omega \cdot$cm$^2$ at 45° C. In yet other examples, the electrolyte has an ASR of between 0 and 20 $\Omega \cdot$cm$^2$. In some other examples, the electrolyte has an ASR of between 0 and 10 $\Omega \cdot$cm$^2$.

In some examples, the electrolyte or composite electrolyte, herein, has a room temperature Li$^+$ ion conductivity greater than 10$^{-5}$ S/cm.

In some examples, the electrolyte or composite electrolyte, herein, has a room temperature Li$^+$ ion conductivity greater than 10$^{-4}$ S/cm.

In some examples, the electrolyte or composite electrolyte, herein, has a room temperature Li$^+$ ion conductivity greater than 10$^{-3}$ S/cm.

In some examples, the electrolyte or composite electrolyte, herein, includes an inorganic material and an organic material in a weight ratio of (inorganic material):(organic material) of 0 to 99.

In some examples, the electrolyte or composite electrolyte, herein, includes an inorganic material and an organic material in a weight ratio of (inorganic material):(organic material) of at least 1:1 to 99:1.

In some examples, the electrolyte or composite electrolyte, herein, includes an inorganic material and an organic material in a weight ratio of (inorganic material):(organic material) of at least 80:20 to 99:1.

In some examples, the electrolyte or composite electrolyte, herein, includes an inorganic material and an organic material in a weight ratio of (inorganic material):(organic material) of at least 85:15 to 99:1.

In some examples, disclosed is an electrochemical cell which includes a positive electrode, a negative electrode, and a composite electrolyte layer. The composite electrolyte layer is positioned between the positive electrode and negative electrode and includes a polymer and an inorganic solid state electrolyte. In some examples, the composite electrolyte layer which is positioned between the positive electrode and negative electrode includes a composite electrolyte disclosed herein. In some examples, the volumetric ratio of inorganic solid state electrolyte to polymer is >1. In some other examples, the volumetric ratio of inorganic solid state electrolyte to polymer is greater than 1, 2, 3, 4, 5, 6, 7, 8, 9, or 10. In some examples herein, the positive electrode and negative electrodes directly contact an inorganic solid state electrolyte.

In some examples, set forth herein are composites of electrolytes and epoxides. In some examples, set forth herein are composites of electrolytes and epoxy resins. In some examples, the composites of electrolytes and epoxides, epoxy resins, or combinations thereof also include curatives, hardeners, additives, tougheners, flexibilizers, plasticizers, and other epoxy components. In some examples, the composite electrolytes set forth herein include any of the epoxides, epoxy resins, or components, analogs, and derivatives thereof which are set forth in "Epoxy Structural Adhesives," in Structural Adhesives: Chemistry and Technology (1986), S. R. Hartshorn (ed.); or set forth in "Epoxy Resins," by H. Q. Pham and M. J. Marks, in Ullmann's Encyclopedia of Industrial Chemistry (2010); or set forth in "Epoxy Resins," by S. H. Goodman, in the Handbook of Thermoset Plastics, $2^{nd}$ Edition (1998)

As a general observation, mechanical characteristics of these composite electrolytes may improve as more polymers are added into the compositions. However, excessive amounts of polymers may deteriorate electrolyte characteristics. For example, the polymer may not conduct lithium ions, in which case increasing the amount of polymer will reduce the conductance of the separator film leading to higher resistance and lower power. In another example, increasing the polymer content is a processing challenge because the specific polymer of choice may confer a viscosity that is either too high or too low to make the desired film. In some examples, the solid state electrolyte is mechanically mixed with a polymer and then extruded from the mixer to form composite thin films. If the viscosity is too high or too low, the extrusion process can be detrimentally affected. In some examples, the solid state electrolyte and the polymer may phase separate, or the polymer may delaminate from the electrolyte, if the extrusion process is detrimentally affected by a viscosity that is either too high or too low. At the same time, the minimum amount of polymers needed to see any effects on mechanical characteristics may depend on the solid electrolyte particle size, particle shape, and other like factors.

In the methods set forth herein, other processes may be substituted for extrusion processes. For example, casting methods may include extrusion, injection molding, melt processing, casting and calendering, drying and calendering, wet calendering, wet milling and calendering, dry blending, and other known techniques in the relevant field for producing thin films In some examples, disclosed is an electrochemical cell wherein the inorganic solid state electrolyte is spherical and has an aspect ratio of about 1. In certain examples, the inorganic solid state electrolyte is sintered or necked. As used herein, sintered means that the inorganic components are denser, more compact, or in greater contact with other inorganic components, than would be the case if the components were not sintered. Sintering of the components can be accomplished by heat treatment, pressure treatment, or both heat and pressure treatment. As used herein, necked means that the inorganic components (e.g., particles) are in contact with other inorganic components by way of, for example, fused sides or edges, bonded sides or edges, or other particle to particle contact. Necked particles can form a network through the composite electrolyte through which $Li^+$ ions can conduct.

In some examples, disclosed is an electrochemical cell wherein the inorganic solid state electrolyte is a lithium-stuffed garnet electrolyte or a sulfide electrolyte. In some other examples, disclosed is an electrochemical cell, wherein the solid state electrolyte is a lithium-stuffed garnet electrolyte characterized by the formula $Li_yLa_3Zr_2O_{12}.XAl_2O_3$, wherein $4 \leq y \leq 10$ and $0 < X \leq 1$. In some examples, the solid state electrolyte is a sulfide electrolyte characterized by the formula $Li_aSi_bSn_cP_dS_eO_f$, wherein $2 \leq a \leq 8$, $b+c=1$, $0.5 \leq d \leq 2.5$, $4 \leq e \leq 12$, and $0 < f \leq 10$; or $Li_gAs_hSn_jS_kO_l$, wherein $2 \leq g \leq 6$, $0 \leq h \leq 1$, $0 \leq j \leq 1$, $2 \leq k \leq 6$, and $0 \leq l \leq 10$. In some examples, the solid state electrolyte is an LPS:LiI electrolyte, wherein LPS is a mixture of $Li_2S:P_2S_5$ having a molar ratio from about 10:1 to about 6:4, wherein and the molar ratio of LPS:LiI is from 95:5 to 70:30.

In some examples, disclosed is an electrochemical cell wherein the solid state electrolyte is a powder. In some other examples, the solid state electrolyte is a monolith back-filled with polymer. In certain examples, the powder is characterized by a particle size distribution (PSD) between about 0.5 μm to about 50 μm. In some examples, the powder is characterized by a particle size distribution (PSD) between about 10 μm to about 20 μm.

In some examples, disclosed is an electrochemical cell wherein the polymer is selected from nitriles, nitrile butadiene rubber, carboxymethyl cellulose (CMC), styrene butadiene rubber (SBR), polybutadiene rubber (PB), polyisoprene rubber (PI), polychloroprene rubber (CR), acrylonitrile-butadiene rubber (NBR), polyethyl acrylate (PEA), polyvinylidene fluoride (PVDF), aqueous-compatible polymers, silicone, PMX-200 (polydimethylsiloxane, PDMS), methyl methacrylate, ethyl methacrylate, polypropylene (PP), polyvinylbutyral (PVB), poly ethyl methacrylate (PMMA), polyvinyl pyrrolidone (PVP), atactic polypropylene (aPP), isotactive polypropylene (iPP), ethylene propylene rubber (EPR), ethylene pentene copolymer (EPC), polyisobutylene (PM), styrene butadiene rubber (SBR), polyolefins, polyethylene-copoly-1-octene (PE-co-PO), PE-co-poly(methylene cyclopentane)(PE-co-PMCP), stereo block polypropylenes, polypropylene polymethylpentene copolymer, polypropylene carbonate, silicone, polyethylene (e.g., low density linear polyethylene), polybutadiene, and combinations thereof.

In some examples, the polymer includes a non-conducting polymer. In some examples, the polymer is not ion-conducting. In some examples, the polymer included with the composite electrolytes described herein has a $Li^+$ ion conductivity less than $10^{-5}$ S/cm. In some examples, the polymer included with the composite electrolytes described herein has a $Li^+$ ion conductivity less than $10_{-6}$ S/cm. In some examples, the polymer included with the composite electrolytes described herein has a $Li^+$ ion conductivity less than $10_{-7}$ S/cm. In some examples, the polymer included with the composite electrolytes described herein has a $Li^+$ ion conductivity less than $10^{-8}$ S/cm.

In some examples, the polymer includes a polymer selected from nitriles, nitrile butadiene rubber, carboxymethyl cellulose (CMC), styrene butadiene rubber (SBR), poly(vinylidene) fluoride (PVDF); PAN, PVC, aqueous-compatible polymers, atactic polypropylene (aPP), silicone, polyisobutylene (PM), ethylene propylene rubber (EPR), PMX-200 PDMS (polydimethylsiloxane/polysiloxane, i.e., PDMS or silicone), polyacrylonitrile (PAN), polymethylmethacrylate (PMMA), poly vinylchloride (PVC), poly(vinylidene) fluoride-hexafluoropropylene PVDF-HFP.

In some examples, the polymer is chemically bonded to the electrolyte. In some of these examples, the polymer is physically or chemically bonded to the electrolyte. For example, in some embodiments, the polymer includes functional groups (e.g., carboxylate, thiol, hydroxyl) which can react with function groups or with reactive species in or on the electrolyte. For example, the sulfur atoms in a sulfide electrolyte can bond to a thiol group on a polymer to form a bridging S—S bond which adheres the polymer to the sulfide electrolyte's surface. In yet other of these examples, the polymer is physisorbed to the electrolyte's surface. For example, in some embodiments, the polymer adheres to the electrolyte by way of van de Waals forces. In some examples, the polymer is chemisorbed to the electrolyte's surface.

In some examples, the composite film has ceramic particles which have been functionalized with specific organic compounds to increase the adhesion between the ceramic and the polymer component. The functionalization may be accomplished by covalent bonding, coordination, and, or physical adsorption.

In some examples, the covalent bonding approaches to improving the adhesive strength between the polymer and the ceramic may be accomplished by reacting specific chemical functional groups with the ceramic surface. In particular, those functional groups may be selected from alkyl halides, anhydrides, epoxides, disulfides, isocyantes, silanes, silicates, esters, hydroxyls, amines, amides, or nitriles.

In some examples, the coordination boding approaches to improving the adhesive strength between the polymer and the ceramic could be accomplished by the interaction of the ceramic with specific functional groups, which may include carboxylates, esters, ethers, hydroxyls, amines, pyridines, amides, nitriles, phosphates, thioethers, or thiols.

In some examples, the physical adsorption approaches to improving the adhesive strength between the polymer and the ceramic could be accomplished by using polymers of certain types, including those selected from the following classes: thioethers, alkyl ionic compounds, and homopolymers and block copolymers containing polar functionalities.

In some examples, disclosed is an electrochemical cell wherein the volumetric ratio of inorganic solid state electrolyte to polymer is between 99:1 and 51:49.

In some examples, disclosed is an electrochemical cell wherein the positive electrode includes oxide intercalation materials selected from the group consisting of $LiMPO_4$ (M=Fe, Ni, Co, Mn), $Li_xTi_yO_z$, wherein x is from 0 to 8, y is from 1 to 12, z is from 1 to 24, $LiMn_2O_4$, $LiMn_{2-a}Ni_aO_4$, wherein a is from 0 to 2, $LiCoO_2$, $Li(NiCoMn)O_2$, $Li(NiCoAl)O_2$, and Nickel Cobalt Aluminum Oxides [NCA]. In some other examples, the positive electrode includes fluoride conversion chemistry materials are selected from the group consisting of $FeF_2$, $NiF_2$, $FeO_xF_{3-2x}$, $FeF_3$, $MnF_3$, $CoF_3$, $CuF_2$ materials and alloys or combinations thereof.

In some examples, disclosed is an electrochemical cell wherein the composite electrolyte is about 1 to 100 µm thick. In some examples, the composite electrolyte is about 20 µm thick.

In some examples, disclosed is a thin film electrolyte including an inorganic solid state electrolyte and a polymer, wherein the electrolyte has at least one textured surface. This texturing can be the result of the templating methods set forth herein, including, but not limited to, polymer particle templating, mesh templating, mesh imprinting, and related techniques. In some examples, the composite includes a polymer bond to at least one textured surface. In certain examples, the film has a thickness that is between about 10 nm to 100 µm. In these examples, the inorganic electrolyte is exposed at both sides of highest surface area.

In some examples, disclosed is a thin film electrolyte wherein the inorganic solid state electrolyte is spherical and has an aspect ratio of about 1. In some examples, the inorganic solid state electrolyte is sintered or necked. In certain examples, the inorganic solid state electrolyte is a lithium-stuffed garnet electrolyte or a sulfide electrolyte.

In some examples, disclosed is a thin film electrolyte wherein the inorganic solid state electrolyte is a lithium-stuffed garnet electrolyte or a sulfide electrolyte. In some other examples, disclosed is a thin film electrolyte, wherein the solid state electrolyte is a lithium-stuffed garnet electrolyte characterized by the formula $Li_yLa_3Zr_2O_{12}\cdot XAl_2O_3$, wherein $4 \leq y \leq 10$ and $0 < X \leq 1$. In some examples, the solid state electrolyte is a sulfide electrolyte characterized by the formula $Li_aSi_bSn_cP_dS_eO_f$, wherein $2 \leq a \leq 8$, $b+c=1$, $0.5 \leq d \leq 2.5$, $4 \leq e \leq 12$, and $0 < f \leq 10$; or $Li_gAs_hSn_jS_kO_l$, wherein $2 \leq g \leq 6$, $0 \leq h \leq 1$, $0 \leq j \leq 1$, $2 \leq k \leq 6$, and $0 \leq l \leq 10$. In some examples, the solid state electrolyte is an LPS:LiI (LPSI) electrolyte, wherein LPS is a mixture of $Li_2S:P_2S_5$ having a molar ratio from about 10:1 to about 6:4, wherein and the molar ratio of LPS:LiI is from 95:5 to 50:50. Example solid state electrolytes are found in U.S. Patent Application Publication No. US 2015/0171465, for U.S. patent application Ser. No. 14/618,979, filed Feb. 10, 2015, and issued as U.S. Pat. No. 9,172,114 on Oct. 27, 2015, as a Continuation of International PCT Patent Application No. PCT/US2014/038283, filed May 15, 2014, and published as WO 2014/186634 on Nov. 20, 2014. The contents of each of these applications are herein incorporated by reference in their entirety for all purposes.

In some examples, disclosed is a thin film electrolyte wherein the solid state electrolyte is a powder. In some examples, the powder is characterized by a particle size distribution (PSD) between about 0.5 µm to about 50 In certain other examples, the powder is characterized by a particle size distribution (PSD) between about 10 µm to about 20 µm.

In some examples, disclosed is a thin film electrolyte wherein the solid state electrolyte has a milled particle size of $d_{90}$ equal to about 5 µm. In some examples, the milled particle size of $d_{90}$ is equal to about 1, 2, 3, 4, 5, 6, 7, 8, 9, or 10µm.

In some examples, disclosed is a thin film electrolyte wherein the polymer is selected from nitriles, nitrile butadiene rubber, carboxymethyl cellulose (CMC), styrene butadiene rubber (SBR), polybutadiene rubber (PB), polyisoprene rubber (PI), polychloroprene rubber (CR), acrylonitrile-butadiene rubber (NBR), polyethyl acrylate (PEA), polyvinylidene fluoride (PVDF), aqueous-compatible polymers, silicone, PMX-200 (polydimethylsiloxane, PDMS), methyl methacrylate, ethyl methacrylate, polypropylene (PP), polyvinylbutyral (PVB), poly ethyl methacrylate (PMMA), polyvinyl pyrrolidone (PVP), atactic polypropylene (aPP), isotactive polypropylene (iPP), ethylene propylene rubber (EPR), ethylene pentene copolymer (EPC), polyisobutylene (PM), styrene butadiene rubber (SBR), polyolefins, polyethylene-copoly-1-octene (PE-co-PO), PE-co-poly(methyl cyclopentane)(PE-co-PMCP), stereo block polypropylenes, polypropylene polymethylpentene copolymer, polypropylene carbonate, silicone, polyethylene oxide (PEO), PEO block copolymers, polyethylene (e.g., low density linear polyethylene), polybutadiene, and combinations thereof. In some of these examples, the volumetric ratio of inorganic solid state electrolyte to polymer is between 99:1 and 51:49.

In some examples, the polymer is a polymer selected from nitriles, nitrile butadiene rubber, carboxymethyl cellulose (CMC), styrene butadiene rubber (SBR), poly(vinylidene) fluoride (PVDF); PAN, PVC, aqueous-compatible polymers, atactic polypropylene (aPP), silicone, polyisobutylene (PM), ethylene propylene rubber (EPR), PMX-200 PDMS (polydimethylsiloxane/polysiloxane, i.e., PDMS or silicone), polyacrylonitrile (PAN), polymethylmethacrylate (PMMA), poly vinylchloride (PVC), poly(vinylidene) fluoride-hexafluoropropylene PVDF-HFP. In some of these examples, the volumetric ratio of inorganic solid state electrolyte to polymer is between 99:1 and 51:49.

In some examples, disclosed is a thin film electrolyte wherein the film is about 1 to 100 μm thick. In some examples, disclosed is a thin film electrolyte wherein the film is about 10 μm thick. In some examples, disclosed is a thin film electrolyte wherein the film is about 20 μm thick. In some examples, disclosed is a thin film electrolyte wherein the film is about 30 μm thick. In some examples, disclosed is a thin film electrolyte wherein the film is about 40 μm thick. In some examples, disclosed is a thin film electrolyte wherein the film is about 50 μm thick. In some examples, disclosed is a thin film electrolyte wherein the film is about 60 μm thick. In some examples, disclosed is a thin film electrolyte wherein the film is about 80 μm thick. In some examples, disclosed is a thin film electrolyte wherein the film is about 90 μm thick.

In some examples, disclosed is a thin film electrolyte wherein the film is about 10 μm thick and wherein the electrolyte has a surface roughness less than ten (10) μm, less than five (5) μm, less than one (1) μm, or less than half (0.5) μm. In some examples, disclosed is a thin film electrolyte wherein the film is about 20 μm thick and wherein the electrolyte has a surface roughness less than ten (10) μm, less than five (5) μm, less than one (1) μm, or less than half (0.5) μm. In some examples, disclosed is a thin film electrolyte wherein the film is about 30 μm thick and wherein the electrolyte has a surface roughness less than ten (10) μm, less than five (5) μm, less than one (1) μm, or less than half (0.5) μm. In some examples, disclosed is a thin film electrolyte wherein the film is about 40 μm thick and wherein the electrolyte has a surface roughness less than ten (10) μm, less than five (5) μm, less than one (1) μm, or less than half (0.5) μm. In some examples, disclosed is a thin film electrolyte wherein the film is about 50 μm thick and wherein the electrolyte has a surface roughness less than ten (10) μm, less than five (5) μm, less than one (1) μm, or less than half (0.5) μm. In some examples, disclosed is a thin film electrolyte wherein the film is about 60 μm thick and wherein the electrolyte has a surface roughness less than ten (10) μm, less than five (5) μm, less than one (1) μm, or less than half (0.5) μm. In some examples, disclosed is a thin film electrolyte wherein the film is about 80 μm thick and wherein the electrolyte has a surface roughness less than ten (10) μm, less than five (5) μm, less than one (1) μm, or less than half (0.5) μm. In some examples, disclosed is a thin film electrolyte wherein the film is about 90 μm thick and wherein the electrolyte has a surface roughness less than ten (10) μm, less than five (5) μm, less than one (1) μm, or less than half (0.5) μm. In some examples, disclosed is a thin film electrolyte wherein the film is about 10 μm thick, wherein the electrolyte has a surface roughness less than ten (10) μm, less than five (5) μm, less than one (1) μm, or less than half (0.5) μm, and wherein the electrolyte has exposed solid state electrolytes at the surface characterized by the surface roughness.

In some examples, disclosed is a thin film electrolyte wherein the film is about 20 μm thick wherein the electrolyte has a surface roughness less than ten (10) μm, less than five (5) μm, less than one (1) μm, or less than half (0.5) μm, and wherein the electrolyte has exposed solid state electrolytes at the surface characterized by the surface roughness. In some examples, disclosed is a thin film electrolyte wherein the film is about 30 μm thick, wherein the electrolyte has a surface roughness less than ten (10) μm, less than five (5) μm, less than one (1) μm, or less than half (0.5) μm, and wherein the electrolyte has exposed solid state electrolytes at the surface characterized by the surface roughness. In some examples, disclosed is a thin film electrolyte wherein the film is about 40 μm thick, wherein the electrolyte has a surface roughness less than ten (10) μm, less than five (5) μm, less than one (1) μm, or less than half (0.5) μm, and wherein the electrolyte has exposed solid state electrolytes at the surface characterized by the surface roughness. In some examples, disclosed is a thin film electrolyte wherein the film is about 50 μm thick, wherein the electrolyte has a surface roughness less than ten (10) μm, less than five (5) μm, less than one (1) μm, or less than half (0.5) μm, and wherein the electrolyte has exposed solid state electrolytes at the surface characterized by the surface roughness. In some examples, disclosed is a thin film electrolyte wherein the film is about 60 μm thick, wherein the electrolyte has a surface roughness less than ten (10) μm, less than five (5) μm, less than one (1) μm, or less than half (0.5) μm, and wherein the electrolyte has exposed solid state electrolytes at the surface characterized by the surface roughness. In some examples, disclosed is a thin film electrolyte wherein the film is about 80 μm thick, wherein the electrolyte has a surface roughness less than ten (10) μm, less than five (5) μm, less than one (1) μm, or less than half (0.5) μm, and wherein the electrolyte has exposed solid state electrolytes at the surface characterized by the surface roughness. In some examples, disclosed is a thin film electrolyte wherein the film is about 90 μm thick, wherein the electrolyte has a surface roughness less than ten (10) μm, less than five (5) μm, less than one (1) μm, or less than half (0.5) μm, and wherein the electrolyte has exposed solid state electrolytes at the surface characterized by the surface roughness.

In some examples, disclosed is a composite electrolyte having the formula LPS:LiI (LPSI) wherein the molar ratio is from 10:1 to 1:1. In some examples, the molar ratio is 9:1, 8:1, 7:1, 6:1, 5:1, 4:1, 3:1, 2:1, or 1:1. In some examples, the molar ratio is 4:1, 3:1, 2:1, or 1:1. In some examples, the electrolyte has an ASR of 4, 3, 2, or 1, $\Omega cm^2$ at 60° C. when placed in a symmetrical Li-Li cell. In some of these examples, the composite further includes acetonitrile solvent (ACN). In some other examples, the composite further includes polypropylene. In some examples, the 1:1 LPS:LiI demonstrates an impedance of about 4.3 $\Omega cm^2$ at the Li-metal interface wherein measured at 60° C.

In some examples, disclosed is a composite electrolyte having LSTPS and polypropylene (PP) wherein the volumetric ratio of LSTPS to PP is 10:1, 9:1, 8:1, 8:2, 7:1, 6:1, 5:1, 4:1, 3:1, 2:1, or 1:1. In some of these examples, the composite further includes ACN. In some of these examples, the composite is in contact with Li-metal. In some of these examples, the composite is in contact with a gel having ACN solvent and a 1M concentration of a Lithium salt, such as $LiPF_6$.

In some examples, disclosed is a composite electrolyte having LSTPS and polypropylene (PP) wherein the volumetric ratio of LSTPS to PP is 10:1, 9:1, 8:1, 8:2, 7:1, 6:1, 5:1, 4:1, 3:1, 2:1, or 1:1. In some of these examples, the composite further includes dioxolane. In some of these examples, the composite is in contact with Li-metal. In some of these examples, the composite is in contact with a gel having a dioxolane solvent and a 1M concentration of a Lithium salt, such as LiTFSI or $LiPF_6$.

In some examples, disclosed is a composite electrolyte having LSTPS and polypropylene (PP) wherein the weight ratio of LSTPS to PP is 10:1, 9:1, 8:1, 8:2, 7:1, 6:1, 5:1, 4:1, 3:1, 2:1, or 1:1. In some of these examples, the composite further includes EC:PC. In some of these examples, the composite is in contact with Li-metal. In some of these examples, the composite is in contact with a gel having a EC:PC solvent and a 1M concentration of a Lithium salt, such as LiTFSI or LiPF$_6$. In some of these examples, the composite and the gel show a low impedance of about 10 Ωcm$^2$.

In some examples, disclosed is a composite electrolyte having LSTPS and polypropylene (PP) wherein the composite has a minimum of 60 w/w % of LSTPS (corresponding to 40 w/w % PP). In some examples, disclosed is a composite electrolyte having LSTPS and polypropylene (PP) wherein the composite has a minimum of 70-80 w/w % of LSTPS (corresponding to 20-30 w/w % PP).

In some examples, disclosed is a composite electrolyte having LSTPS and polypropylene (PP), wherein the PP is isotactic polypropylene. In some examples, the isotactic polypropylene has an average molecular weight of 250,000 g/mol or greater.

In some examples, disclosed is a composite electrolyte having LSTPS and polypropylene (PP) wherein the volumetric ratio of LSTPS to PP is about 80:20 or 75:25. In some of these examples, the composite is in contact with a gel. In certain examples, the gel includes PVDF polymer, dioxolane solvent and 1M concentration of LiFTSI or LiPF$_6$. In some other examples, the gel includes PVDF polymer, acetonitrile (ACN) solvent and 1M concentration of LiFTSI or LiPF$_6$. In some of these examples, the gel has a EC:PC solvent and a 1M concentration of a Lithium salt, such as LiTFSI or LiPF$_6$. In some of these examples, the composite and the gel show a low impedance of about 10 Ωcm$^2$.

In some examples, disclosed is a composite electrolyte having LPS:LiI (2:1 or 1:1 v/v) and polypropylene (PP) wherein the volumetric ratio of LSTPS to PP is about 80:20 or 75:25. In some of these examples, the composite is in contact with a gel. In certain examples, the gel includes PVDF polymer, dioxolane solvent and 1M concentration of LiFTSI or LiPF$_6$. In some other examples, the gel includes PVDF polymer, acetonitrile (ACN) solvent and 1M concentration of LiFTSI or LiPF$_6$. In some of these examples, the gel has a EC:PC solvent and a 1M concentration of a Lithium salt, such as LiTFSI or LiPF$_6$. In some of these examples, the gel has a succinonitrile solvent and a 1M concentration of a Lithium salt, such as LiTFSI or LiPF$_6$. In some of these examples, the composite and the gel show a low impedance of about 10 Ωcm$^2$.

In some examples, disclosed is a composite electrolyte with a gel in contact with a lithium metal negative electrode. In these examples, the composite electrolyte is between the lithium metal negative electrode and the gel.

In some examples, the composite electrolyte includes a polymer and a ceramic composite with the polymer phase having a finite lithium conductivity. In some examples, the polymer is a single ion conductor (e.g., Li$^+$). In other examples, the polymer is a multi-ion conductor (e.g., Li$^+$ and electrons). The following non-limiting combinations of polymers and ceramics may be included in the composite electrolyte. The composite electrolyte may be selected from polyethyleneoxide (PEO) coformulated with LiCF$_3$SO$_3$ and Li$_3$N, PEO with LiAlO$_2$ and Li$_3$N, PEO with LiClO$_4$, PEO:LiBF4-TiO$_2$, PEO with LiBF$_4$—ZrO$_2$. In some of these composites, in addition to the polymers, the composite includes an additive selected from Li$_3$N; Al$_2$O$_3$, LiAlO$_3$; SiO$_2$, SiC, (PO$_4$)$^{3-}$, TiO$_2$; ZrO$_2$, or zeolites in small amounts. In some examples, the additives can be present at from 0 to 95% w/w. In some examples, the additives include Al$_2$O$_3$, SiO$_2$, Li$_2$O, Al$_2$O$_3$, TiO$_2$, P$_2$O$_5$, Li$_{1.3}$Ti$_{1.7}$Al$_{0.3}$(PO$_4$)$_3$, or (LTAP). In some of these composite electrolytes, the polymer present is polyvinylidenefluoride at about 10% w/w. In some of these as composite electrolytes, the composite includes an amount of a solvent and a lithium salt (e.g., LiPF$_6$). In some of these composites, the solvent is ethyl carbonate/dimethyl carbonate (EC/DMC) or any other solvent set forth herein.

In some of the composite electrolytes set forth herein, the polymer serves several functions. In one instance, the polymer has the benefit of ameliorating interface impedance growth in the solid electrolyte even if the polymer phase conductivity is much lower than the ceramic. In other instances, the polymer reinforces the solid electrolyte mechanically. In some examples, this mechanical reinforcement includes coformulating the solid electrolyte with a compliant polymer such as poly paraphenylene terephthalamide. These polymers can be one of a variety of forms, including a scaffold.

Composite Material Components

Examples of binders, used to facilitate the adhesion between the oxide (e.g., garnet) or sulfide based particles, include, but are not limited to, polypropylene (PP), polyvinyl butyral (PVB), poly methyl methacrylate (PMMA), poly ethyl methacrylate (PEMA), polyvinyl pyrrolidone (PVP), atactic polypropylene (aPP), isotactive polypropylene, ethylene propylene rubber (EPR), ethylene pentene copolymer (EPC), polyisobutylene (NB), styrene butadiene rubber (SBR), polybutadiene rubber (PB), polyisoprene rubber (PI), polychloroprene rubber (CR), acrylonitrile-butadiene rubber (NBR), polyethyl acrylate (PEA), polyvinylidene fluoride (PVDF), polyolefins, polyethylene-copoly-1-octene (PE-co-PO); PE-co-poly(methylene cyclopentane) (PE-co-PMCP); stereo block polypropylenes, polypropylene polymethylpentene copolymer, poly propylene carbonate, methyl methacrylate, ethyl methacrylate, and silicone. Other binders include binder is selected polypropylene (PP), atactic polypropylene (aPP), isotactic polypropylene (iPP), ethylene propylene rubber (EPR), ethylene pentene copolymer (EPC), polyisobutylene (PM), styrene butadiene (SBR), polyolefins, polyethylene-co-poly-1-octene (PE-co-PO), PE-co-poly(methylene cyclopentene) (PE-co-PMCP), stereoblock polypropylenes, polypropylene polymethyl pentene, polyethylene oxide (PEO), PEO block copolymers, silicone, polyethylene (e.g., low density linear polyethylene), polybutadiene, and combinations thereof.

Examples of binders include polyvinyl butyral. Binders may include polycarbonates. Other binders may include polymethylmethacrylates. These examples of binders are not limiting as to the entire scope of binders contemplated here but merely serve as examples. Binders useful in the present disclosure include, but are not limited to, polypropylene (PP), atactic polypropylene (aPP), isotactive polypropylene (iPP), ethylene propylene rubber (EPR), ethylene pentene copolymer (EPC), polyisobutylene (PIB), styrene butadiene rubber (SBR), polyolefins, polyethylene-co-poly-l-octene (PE-co-PO), PE-co-poly(methylene cyclopentane) (PE-co-PMCP), poly methyl-methacrylate (and other acrylics), acrylic, polyvinylacetacetal resin, polyvinylbutylal resin, PVB, polyvinyl acetal resin, stereoblock polypropylenes, polypropylene polymethylpentene copolymer, polyethylene oxide (PEO), PEO block copolymers, silicone, and the like.

Examples of solvents suitable for use with the composites set forth herein include carbonates, acetonitrile, succinonitrile, toluene, benzene, ethyl ether, decane, undecane, dodecane.

Examples of polymers for a polymer-sulfide composite include, but are not limited to, polypropylene, polyethylene oxide (PEO), polyethylene oxide poly(allyl glycidyl ether) PEO-AGE, PEO-MEEGE, polyethylene oxide 2-Methoxyethoxy)ethyl glycidyl poly(allyl glycidyl ether) PEO-MEEGE-AGE, polysiloxane, polyvinylidene fluoride (PVdF), polyvinylidene fluoride hexafluoropropylene (PVdF-HFP), and rubbers such as ethylene propylene (EPR), nitrile rubber (NPR), Styrene-Butadiene-Rubber (SBR), polybutadiene rubber (PB), polyisoprene rubber (PI), polychloroprene rubber (CR), acrylonitrile-butadiene rubber (NBR), polyethyl acrylate (PEA), polyvinylidene fluoride (PVDF), polyethylene (e.g., low density linear polyethylene), and polybutadiene.

Examples of solid state inorganic electrolyte includes, but are not limited to, lithium super ionic conductor (LISICON), which includes a family of solids with the chemical formula $Li_{2+2x}Zn_{1-x}GeO_4$; $Li_2S$—$SiS_2$—$Li_3PO_4$ (glass electrolyte), $Li_{10}GeP_2S_{12}$, Li-β-alumina, $Li_2S$—$P_2S_5$ (glass electrolyte), $Li_{3.25}Ge_{0.25}P_{0.75}S_4$, $Li_7P_3S_{11}$, lithium phosphorus oxynitride (LiPON), $1.2Li_2S$—$1.6LiI$-$B_2S_3$, or polyethylene glycol (PEG) with polyethyleneoxide (EO) polypropyleneoxide (PO) (3:1 EO:PO) with $Li_{1.3}Al_{0.3}Ti_{1.7}(PO_4)_3$.

Method of Making

The composites set forth herein can be made by a variety of methods.

Green Films

In some examples, set forth herein are composite electrolyte films wherein the composite includes an inorganic electrolyte and a polymer. Prior to a heat treatment of a film having an inorganic and organic component (e.g., polymer), the film is referred to as a "green film." In some examples, the inorganic electrolyte is lithium-stuffed garnet powder, lithium-stuffed garnet chemical precursors, a sulfide electrolyte, or a combination thereof. In some examples, these films are extruded in layers or deposited or laminated onto other composite electrolytes in order to build up several layers of a composite electrolyte. In some examples, these films are extruded as slurries that optionally include additional components. In some examples, these additional components include at least one member selected from a binder, a solvent, a dispersant, or combinations thereof. In some examples, the solid loading is at least 50% by volume. In some examples, the film thickness is less than 100 µm.

In some examples, the dispersant in the green film is fish oil, Menhaden Blown Fish Oil, phosphate esters, Rhodaline™, Rhodoline 4160, Phospholan-131™, BYK 22124™, BYK-22146™, Hypermer KD1™, Hypermer KD6™ and Hypermer KD7™.

In some examples, the composite electrolytes films are extruded onto a substrate. In certain examples, the substrate is a polymer, a metal foil, or a metal powder. In some of these examples, the substrate is a metal foil. In some other examples, the substrate is a metal powder. In some of these examples, the metal is selected from Ni, Cu, Al, steel, alloys, or combinations thereof.

In some examples, the green films have a film thickness less than 75 µm and greater than 10 nm. In some examples, these films have a thickness less than 50 µm and greater than 10 nm. In some examples, the films include solid particles which are less than 5 µm at the particles maximum physical dimension (e.g., diameter for a spherical particle). In some examples, the films have a median solid particle grain size of between 0.1 µm to 10 µm. In other examples, the films are not adhered to any substrate. These films not adhered to any substrate are referred to as self-supporting or free standing.

In some examples, the composite electrolytes green films have a thickness from about 10 µm to about 100 µm. In some other of the methods disclosed herein, this film has a thickness from about 20 µm to about 100 µm. In certain of the methods disclosed herein, the film has a thickness from about 30 µm to about 100 µm. In certain other of the methods disclosed herein, the film has a thickness from about 40 µm to about 100 µm. In yet other methods disclosed herein, the film has a thickness from about 50 µm to about 100 µm. In still other methods disclosed herein, the film has a thickness from about 60 µm to about 100 µm. In yet some other methods disclosed herein, the film has a thickness from about 70 µm to about 100 µm. In some of the methods disclosed herein, the film has a thickness from about 80 µm to about 100 µm. In some other of the methods disclosed herein, the film has a thickness from about 90 µm to about 100 µm. In some of the methods disclosed herein, the film has a thickness from about 10 µm to about 90 µm. In some other of the methods disclosed herein, the film has a thickness from about 20 µm to about 80 µm. In certain of the methods disclosed herein, the film has a thickness from about 30 µm to about 70 µm. In certain other of the methods disclosed herein, the film has a thickness from about 40 µm to about 60 µm. In yet other methods disclosed herein, the film has a thickness from about 50 µm to about 90 µm. In still other methods disclosed herein, the film has a thickness from about 60 µm to about 90 µm. In yet some other methods disclosed herein, the film has a thickness from about 70 µm to about 90 µm. In some of the methods disclosed herein, the film has a thickness from about 80 µm to about 90 µm. In some other of the methods disclosed herein, the film has a thickness from about 30 µm to about 60 µm. In some examples, the films have a thickness of about 1-150 µm. In some of these examples the films has a thickness of about 1 µm. In some other examples the films has a thickness of about 2 µm. In certain examples, the films has a thickness of about 3 µm. In certain other examples the films has a thickness of about 4 µm. In some other examples the films has a thickness of about 5 µm. In some examples the films has a thickness of about 6 µm. In some of these examples the films has a thickness of about 7 µm. In some examples the films has a thickness of about 8 µm. In some other examples the films has a thickness of about 9 µm. In certain examples the films has a thickness of about 10 µm.

In some examples, the composite electrolytes films set forth herein include an inorganic electrolyte combined with at least one or more polymers. In some of these examples, the polymers include, but are not limited to, polyethylene oxide (PEO), polypropylene oxide (PPO), PEO-PPO block co-polymers, styrene-butadiene, polystyrene (PS), acrylates, diacrylates, methyl methacrylates, silicones, acrylamides, t-butyl acrylamide, styrenics, t-alpha methyl styrene, acrylonitriles, vinyl acetates, polypropylene (PP), polyvinyl butyral (PVB), polyvinyl pyrrolidone (PVP), atactic polypropylene (aPP), isotactive polypropylene ethylene propylene rubber (EPR), ethylene pentene copolymer (EPC), polyisobutylene (PIB), styrene butadiene rubber (SBR), polyolefins, polyethylene-co-poly-1-octene (PE-co-PO); PE-co-poly(methylene cyclopentane), (PE-co-PMCP), stereoblock polypropylenes, polypropylene polymethylpentene, polyethylene (e.g., low density linear polyethylene), polybutadiene, copolymer and combinations thereof.

Solutions and Slurries

In some examples, the methods herein include the use of solutions and slurries which are used to cast or deposit the composite electrolyte films described herein. In certain examples, the inorganic electrolyte, or the chemical precursors to the inorganic electrolytes, are milled. In some examples, these precursors are formulated into a slurry. In some examples, these milled precursors are formulated into a slurry. After milling, in some examples, the inorganic electrolytes, or the precursors thereto, are formulated into coating formulations, e.g., slurries with binders and solvents. These slurries and formulations may include solvents, binders, dispersants, and/or surfactants. In some examples, the binder is polyvinyl butyral (PVB), polyvinylpyrrolidone (PVP), Ethyl Cellulose, Celluloses, poly vinyl acetate (PVA), or PVDF. In some examples, the dispersants include surfactants, fish oil, fluorosurfactants, Triton, PVB, or PVP. In some examples, the solvent is selected from toluene, methanol, ethanol, ethyl acetate, toluene:ethanol, benzene, dimethyl formamide (DMF), or combinations thereof. In certain embodiments disclosed herein, the binder is polyvinyl butyral (PVB). In certain embodiments disclosed herein, the binder is polypropylene carbonate. In certain embodiments disclosed herein, the binder is a polymethylmethacrylate. In some embodiments disclosed herein, removing a solvent includes evaporating the solvent. In some of these embodiments, removing a solvent includes heating the film which contains the solvent. In some embodiments, removing a solvent includes using a reduced atmosphere. In still other embodiments, removing a solvent includes using a vacuum to drive off the solvent. In yet other embodiments, removing a solvent includes heating the film and using a vacuum to drive off the solvent.

Sintering Methods

In some examples, the methods set forth herein include a sintering step. In some of these examples, sintering includes heating the electrolyte film or powder in the range from about 5° C. to about 1200° C. for about 1 to about 720 minutes and in atmosphere having an oxygen partial pressure between 1e-1 atm to 1e-15 atm.

In some examples, the methods set forth herein include a sintering step. In some of these examples, sintering includes heating the electrolyte film, powder, or precursor to about 1100° C. for about one to four hours.

Single-particle Thickness Extruded Films

In some examples, the methods set forth herein include making a composite electrolyte having a thickness equal to about the scale of an inorganic electrolyte particle comprising the composite electrolyte. In some of these examples, the method is substantially as set forth in FIG. 1. In Method 100 in FIG. 1, the method includes, as step 101, isolating monodisperse inorganic particles. These particles can include sulfide based or oxide based electrolytes, as set forth herein above and below. These particles can be, for example, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 µm in approximate diameter. In some examples, the particles are spherical, approximately spherical, ellipsoidal, a particle shape with an aspect ratio greater than 1. In some examples, the isolating monodisperse particles includes identifying monodisperse particles. In some examples, the isolating monodisperse particles includes filtering monodisperse particles to separate a give sized particle from a group of particles having a variety of sizes. In some examples, the filtering is accomplished with centrifugation. In certain examples, these particles are already calcined. The method set forth herein further includes, in step 102, mixing the particles with a binder, polymer, gel, organic solvent, or combination thereof. The method set forth herein further includes, in step 103, pressing, compacting, densifying, or casting a film that includes the inorganic binders and the binder, polymer, and, or, organic solvent, in which the film is about the thickness of the inorganic particles. If the inorganic particles are about 20 µm in diameter, then the film that is cast is prepared (extruded, hot extruded, pressed, compacted, densified, cast) about 20 µm in thickness, shown as 104. The method set forth herein further includes, in step 105, etching or polishing one or two of the largest surface area sides of the film 104. This etching or polishing step results in the exposure of, or protrusion of, the inorganic particles at or beyond the boundary of the binder, polymer, gel or organic solvent, as shown in 106. As shown in 106, the exposed inorganic particles can contact a positive or negative electrode without any organic material (e.g., binder, polymer, gel or organic solvent) intervening between the positive or negative electrodes and the electrolyte.

Figure 6:
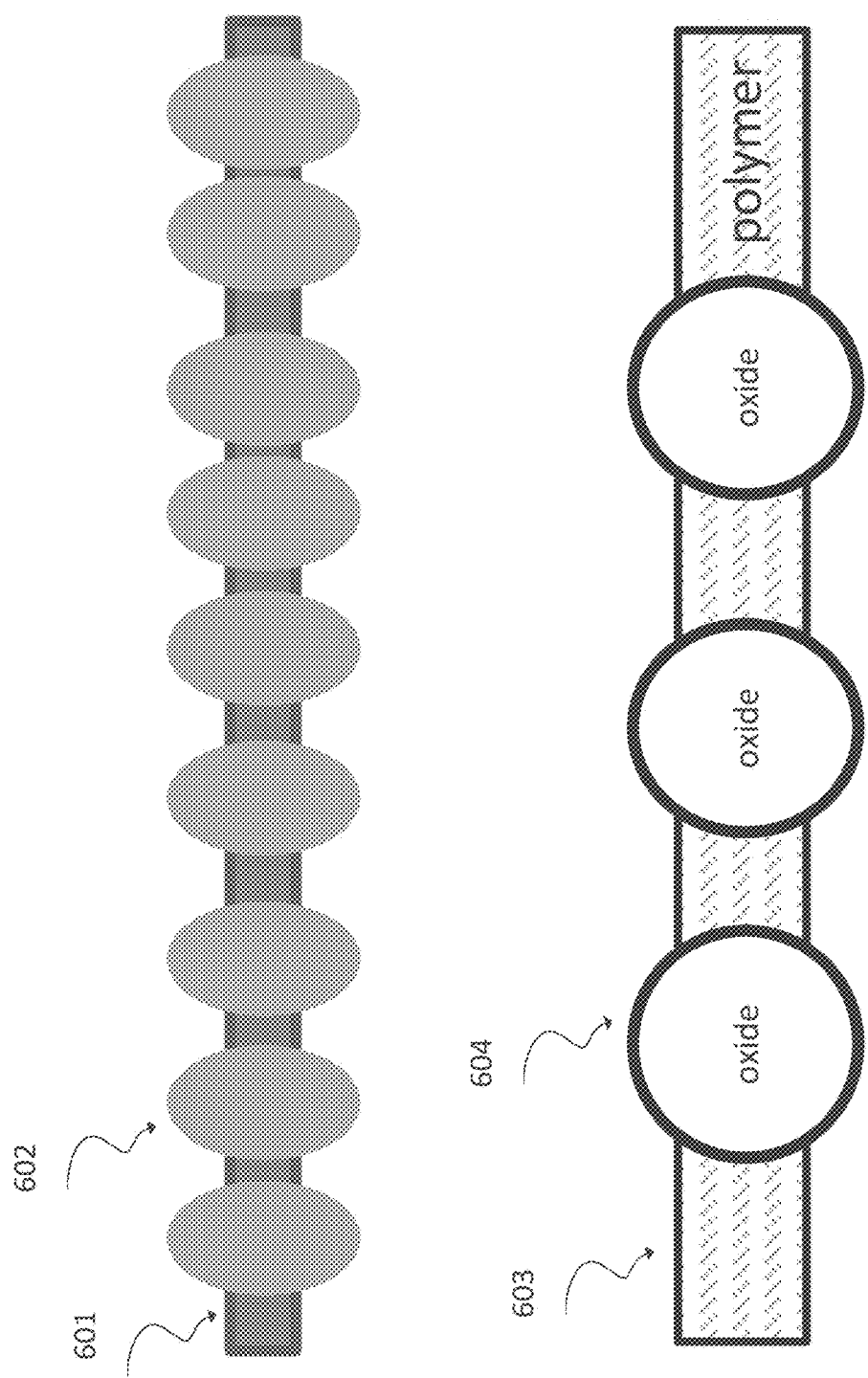
FIG. 6 illustrates an example composite film having a thickness about the size of an inorganic particle therein.

In some examples, the films prepared by the above described method can be illustrated as substantially set forth in FIG. 6. As shown in FIG. 6, film 601 has been surface treated so that the inorganic electrolyte particles 602 extend beyond (or are exposed at) the 601 film's surface. In addition, the thickness of the film 601 is on the scale of the length of inorganic electrolyte particles 602. In another example, film 603 is illustrated in which oxide electrolyte particles 604 are exposed at, or extend beyond, the 603 film's surface. The thickness of the film 603 is on the scale of the diameter of inorganic electrolyte particles 604. In the composite films described herein, the inorganic electrolyte particles can be ellipsoidal shaped (element 602), spherical (element 604), substantially spherical, or also irregularly shaped. FIG. 6 is presented for illustrative and representative reasons, but FIG. 6 is not drawn to exact scale.

Particle-templated and Back-filled Film

Figure 2:
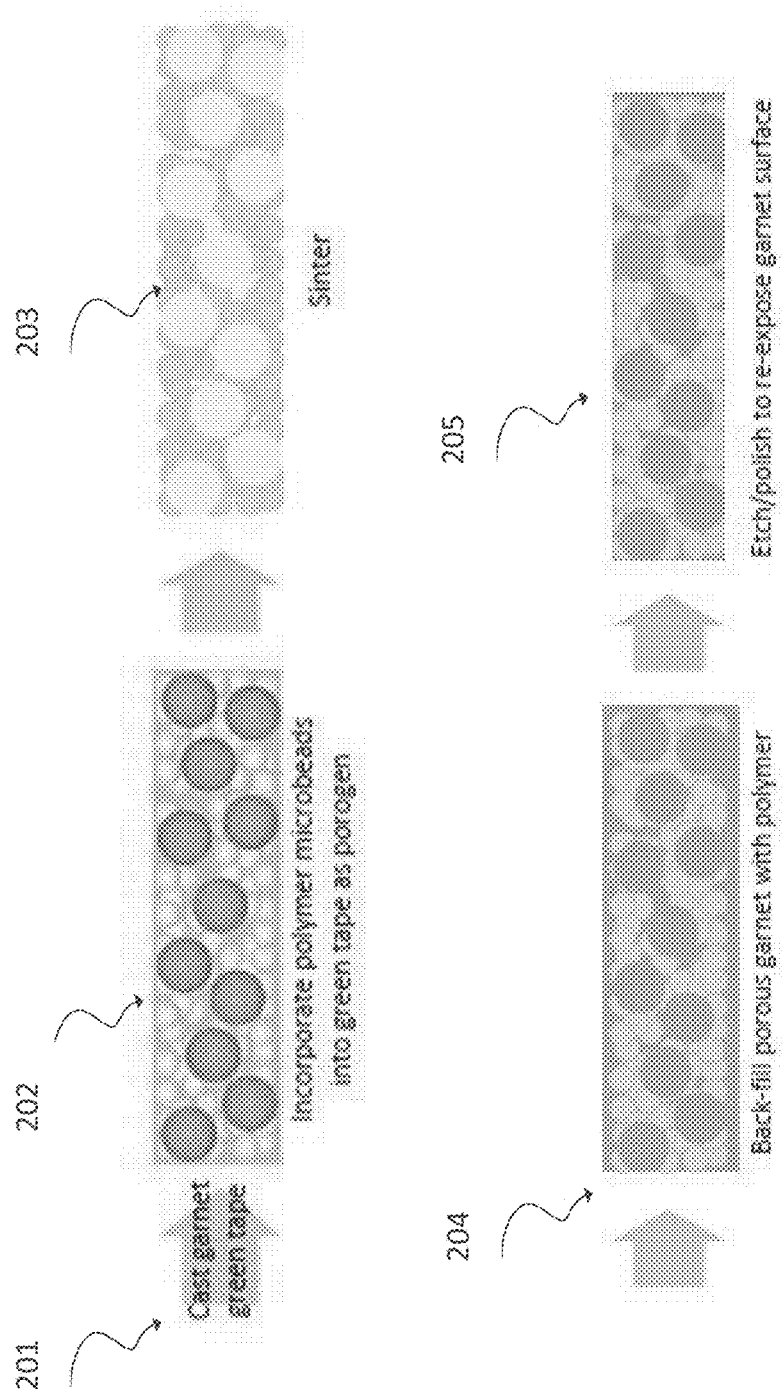
FIG. 2 shows an example method for making a particle-templated and back-filled composite film.

In some examples, the methods set forth herein include making a composite electrolyte that includes a solid state inorganic electrolyte and a polymer. In these methods, voids are introduced into a sintered solid state inorganic electrolyte. Next, a polymer is used, after sintering, to back-fill any void spaces in the inorganic solid state electrolyte. As shown in FIG. 2, in some examples, the methods herein include a method for making a particle-templated and back-filled film. In some examples, the method includes step 201 for casting a green tape. This tape includes inorganic electrolyte materials or inorganic electrolyte material precursors. In some of these examples, the inorganic electrolyte precursors include lithium stuffed garnet precursors. In some other examples, the green tape also includes binders, polymers, solvents, or combinations thereof. In addition to the above, the green tape also includes spherical particles that can combust during a subsequent sintering cycle, see step 202. In some examples, step 202 is a calcination step. In some of these examples, the spherical particles are approximately 6 µm in diameter. In some of these examples, the spherical particles are approximately 12 µm in diameter. In some examples, the particles are made of polyethylene or, more specifically, from low density linear polyethylene. In another example, polybutadiene structures may be used. In yet other examples, the particles are made of polypropylene. In certain examples, the spherical particles are approximately, 0.25, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 µm in diameter. In some examples, the methods includes a green tape wherein the volumetric ratio of inorganic electrolyte, or inorganic electrolyte precursor, to spherical particles (e.g., polyethylene or polypropylene) is about 1:10, 1:8, 1:6, 1:4, 1:2, 1:1, or 2:1. In certain examples, the methods include using a 1:2 volumetric ratio. In others, the volumetric ratio is 1:1. In some of these examples, a lithium-stuffed garnet electrolyte is mixed with polyethylene, wherein the polyethylene is approximately 6 µm in diameter, in a 1:2 volumetric ratio (polyethylene:garnet). In some of these examples, a lithium-stuffed garnet electrolyte is mixed with polypropylene, wherein the polypropylene is approximately 12 µm in diameter, in a 1:1 volumetric ratio (polypropylene: garnet). In some examples, the methods further include step 203 in which the green tape is sintered. In the sintering process, the spherical particles combust (or otherwise volatilize from the film) and leave the green tape as gaseous combustion products. This sintering step 203 densifies and crystallizes the inorganic electrolyte while leaving vacant pores and voids where the spherical particles were present prior to the sintering process. In step 204, these pores and voids are back-filled a polymer. This back-filled polymer can be incorporated as monomers in a solvent which are polymerized by methods known in the art, such as but not limited to photopolymerization, radical polymerization, or pH mediated polymerization. Once back-filled with a polymer, the composite film having sintered inorganic electrolyte particles and polymer is optionally polished in step 205. The polishing exposes inorganic electrolyte particles to the largest surface area surface to the composite film. The polishing also results in a film surface which is flat and has uniform surface roughness. In some examples, the polishing maximizes the amount of inorganic electrolyte that is exposed at the film surface in order to maximize the contact between the inorganic electrolyte component and the positive or negative electrodes which are interfacing with the polished film.

Particle-templated and Back-filled Film

In some examples, the methods set forth herein include making a composite electrolyte that includes a solid state inorganic electrolyte and a polymer. In some these methods, the polymers which are suitable for use (e.g., back-filling garnet voids) include those formed from free radical polymerization of liquid monomers. Some of these polymers includes acrylates, methacrylates, vinyl esters, styrenics, acrylonitriles, acrylamides. Monomers from the aforementioned polymer categories have, in some instances, multiple polymerizable functional groups on the same molecule (e.g. diacrylate and triacrylate monomers). In some embodiments, monomers having different functional groups may be used. In some embodiments, blends of monomers may be used in the polymerization. In some embodiments, the monomers include those which form cross-linked polymers (e.g., inside the garnet voids). In some these methods, the polymers which are suitable for use (e.g., back-filling garnet voids) include oligomers and low molecular weight polymers, optionally, containing polymerizable functional groups. In some these methods, the polymers which are suitable for use (e.g., back-filling garnet voids) include oligomers and low molecular weight polymers, optionally, containing polymerizable functional groups may also be used to generate crosslinked polymers in the garnet voids. In some examples, the polymer is cross-linked polybutyl diene (PBD).

In some examples, the methods set forth herein include making a composite electrolyte that includes a solid state inorganic electrolyte and a polymer. In some these methods, polymer back-filling includes preparing a solution containing monomer, free radical initiator, and solvent. In some examples, this solution is applied to the garnet surface (e.g, spin casting or drop casting. In some examples, the solvent in the solution is then evaporated by, for example, spin coating, or by heating. In some of these examples, the monomer is polymerized using heat (in the case of a thermal initiator) or UV exposure (in the case of a UV initiator).

Figure 8:
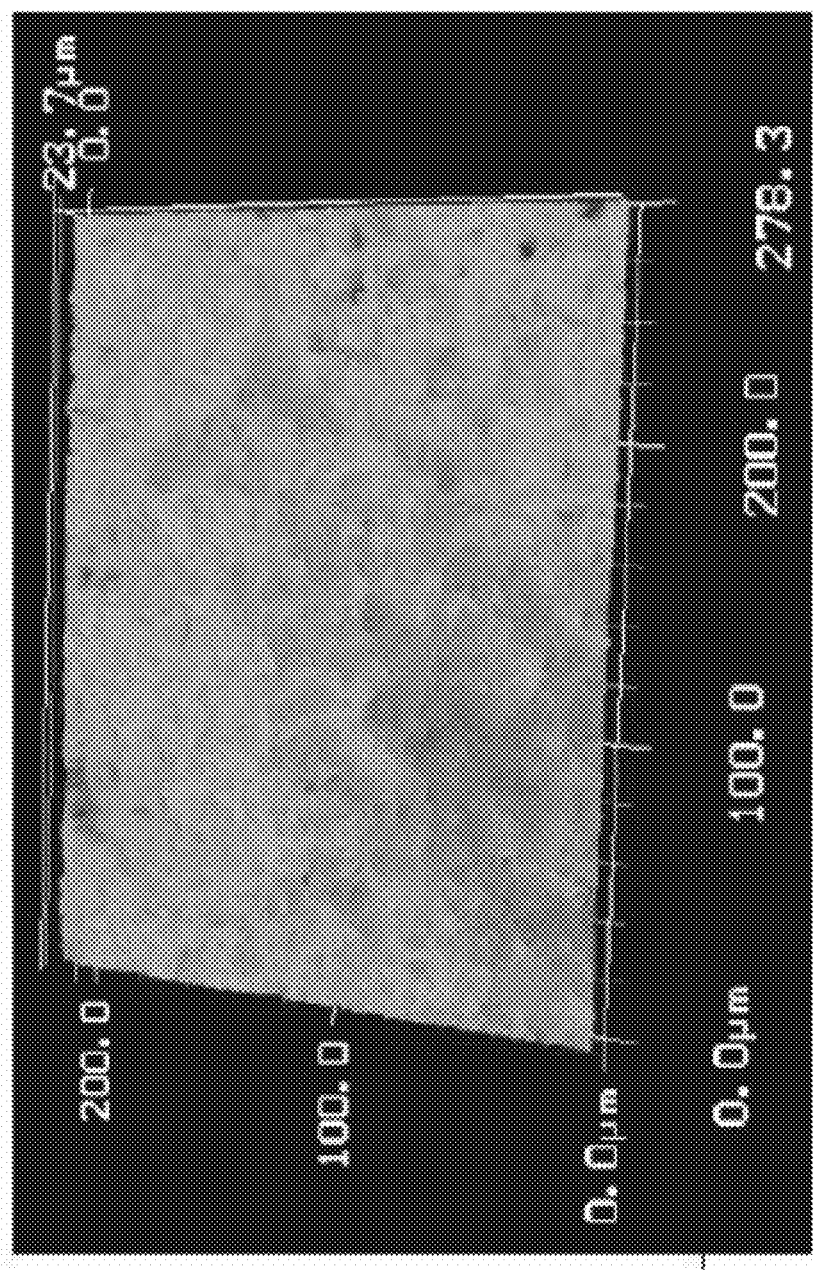
FIG. 8 shows a surface profile for the sintered film prepared according to particle-template method of Example 2 and as observed on a Keyence VK-X100 instrument that measures surface roughness using a laser.

As shown in FIG. 8, the green film having spherical particles therein is observed to have a surface pattern that is representative of the spherical particles inside the green film. The particles assemble, as show in FIG. 8, in a random fashion and leave imprints in the film that are approximately spherical with an approximate diameter that matches the diameter of the spherical particle inside the green film.

Mesh-templated and Back-filled Film

Figure 3:
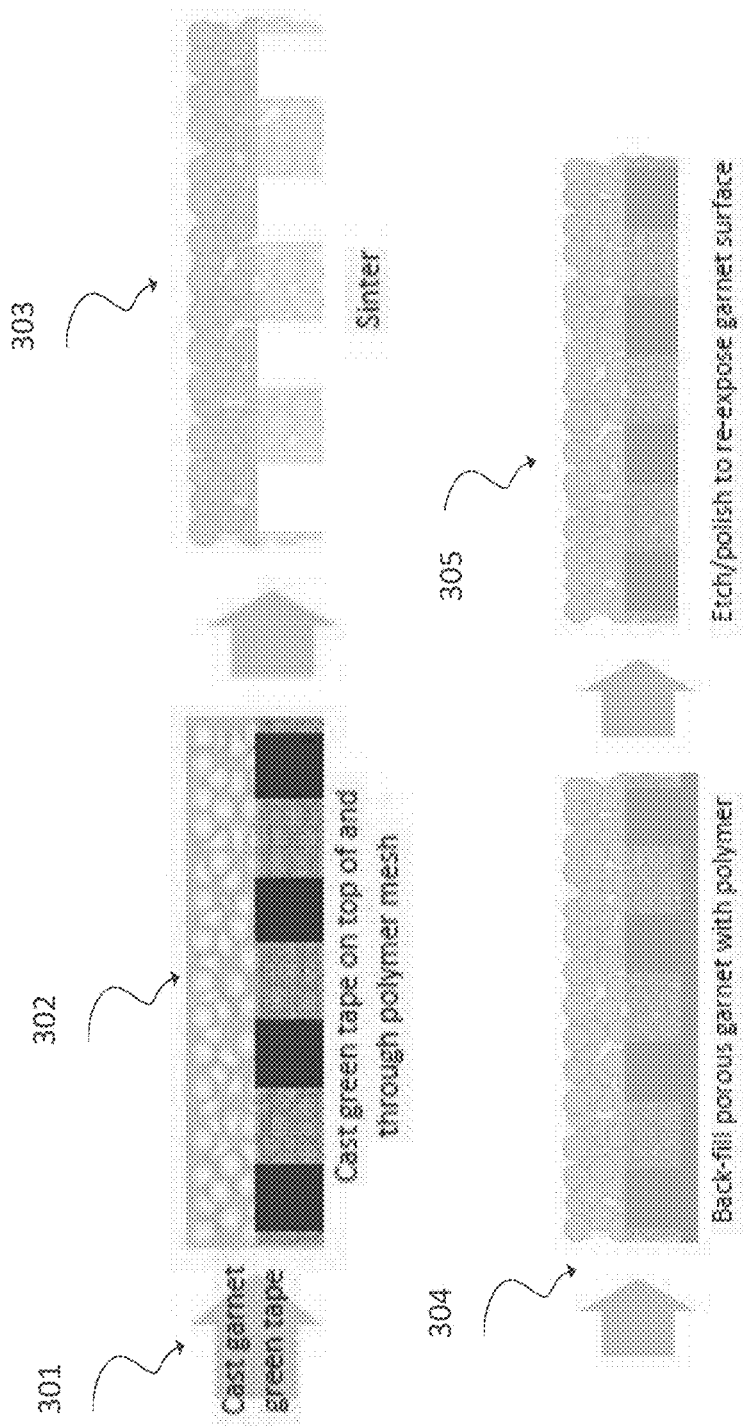
FIG. 3 shows an example method for making a mesh-templated and back-filled composite film.

In some examples, the methods set forth herein include making a composite electrolyte that is templated by a polymer mesh. In some of these examples, as shown in FIG. 3, the method includes step 301 of casting a green tape of unsintered inorganic electrolyte, either in a precursor form or in an already calcined form. In some examples, the method further includes step 302 of casting the green tape onto a polymer mesh. As shown in step 302, the green tape is cast onto the mesh so that the mesh is substantially covered by the green tape. The mesh does not extend through the entire thickness of the film. In some examples, step 302 is referred herein as imprinting. Rather, in some examples, the mesh penetrates one side of the film about 1-50% of the thickness of the film. In some examples, the mesh imprints one side of the film about 1-50% of the thickness of the film. In the next step, 303, the green tape and the polymer mesh are subject to sintering conditions which densify the inorganic electrolyte in the green film and also burn out, or combust, the organic constituents, including the polymer mesh and any other organic compounds or materials which are in contact with the sintering green tape. After being sintered, a negative void imprint pattern remains in the sintered film and is characteristic of the template (e.g., polymer mesh, particles, and the like). This open void space is then, in step 304, back-filled with a polymer. In some example, the method further includes, in step 305, polishing the side of the film having polymer on the surface and the side which would bond to an electrochemical electrode if the film were used in a device. The polishing exposes inorganic electrolyte particles at the largest surface area film side. The polishing or etching may also remove excess polymer. The polishing also results in a film surface which is flat and has uniform surface roughness. In some examples, the polishing maximizes the amount of inorganic electrolyte that is exposed at the film surface in order to enhance the contact between the inorganic electrolyte component and the positive or negative electrodes which are interfacing with the polished film.

Figure 5:
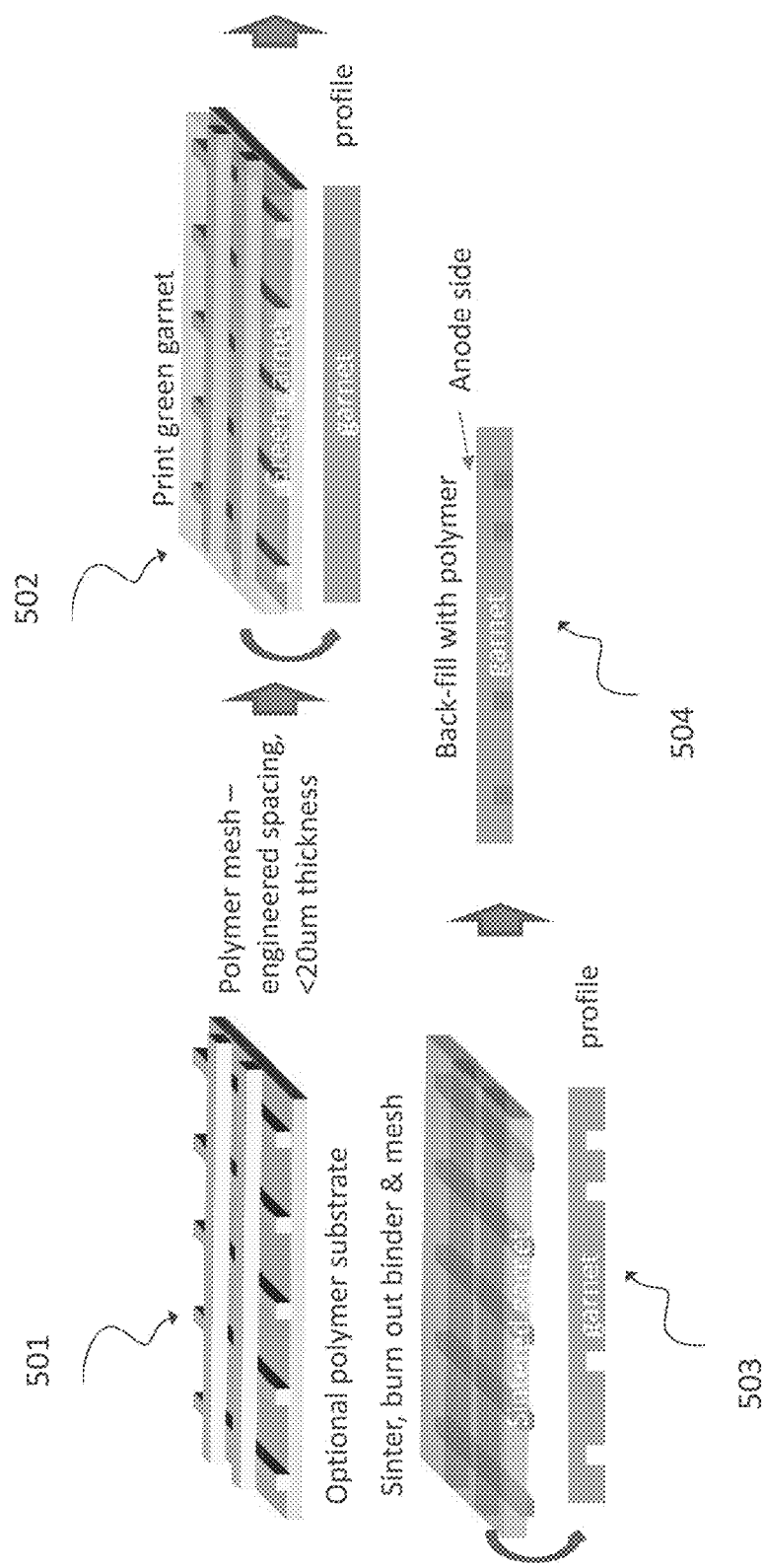
FIG. 5 shows an example method for making a templated and back-filled film.

In some examples, the methods set forth herein include making a composite electrolyte that is templated by a polymer mesh. In some of these examples, as shown in FIG. 5, the method includes step 501 of providing a polymer substrate, which can include a polymer mesh, or a mesh with engineered spaces (e.g., about or less than 20 µm in thickness). As shown in FIG. 5, the method in some examples includes step 502 of printing a green film (e.g., a green tape having lithium-stuffed garnet electrolyte particles, or a green tape having chemical precursors to lithium-stuffed garnet electrolyte particles, and optionally binders, polymers, and solvents). In some examples, the method includes in step 502 casting a green tape of unsintered inorganic electrolyte, either in a precursor form or in an already calcined form. In some examples, the method further includes step 502 casting the green tape onto a polymer mesh. As shown in step 502, the green tape is cast or printed onto the mesh so that the mesh is substantially covered by the green tape. The mesh does not extend through the entire thickness of the film. Rather, in some examples, the mesh penetrates one side of the film about 1-50% of the thickness of the film. In some examples, step 502 is referred herein as templating. In some examples, the mesh imprints one side of the film about 1-50% of the thickness of the film. As shown in FIG. 5, in some examples, the method includes step 503 in which the green tape and the polymer mesh are subject to sintering conditions which densify the inorganic electrolyte in the green film and also burn out, or combust, the organic constituents, including the polymer mesh and any other organic compounds or materials which are in contact with the sintering green tape. After being sintered, a negative void imprint pattern remains in the sintered film and is characteristic of the template (e.g., polymer mesh, particles, and the like, see profile in step 503). This open void space is then, in step 504, back-filled with a polymer. In some example, the method further includes polishing the side of the film having polymer on the surface and the side which would bond to an electrochemical electrode if the film were used in a device. The polishing exposes inorganic electrolyte particles at the largest surface area film side. The polishing or etching may also remove excess polymer. The polishing also results in a film surface which is flat and has uniform surface roughness. In some examples, the polishing maximizes the amount of inorganic electrolyte that is exposed at the film surface in order to enhance the contact between the inorganic electrolyte component and the positive or negative electrodes which are interfacing with the polished film.

Imprinted and Back-filled Film

Figure 4:
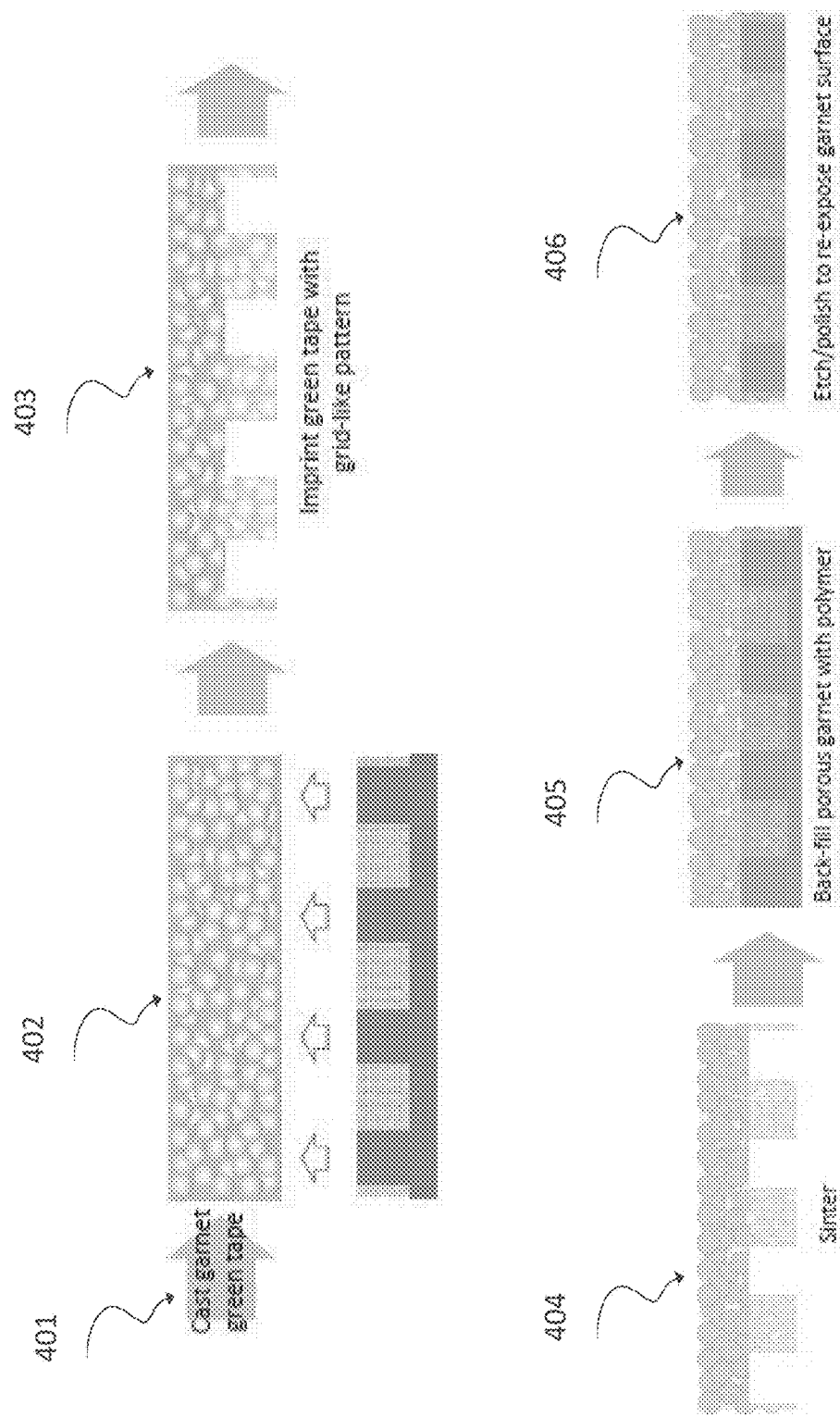
FIG. 4 shows an example method for making an imprinted and back-filled composite film.

In some examples, the methods set forth herein include making a composite electrolyte that is imprinted by a polymer mesh template. In some of these examples, as shown in FIG. 4, the method includes step 401 of casting a green tape of unsintered inorganic electrolyte, either in a precursor form or in an already calcined form. In some examples, the method further includes step 402 of casting the green tape onto a polymer mesh. As shown in step 402, the green tape is cast onto the mesh so that the mesh is substantially covered by the green tape. Also as shown in step 402, the mesh can be pressed into a green film. In some of these examples, step 402 includes imprinting the green film with the polymer mesh. In some examples, step 402 is referred herein as imprinting. The mesh does not extend through the entire thickness of the film. Rather, in some examples, the mesh penetrates one side of the film about 1-50% of the thickness of the film. In some examples, the mesh imprints one side of the film about 1-50% of the thickness of the film. In the next step, 403, the polymer mesh is removed from the green film and leaves behind a negative pattern characteristic of the polymer mesh pattern used to imprint it. In some examples, step 403 include peeling the polymer mesh away from the green film. In some other examples, step 403 include lifting the polymer mesh off of the green film. Once the polymer mesh imprint is removed, the remaining green tape is, in some examples, sintered in step 403 and as shown in FIG. 4.

In some examples, a green tape slurry is made and cast or pressed onto a polymer mesh. The polymer mesh can be any mesh that is suitable for imprinting a design or surface texture pattern to at least one side of the green tape. The polymer mesh should not be limited to those specific meshes set forth herein. In an example, the mesh is polyester and has a 320 mesh size, an 80 µm grid spacing, an 40 µm opening size, 25% open area, and 40 µm wide diameter. In some examples, step 402 can include partially encapsulating the polymer mesh on one side of the green film by hot pressing the mesh into the unsintered green film at about 100-200° C., 125-250° C., 125-150° C., 125-175° C., or 150-200° C. In some examples, the polymer mesh is, in step 403, folded back and off of the green film.

In some examples, in step, 403, the green tape, having an imprinted patter on at least one surface, is subject to sintering conditions which densify the inorganic electrolyte in the green film and also burn out, or combust, any organic constituents which may be present. See step 404. After being sintered, the imprinted pattern remains on the sintered film's surface and is characteristic of polymer mesh's pattern. In some examples, this imprinted pattern is referred to as a textured surface, or a surface having void spaces. In some examples, a portion of this textured surface is, in step 405, back-filled with a polymer, selected from the polymers and binders set forth herein. In some other examples, the voids created by the imprinted mesh are back-filled, in step 405, with a polymer, selected from the polymers and binders set forth herein. This open void space is then back-filled with a polymer. In some example, the method further includes, in step 406, polishing the side of the film having polymer on the surface and the side which would bond to an electrochemical electrode if the film were used in a device. The polishing exposes inorganic electrolyte particles at the largest surface area film side. The polishing or etching may also remove excess polymer. The polishing also results in a film surface which is flat and has uniform surface roughness. In some examples, the polishing maximizes the amount of inorganic electrolyte that is exposed at the film surface in order to enhance the contact between the inorganic electrolyte component and the positive or negative electrodes which are interfacing with the polished film.

In some examples, certain steps, or all the steps together, can be automated. For example, in FIG. 4, the steps 401, 402, and 403 could be conducted in a continuous fashion. For example, green film is cast onto a imprinting design and then, in a continuous fashion, lifted off or removed from the imprinted design at the same time that more film is being cast. In some examples, steps 401, 402, and 403 could be conducted such that the product of step 403 is immediately transferred to an oven, horizontal tube furnace, or oven having a conveyer belt design. In some examples, the casting, imprinting, lift off, and sintering can all be conducted in a continuous fashion. In some examples, steps 401, 402, and 403 may be conducted using a Gravure machine, a Rotogravure machine, impression roller, instrument, or the like.

Cracked and Back-filled Film

Figure 7:
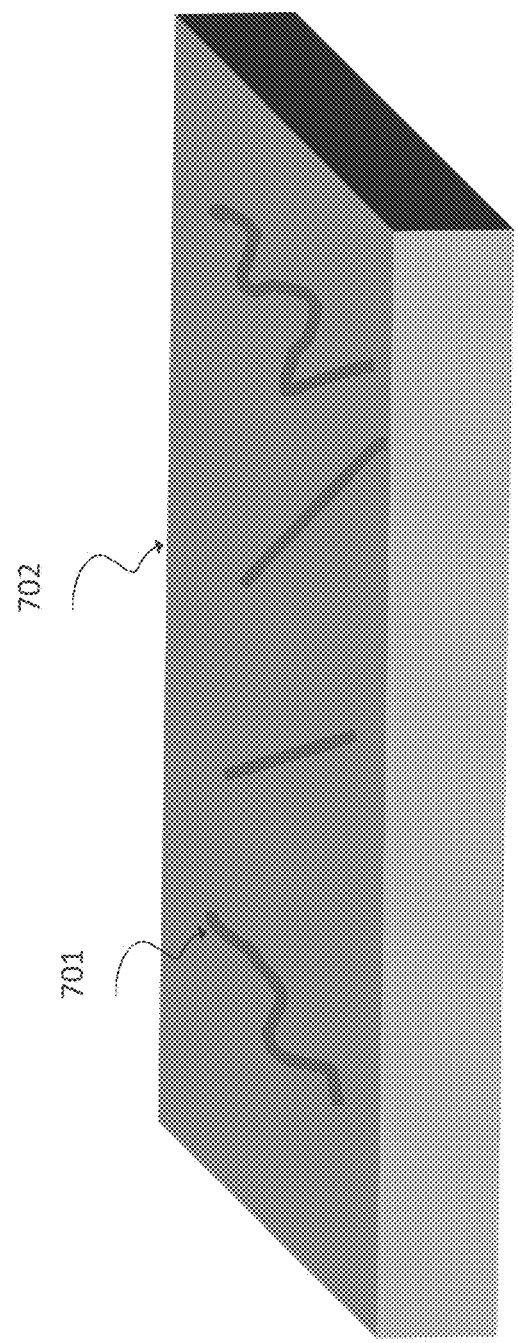
FIG. 7 illustrates an example cracked composite film with back-filled polymer.

In some examples, the methods set forth herein include making a composite electrolyte wherein the method includes providing a film or monolith which includes an inorganic solid state electrolyte. In some examples, the methods further include cracking (or inducing a crack in) the film or monolith. For example, as shown in FIG. 7, film 702 is shown having cracks therein. After cracking the film, a polymer or a binder, selected from those polymers and binders described herein, is back-filled into the film and into the cracks in the film. As shown in FIG. 7, cracked film 702 is back-filled at cracks 701. After back-filling the film with a polymer or a binder, the film can optionally be surface treated to remove any excess polymer or binder and to expose the inorganic electrolyte at the film's surface.

Polishing/Etching Surface of Composites

Figure 28:
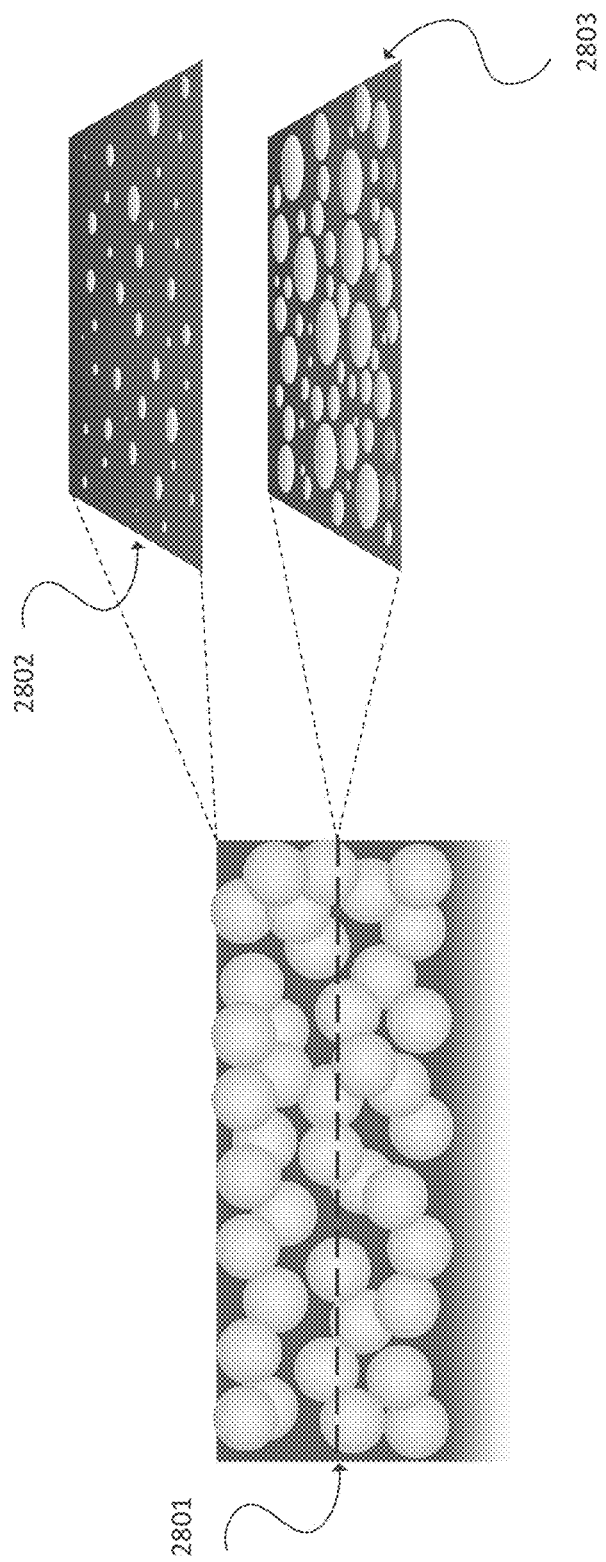
FIG. 28 illustrates an advantage for polishing an extruded thin film composite of $LiBH_4$:LiI and polypropylene which was formed by melt-pressing.

In some examples, the methods set forth herein include polishing or etching the surface of an solid state electrolyte composite in order to better expose the solid state electrolyte at the surfaces of a film which have the largest surface area. For example, as shown in FIG. 28, a composite 2801 is provided which has solid state inorganic electrolyte particles (spheres) in a polymer matrix. By polishing or etching the surface of the film having the largest surface area, top layer 2802 can be removed which exposes middle layer 2803. Layer 2802 has less inorganic electrolyte exposed at (or protruding from) the peripheral surface as compared to layer 2803. Therefore, by etching away, or polishing, layer 2802 to expose 2803, the amount of inorganic solid state electrolyte accessible at the film's surface is maximized.

EXAMPLES

Example 1

Making and Characterizing a Templated Porous Lithium-stuffed Garnet Solid State Electrolyte In this example, the steps shown in FIG. 2 were followed. Specifically, in this example, two green tape slurries, a first and second slurry, were made having, in the first slurry, approximately 6 µm diameter polyethylene spherical particles, and in the second slurry, approximately 12 µm diameter polypropylene spherical particles. A portion of the first slurry was mixed with garnet oxide electrolyte particles in 1:2 polyethylene:garnet volume ratio, and a portion of the first slurry was mixed with garnet oxide electrolyte particles in 1:1 polypropylene:garnet volume ratio. A portion of the second slurry was mixed with garnet oxide electrolyte particles in 1:2 polyethylene:garnet volume ratio, and a portion of the second slurry was mixed with garnet oxide electrolyte particles in 1:1 polypropylene:garnet volume ratio. Each of the four aforementioned slurries were cast as green films of unsintered garnet particles. The green film were sintered at about 1100° C. for one to four hours to prepare porous garnet electrolyte (see step 203 in FIG. 2 for an example of this step). FIG. 8 shows the surface roughness of a composite film formed from one of the second slurry which had the 12 µm diameter polypropylene spherical particles. FIG. 8 shows that the surface roughness is directly related to the structure of the polypropylene spherical particles that burned out as the porous garnet electrolyte sintered around the template. FIG. 8 shows that the surface features on the sintered garnet are comparable with the scale of the polypropylene spherical particles.

Example 2

Making and Characterizing an Polymer-backfilled and Imprinted Sintered Garnet Solid State Electrolyte In this example, the steps shown in FIG. 4 were followed.

Figure 9:
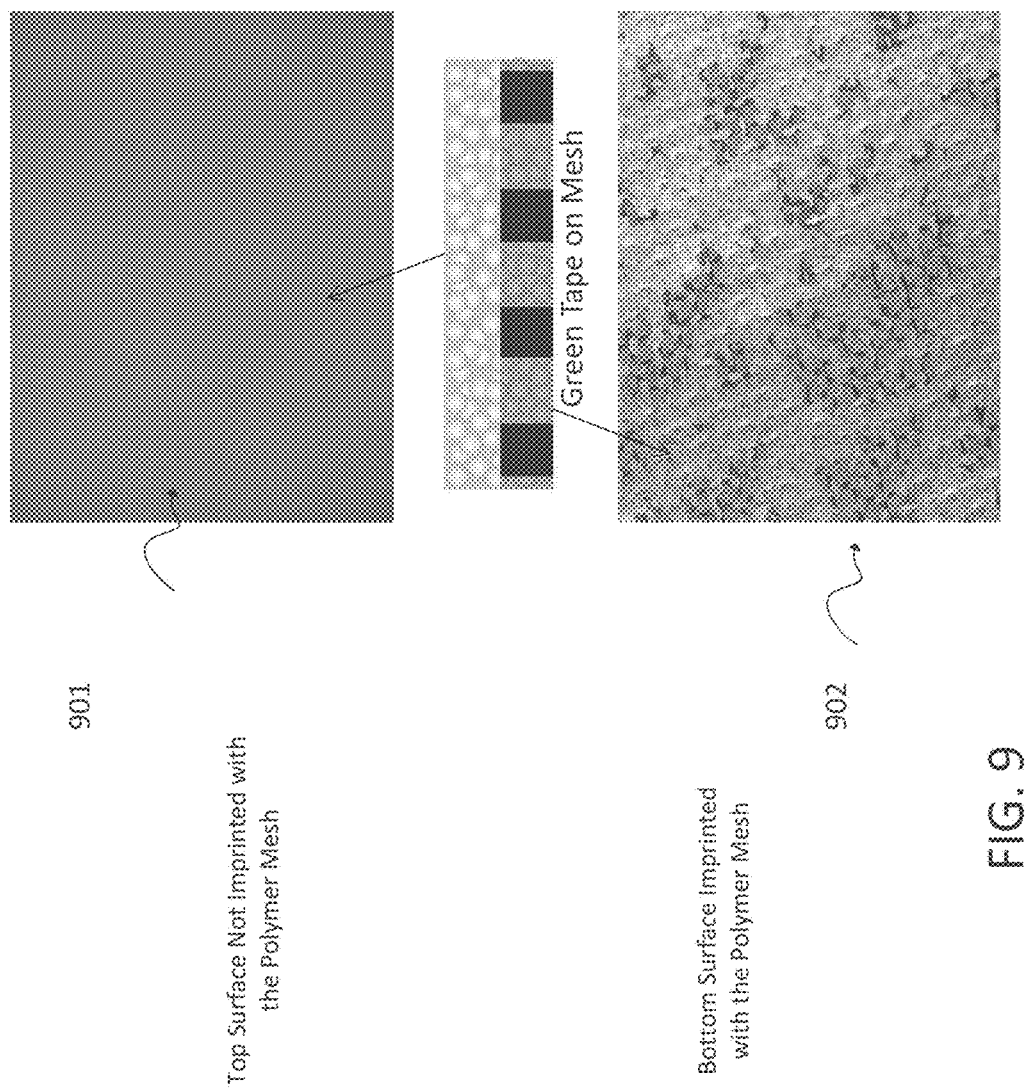
FIG. 9 is a magnified optical image of an imprinted green film of Example 2.
Figure 10:
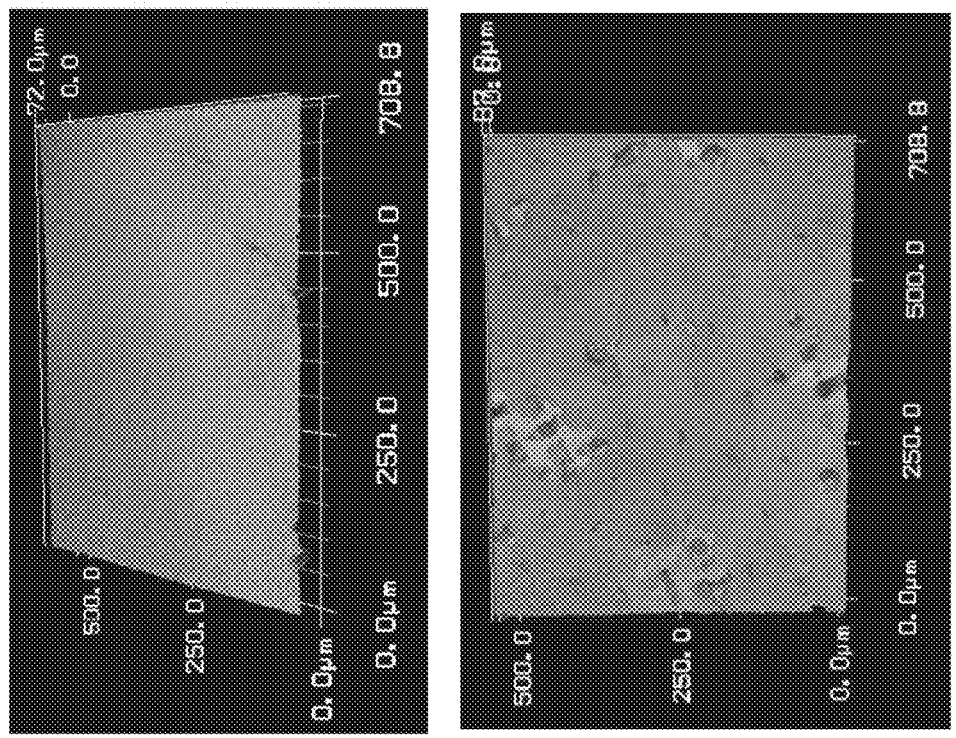
FIG. 10 is a surface profile for a sintered film prepared according to the imprinting method of Example 2 as observed on a Keyence VK-X100 instrument that measures surface roughness using a laser.

A first green tape slurry was made which included 70-90 um diameter sized garnet particles and a polymer. The slurry was cast as a thin film using a doctor blade technique. After the film was cast, it was imprinted with a polyester polymer mesh. The polyester polymer mesh had a 320 mesh size, an 80 µm grid spacing, a 40 µm opening size, 25% open area, and 40 µm wide diameter. The polymer mesh was partially submerged (~25 µm penetration into the side of the film, corresponding to about 25% of the total film thickness) into one side of the green film by hot pressing the mesh into the unsintered green film at about 125-175° C. The mesh was lifted off of the green film. FIG. 9 shows an optical image of this imprinted green film. In this example, the sample imprinted with a nylon mesh is shown in FIG. 9. FIG. 9 shows that the top surface (901) of the film that was not imprinted with the polymer mesh was smooth. FIG. 9 shows that bottom surface (902) that was imprinted with the polymer mesh retained the polymer mesh pattern after the pattern was lifted off the green tape. FIG. 10 shows the surface roughness of the top and bottom surfaces of the imprinted film. FIG. 10 shows that the side of the film in direct contact with the polymer mesh (i.e., bottom) retains the spacing of the polymer mesh that was imprinted thereupon.

A first green tape slurry was made which included 70-90 um diameter sized garnet particles and a polymer. The slurry was cast as a thin film using a doctor blade technique. After the film was cast, it was imprinted with a polyester polymer mesh. The polymer mesh was made of nylon and had a 198 mesh size, an 128 µm grid spacing, an 88 µm opening size, 49% open area, and 40 µm wide diameter. The polymer mesh was partially submerged (~25 µm penetration into the side of the film, corresponding to about 25% of the total film thickness) into one side of the green film by hot pressing the mesh into the unsintered green film at about 125-175° C. The polymer mesh was lifted off the green film and the green film was sintered.

Figure 11:
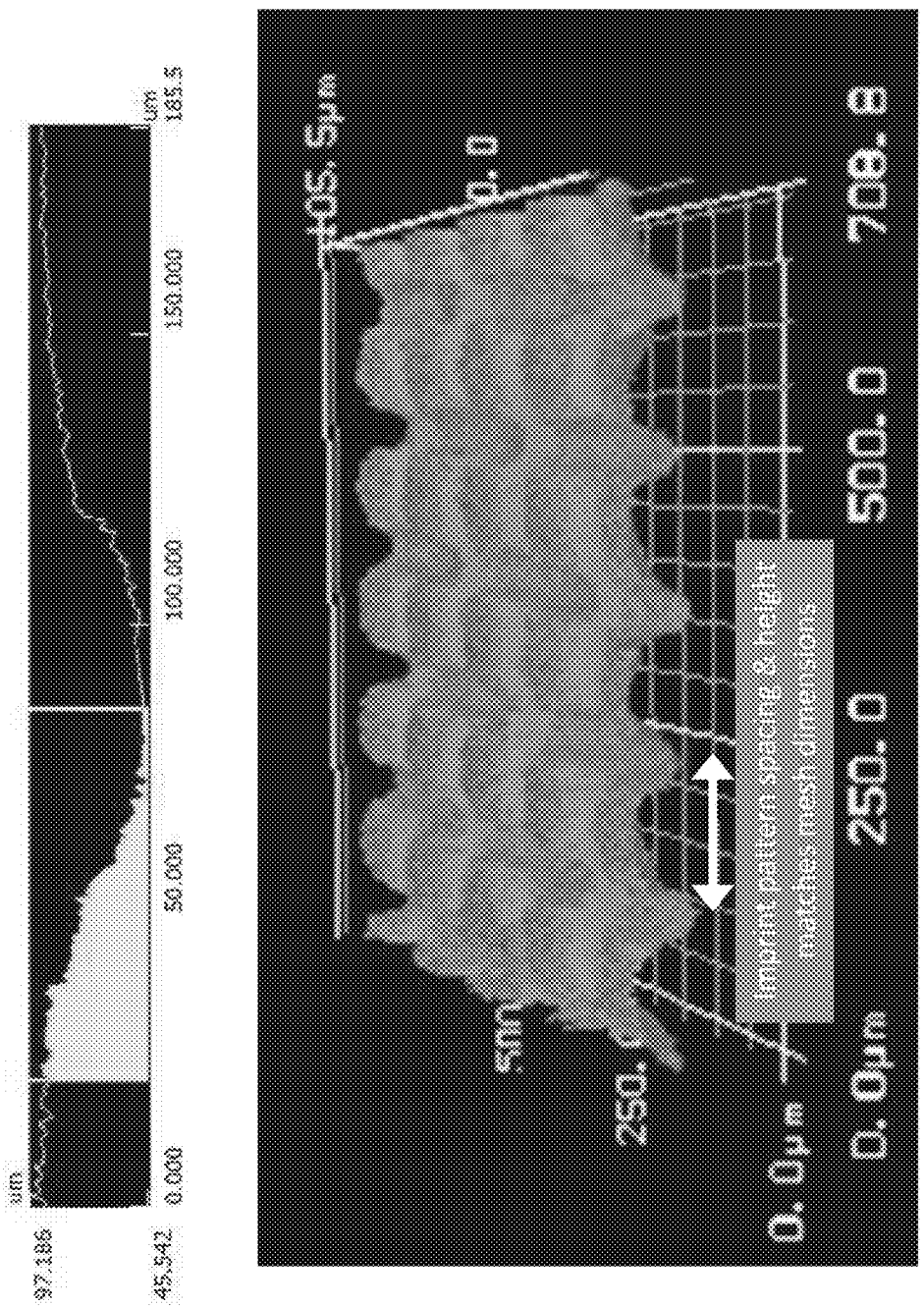
FIGS. 11 and 12 are surface profiles for the sintered film prepared according to Example 2 as observed on a Keyence VK-X100 instrument that measures surface roughness using a laser.
Figure 12:
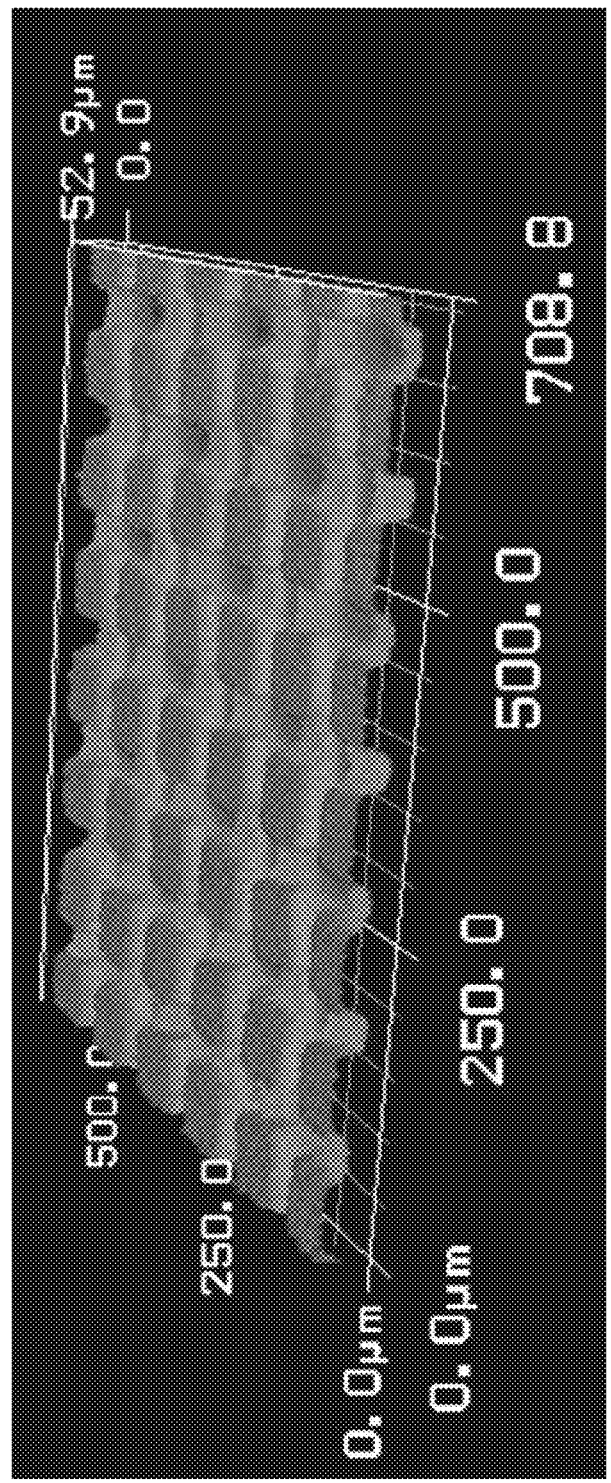
Figure 13:
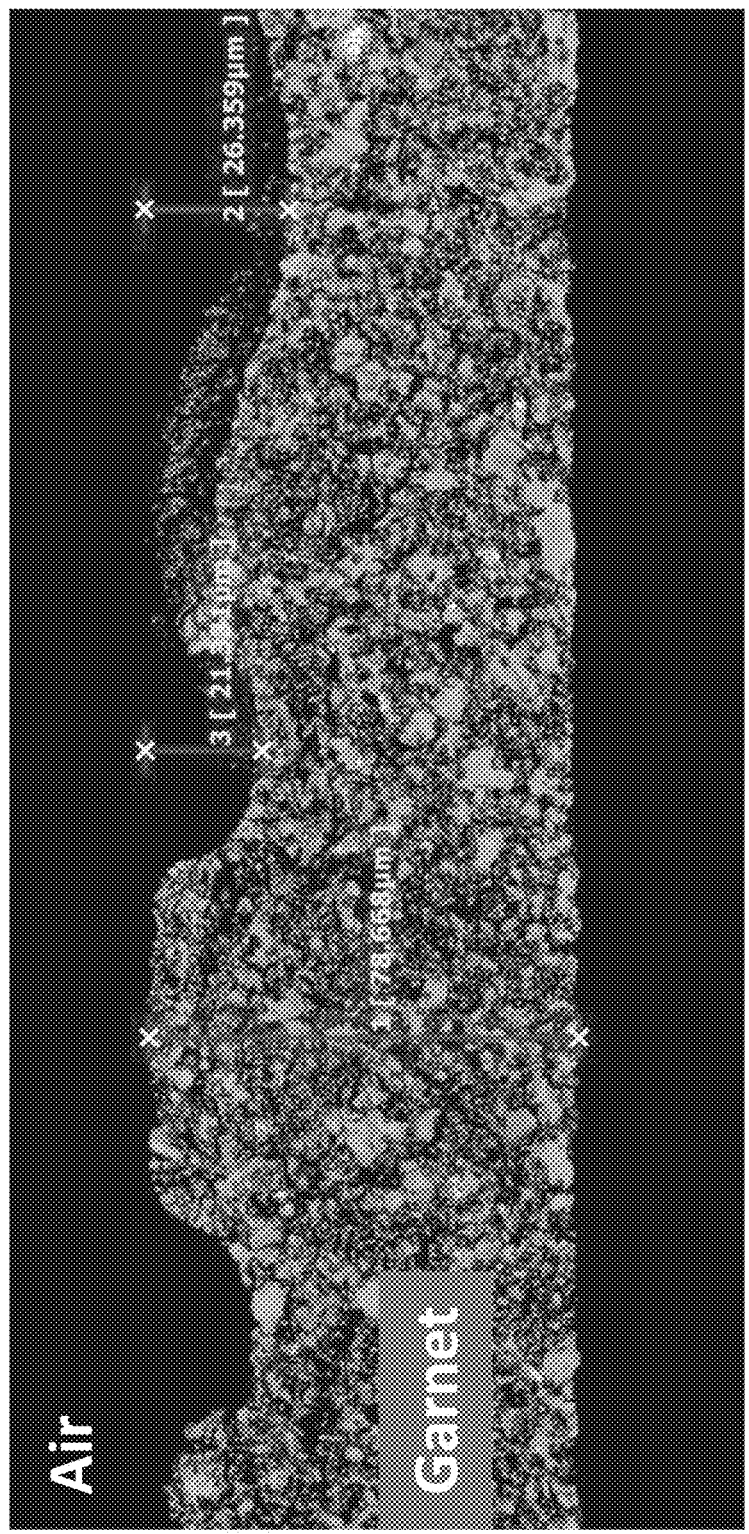
FIG. 13 shows a cross-sectional scanning electron microscopy (SEM) images of a sintered lithium-stuffed garnet film, which is not back-filled with a polymer, prepared according to an embodiment of Example 2.

FIGS. 11-12 show Keyence VK-X100 surface roughness measurements of the sintered film. FIGS. 11-12 show that the pattern from the nylon mesh was transferred to the sintered film. The peak-to-peak measurement shows a depth of channel at about 45 µm, which is comparable to the nylon mesh diameter. FIG. 13 shows an SEM image of the nylon imprint in the sintered garnet which is approximately 45 µm thick once sintered.

Figure 14:
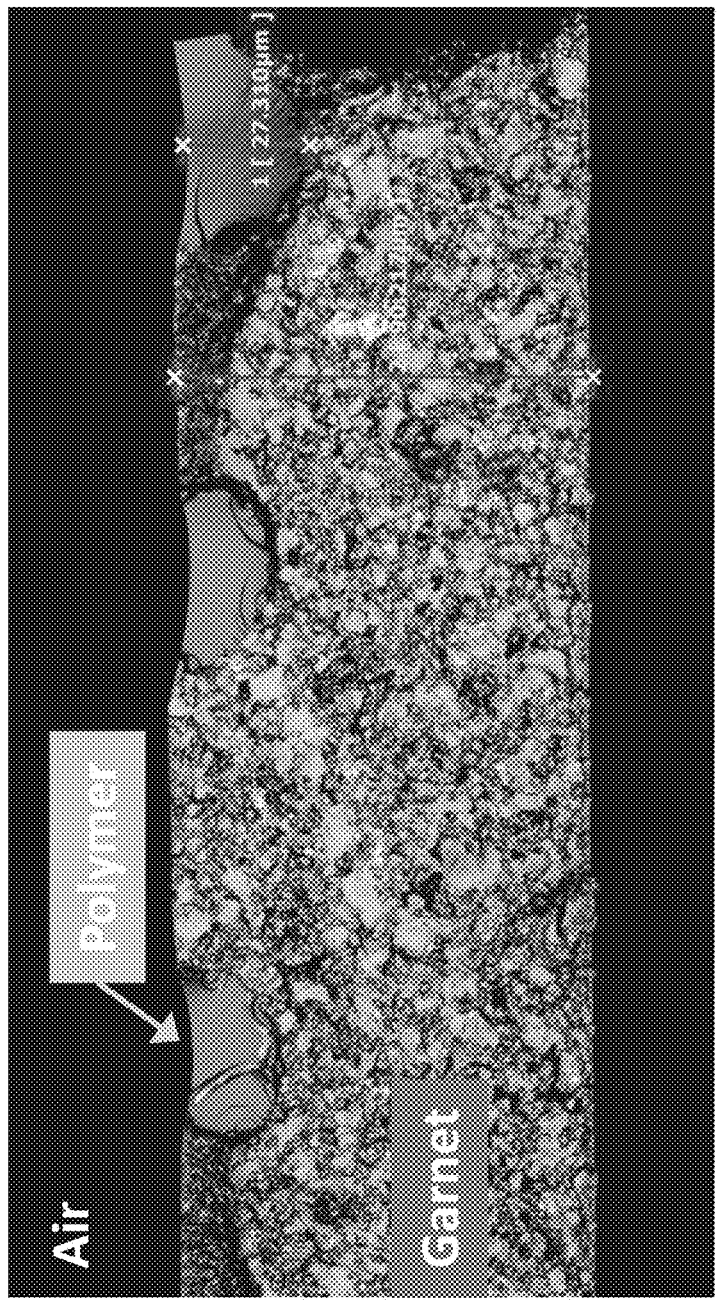
FIG. 14 shows a cross-sectional scanning electron microscopy (SEM) images of a sintered and back-filled lithium-stuffed garnet film prepared according to an embodiment of Example 2.

After sintering the green film, the sintered film had the morphology as shown in FIG. 13. In FIG. 13, one side of the film a surface texture that is representative of the polymer mesh that was used to imprint this surface texture into the sintered film. In a subsequent step, the sintered film was back-filled with a polymer. The resulting structure is shown in FIG. 14. In FIG. 14, layer 1402 includes a sintered lithium-stuffed garnet oxide electrolyte. Layer 1401 is the polymer that was used to back-fill the surface pattern of the garnet electrolyte. In FIG. 14, the polymer used to back-fill the surface texture pattern is poly(tri(propylene glycol) diacrylate).

Example 3

Figure 15:
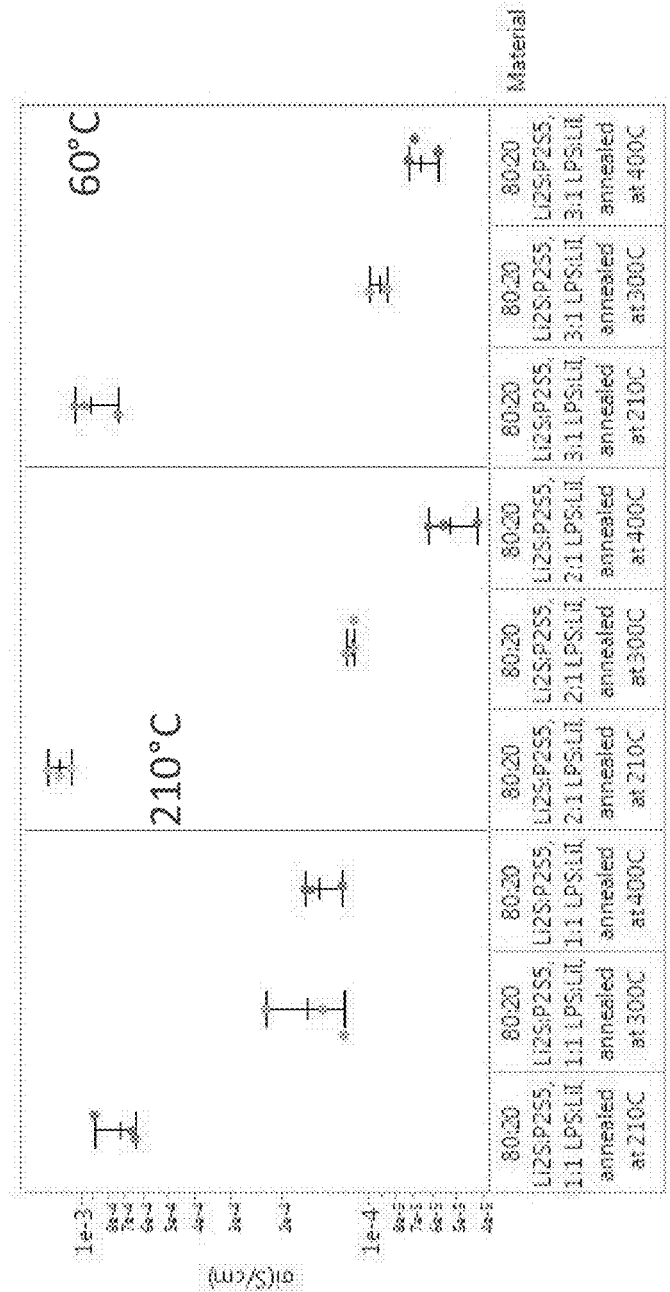
FIG. 15 shows ionic conductivity values for a variety of composite electrolytes prepared according to Example 3.
Figure 16:
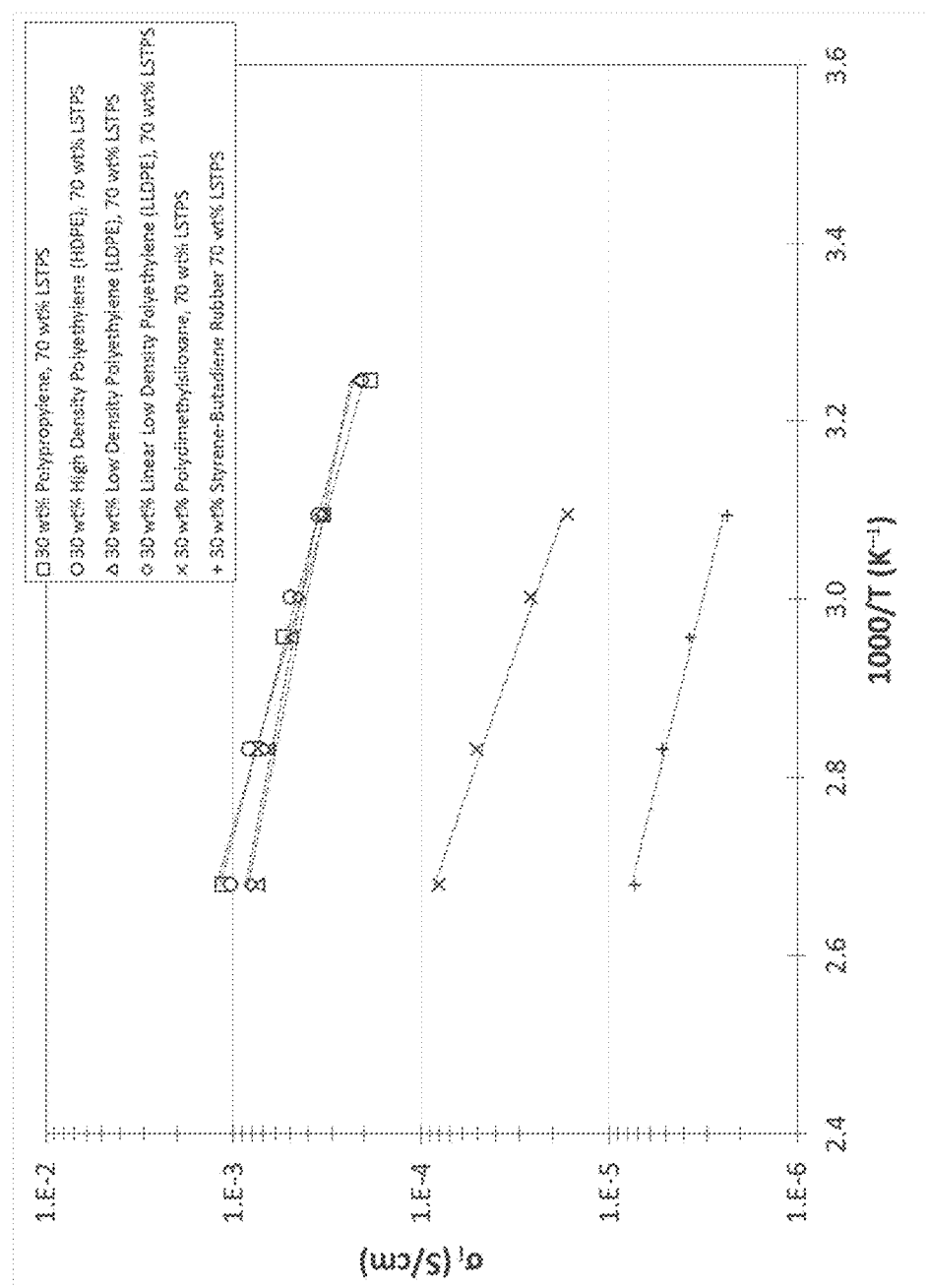
FIG. 16 shows conductivity data for an extruded polymer (e.g., polypropylene) containing composites of LSTPS to Example 5, in which the mass loading of LSTPS was kept constant but the polymers used was varied.
Figure 17A:
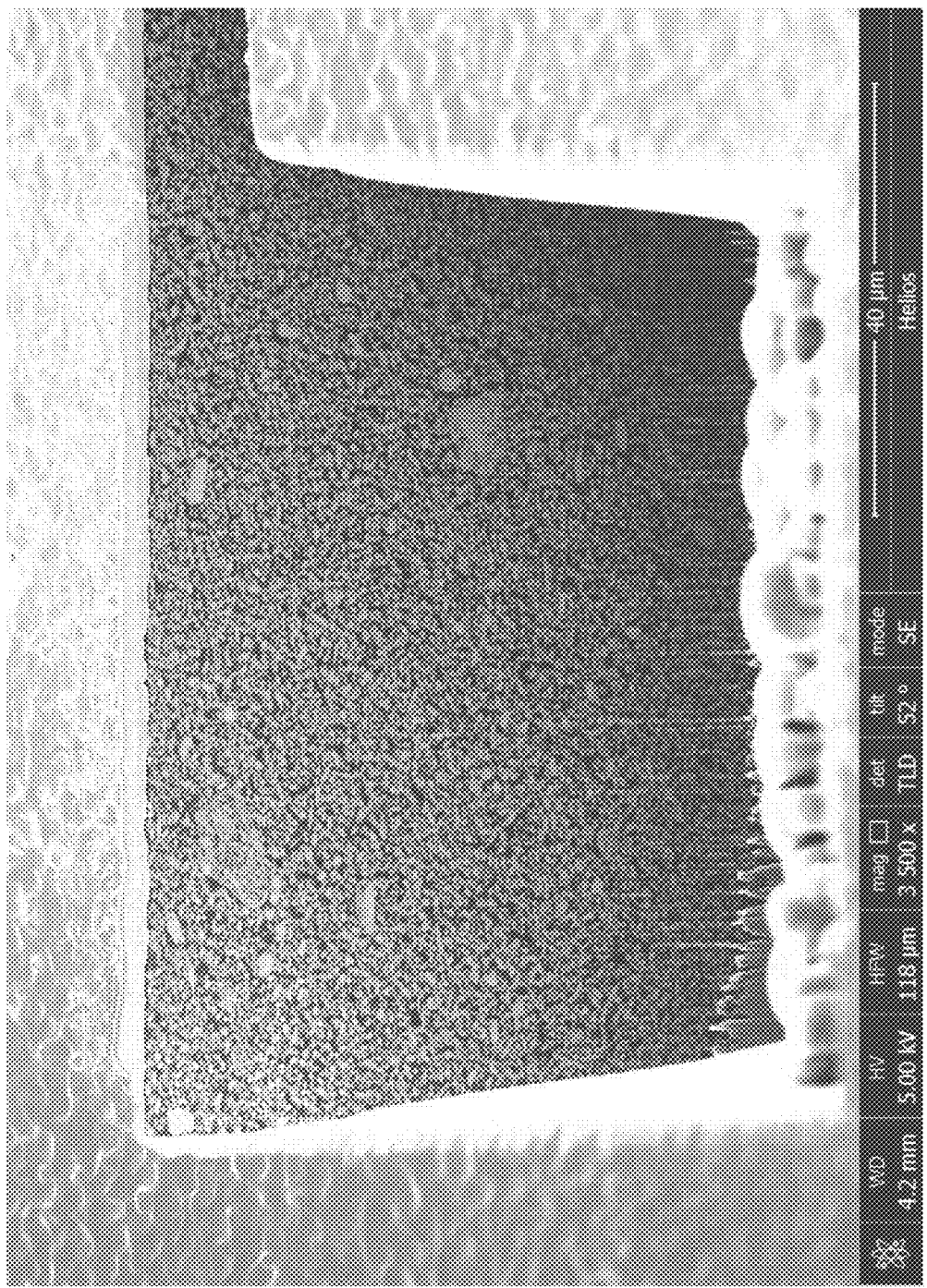
FIG. 17A shows a high conductivity and low porosity sample (30wt % Polypropylene, 70wt % LSTPS) used to generate the data in FIG. 16.
Figure 17B:
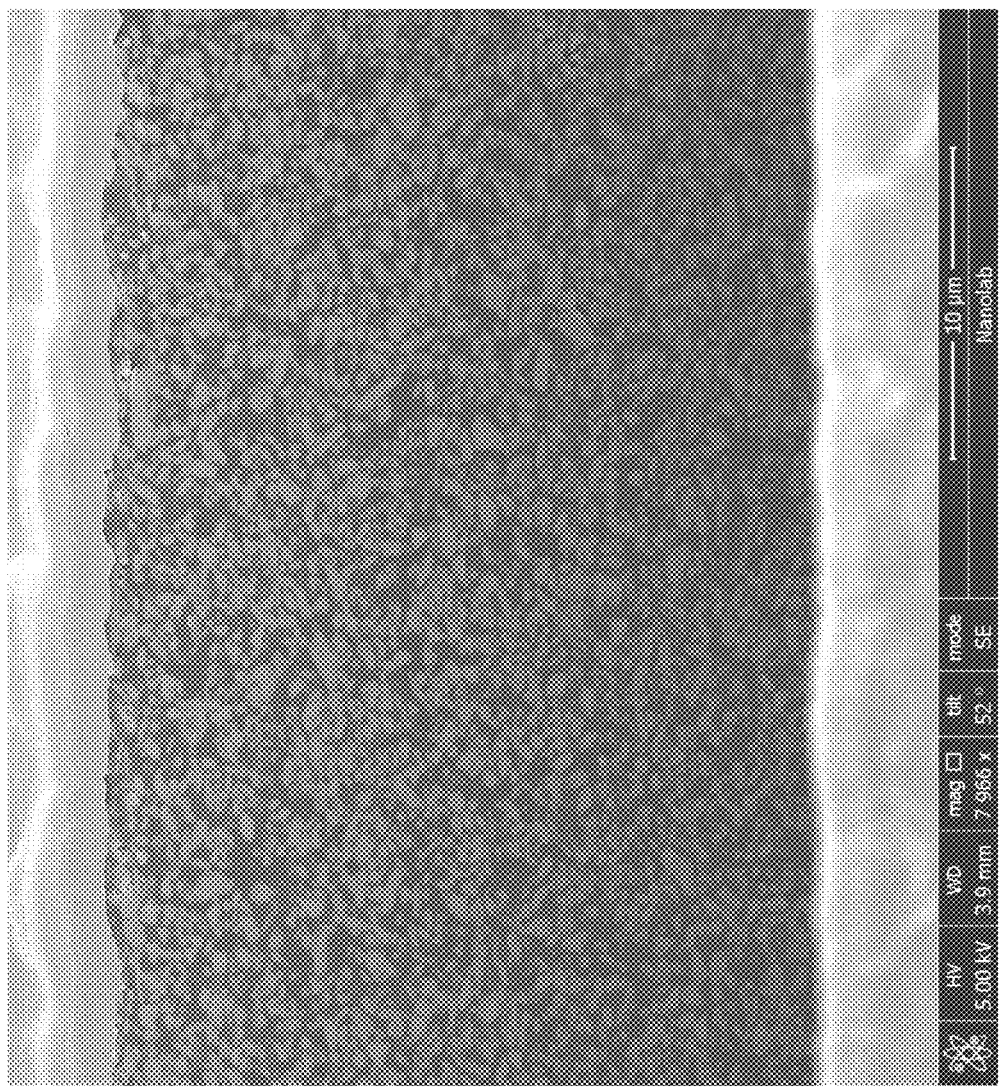
FIG. 17B shows a high conductivity and low porosity sample (30wt % Polypropylene, 70wt % LSTPS) used to generate the data in FIG. 16.
Figure 18:
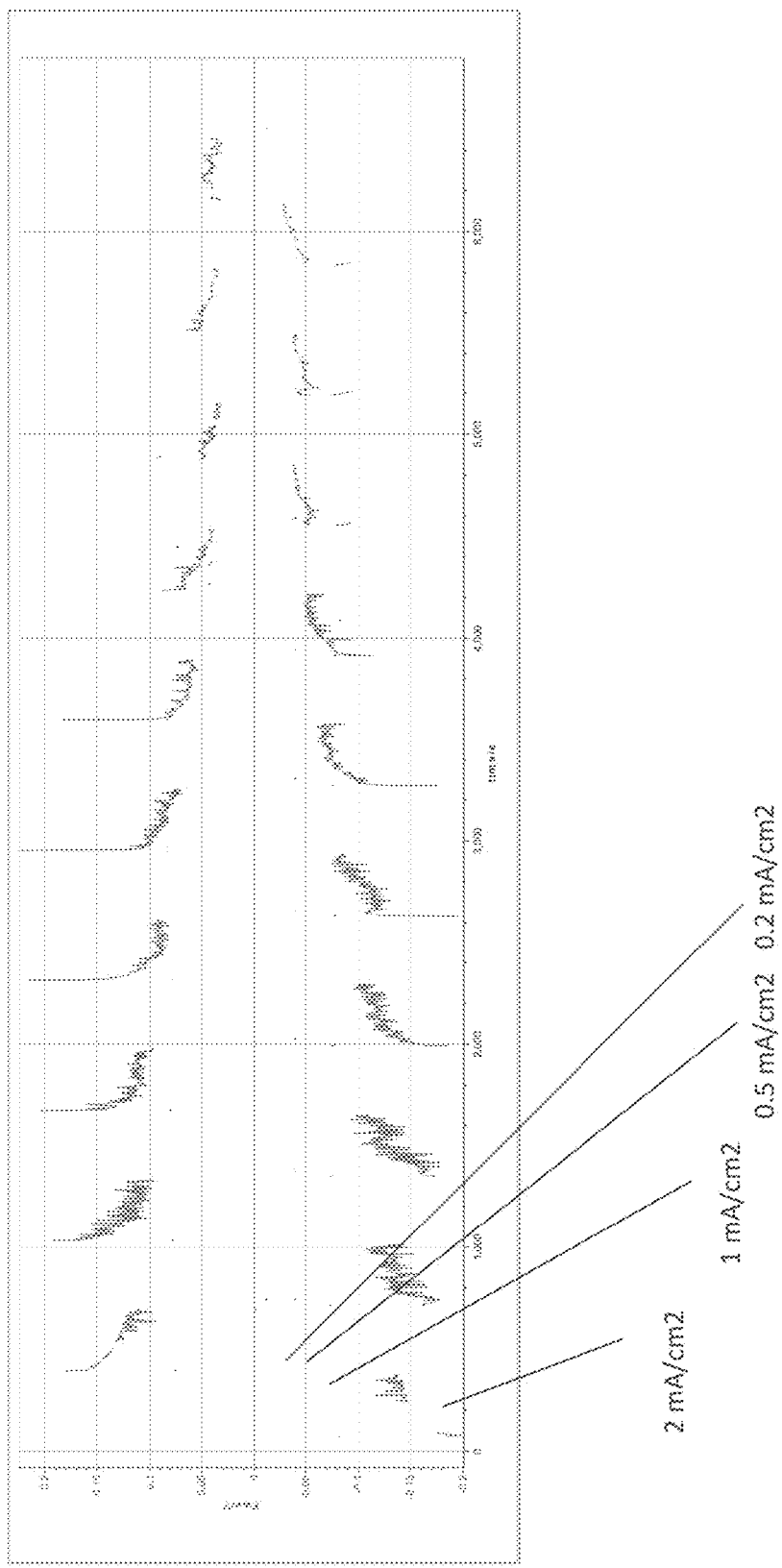
FIG. 18 shows DC cycling of Li at 80° C. in a sulfide composite of 80% w/w LTSPS in polypropylene.

Making Lithium-Phosphorus-Sulfur-Iodide Solid State Electrolytes and Composites Thereof by Extrusion Methods and Using the Same In this example, a mixture of $Li_2S:P_2S_5$ (herein "LPS") was prepared, in an 80:20 mole ratio. Then, the LPS was mixed with LiI in amounts of a 1:1 molar ratio, a 2:1 molar ratio, and a 3:1 molar ratio wherein this molar ratio can be represented by [LPS:LiI]. The resulting mixture was then annealed at 210° C., 300° C., or 400° C. Accordingly, $(Li_2S:P_2S_5):(LiI)$, $2(Li_2S:P_2S_5):(LiI)$, and $3(Li_2S:P_2S_5):(LiI)$ solid state electrolytes were made that were annealed at 210° C.; $(Li_2S:P_2S_5):(LiI)$, $2(Li_2S:P_2S_5):(LiI)$, and $3(Li_2S:P_2S_5):(LiI)$ solid state electrolytes were made that were annealed at 300° C. $(Li_2S:P_2S_5):(LiI)$, $2(Li_2S:P_2S_5):(LiI)$, and $3(Li_2S:P_2S_5):(LiI)$ solid state electrolytes were made that were annealed at 400° C. As shown in FIG. 15, certain compositions demonstrated a conductivity of $1\times10^{-3}$ S/cm at 60° C. As shown in FIG. 15, lower annealing temperatures were associated with high conductivity values for the LPS:LiI compositions. Also as shown in FIG. 15, the $2(Li_2S:P_2S_5):(LiI)$ and $3(Li_2S:P_2S_5):(LiI)$ compositions were observed to have a higher conductivity than the $(Li_2S:P_2S_5):(LiI)$ composition.

Conductivity measurements were performed by first cold pressing the powder into a pellet of ½" in diameter and approximately 1-1.5 mm in thickness. Next, Indium foil electrodes were applied to both sides of the pellet. Then, an AC signal was applied from a range of 1 MHz to 100 mHz in a potentiostatic electrochemical impedance spectroscopy measurement. Conductivity values were obtained by normalizing the current response the geometry of the pellet.

Figure 20:
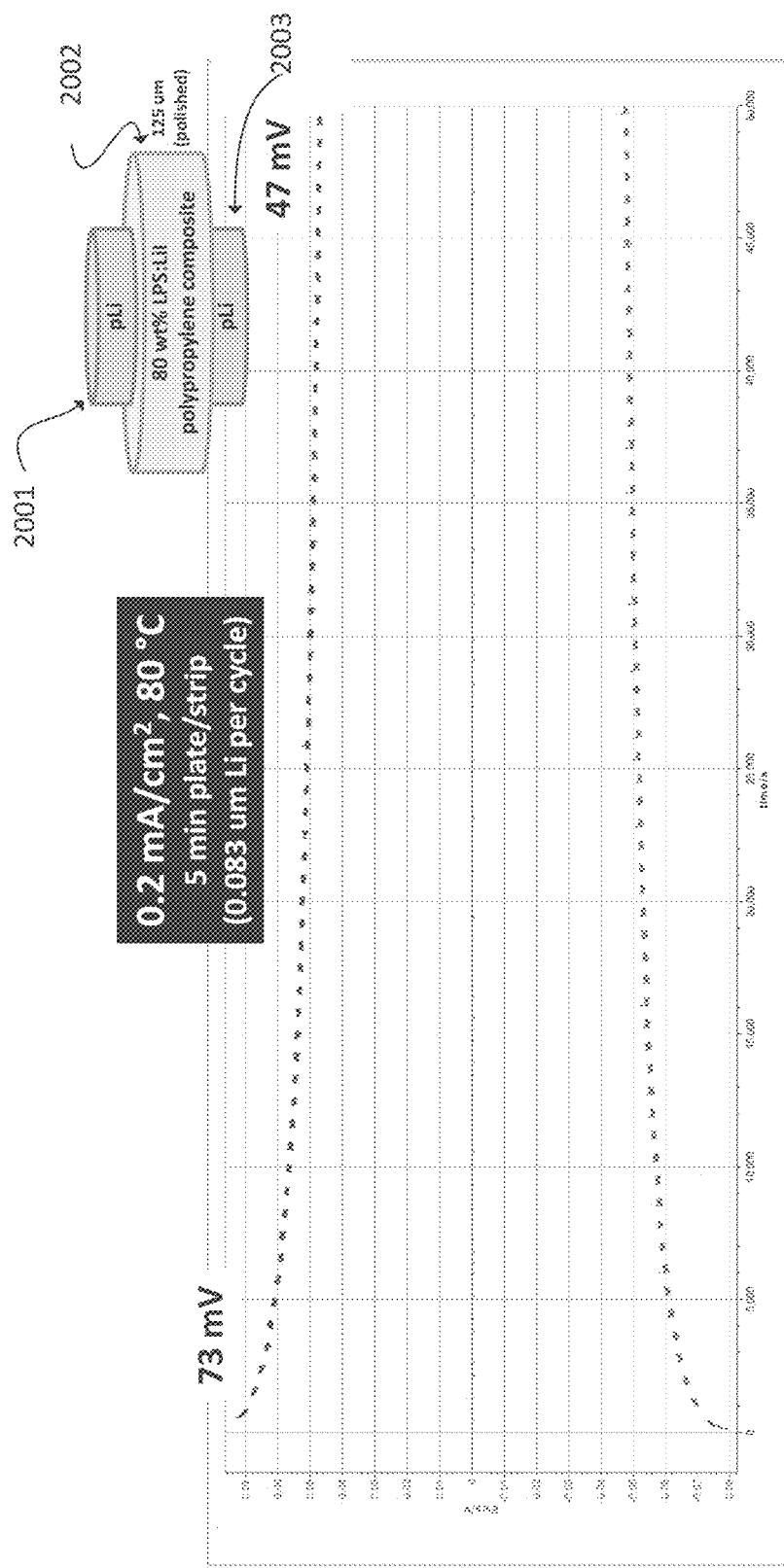
FIG. 20 shows a plot of conductivity for a sulfide electrolyte composite of 80% w/w LPS:LiI in polypropylene.

Separate batches of 2($Li_2S:P_2S_5$):(LiI) annealed at 210° C. were prepared. After annealing, the electrolytes were formulated with polypropylene and extruded as a composite of polypropylene and one of the aforementioned LPS compositions. The extrusion process included mixing in a twin screw extruder at a temperature above the melting point of polypropylene, followed by pressing of the extruded composite material in a heated press at a temperature above the melting point of polypropylene. The amount of LPS:LiI in the polypropylene was 80% w/w. As shown in FIG. 20, the composite was polished, 2002, and placed between two symmetric Li-metal electrodes, 2001 and 2003. The symmetric cell was subjected to 0.2 mA/cm$^2$ at 80° C. for 5 minute plating and stripping. This experiment conducted a 0.083 μm-thick layer of Li-metal from one side of the electrolyte to the other.

Example 4

Making and Using Lithium-Silicon-Tin-Phosphorus-Sulfur-Iodide Solid State Electrolytes and Composites Thereof In this example, $Li_{10}Si_{0.5}Sn_{0.5}P_2S_{12}$ (hereinafter "LSTPS") was wet milled to produce LSTPS particles having a $d_{50}$ particle diameter of about 50 nm to 500 nm. In this Example, LSTPS is referred to a compound characterized by the formula $Li_{10}Si_{0.5}Sn_{0.5}P_2S_{12}$. The milled particles were then filtered to produce a monodisperse particle collection. The milled and filtered, monodisperse LSTPS particles were then mixed in 75:25, 80:20, or 90:10 w/w ratios polypropylene polymer. The LSTPS polypropylene composite was hot press extruded to produce a LSTPS polypropylene composite film having a film thickness of about 65 μm. The LSTPS polypropylene composite film was cast directly on a nickel foil substrate.

Figure 19:
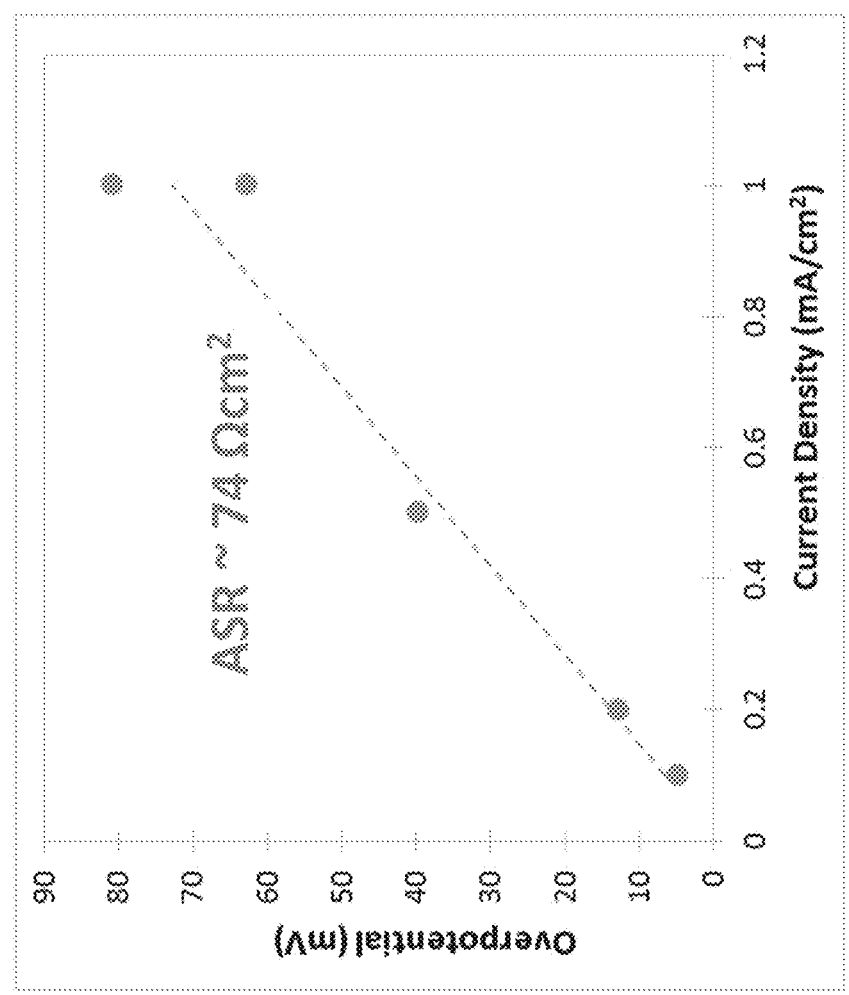
FIG. 19 shows area-specific resistance for a sulfide composite of 80% w/w LTSPS in polypropylene.
Figure 21:
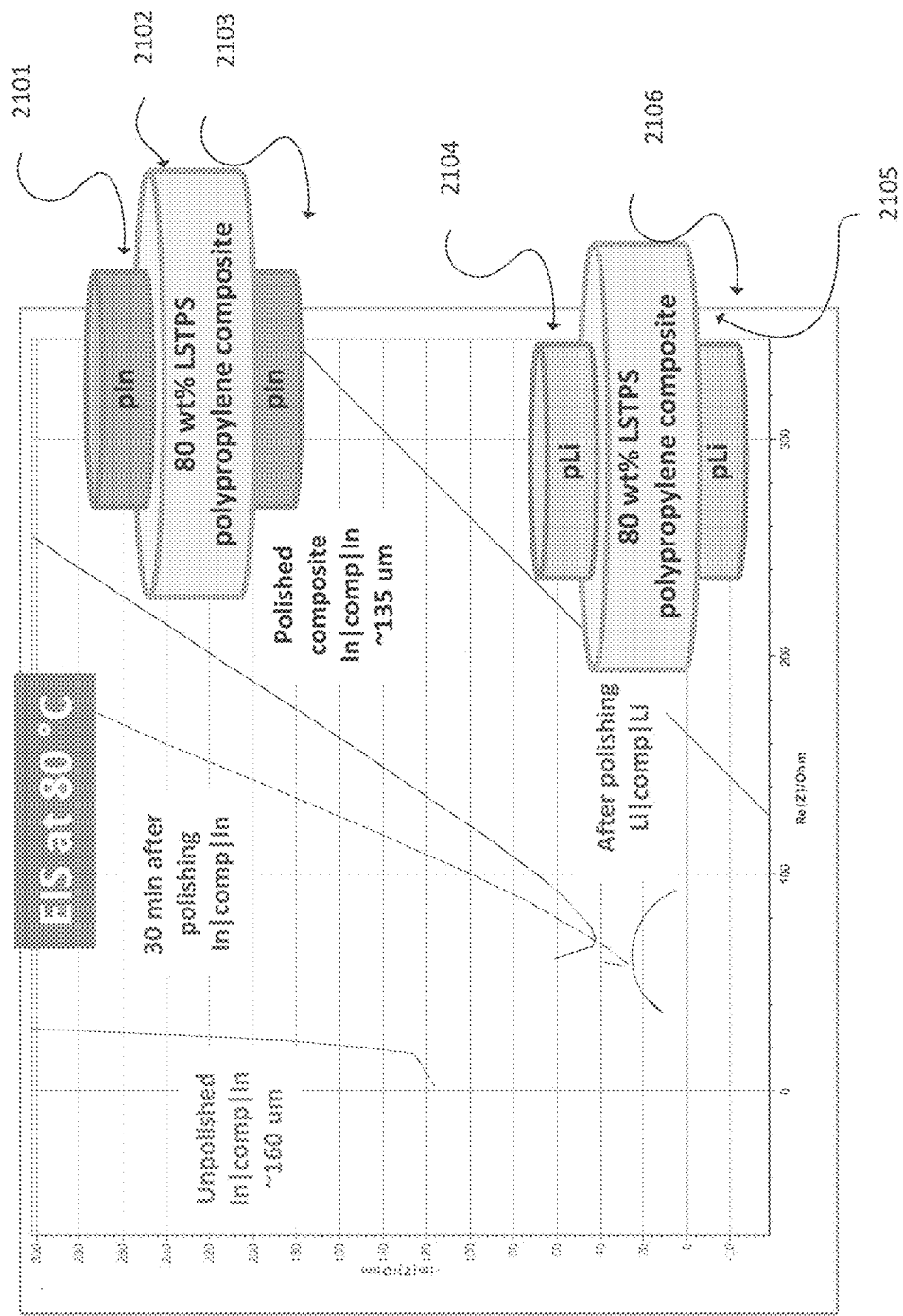
FIG. 21 shows impedance measurements for a sulfide electrolyte composite of 80% w/w LTSPS in polypropylene.

The surfaces of the cast films were polished. FIG. 19 shows a plot of ASR for these LSTPS polypropylene composites. FIG. 21 shows the effect of polishing the LSTPS polypropylene composites as compared to not polishing the LSTPS polypropylene composites. As shown in FIG. 21 symmetric cells were constructed having either In electrodes (2101 and 2103) or Li electrodes (2104 and 2106). An 80% w/w the LSTPS polypropylene composite (2102 or 2105) was positioned in between these two In or Li electrodes. The LSTPS polypropylene composite was polished in one instance not polished in another instance. As shown in FIG. 21, the polished composites had lower ASR than their corresponding unpolished samples. Polishing conditions included hand polishing the LSTPS polypropylene composite surfaces to remove 5-20 microns of composite using 2000 grit sand paper.

The polished LSTPS polypropylene composite films were placed between positive and negative electrodes, both comprising Li-metal, in a symmetrical coin cell architecture. The coin cells were cycled at 50° C. and at either 0.5, 1, or 2 mA/cm$^2$. As detailed in Table 1, below, the LSTPS polypropylene composites in this configuration were observed to cycle at least 200 nm (0.04 mAh/cm$^2$) of lithium between the electrodes and through the composite electrolyte. The observed results are tabulated below in Table 1.

TABLE 1

Li Plating/stripping Results.

| Amount of Lithium transferred per cycle | Current passed, I (mA/cm$^2$) | Plate/ strip time (minutes) | Temperature (° C.) | # of cycles completed |
|---|---|---|---|---|
| 5 μm/cycle | 0.5 | 120 | 50 | 50 |
| 5 μm/cycle | 1.0 | 60 | 50 | 50 |
| 5 μm/cycle | 2.0 | 30 | 50 | 50 |
| 10 μm/cycle | 0.5 | 240 | 50 | 50 |
| 10 μm/cycle | 1.0 | 120 | 50 | 50 |
| 10 μm/cycle | 2.0 | 60 | 50 | 50 |
| 20 μm/cycle | 0.5 | 480 | 50 | 50 |
| 20 μm/cycle | 1.0 | 240 | 50 | 50 |
| 20 μm/cycle | 2.0 | 120 | 50 | 50 |

Figure 22:
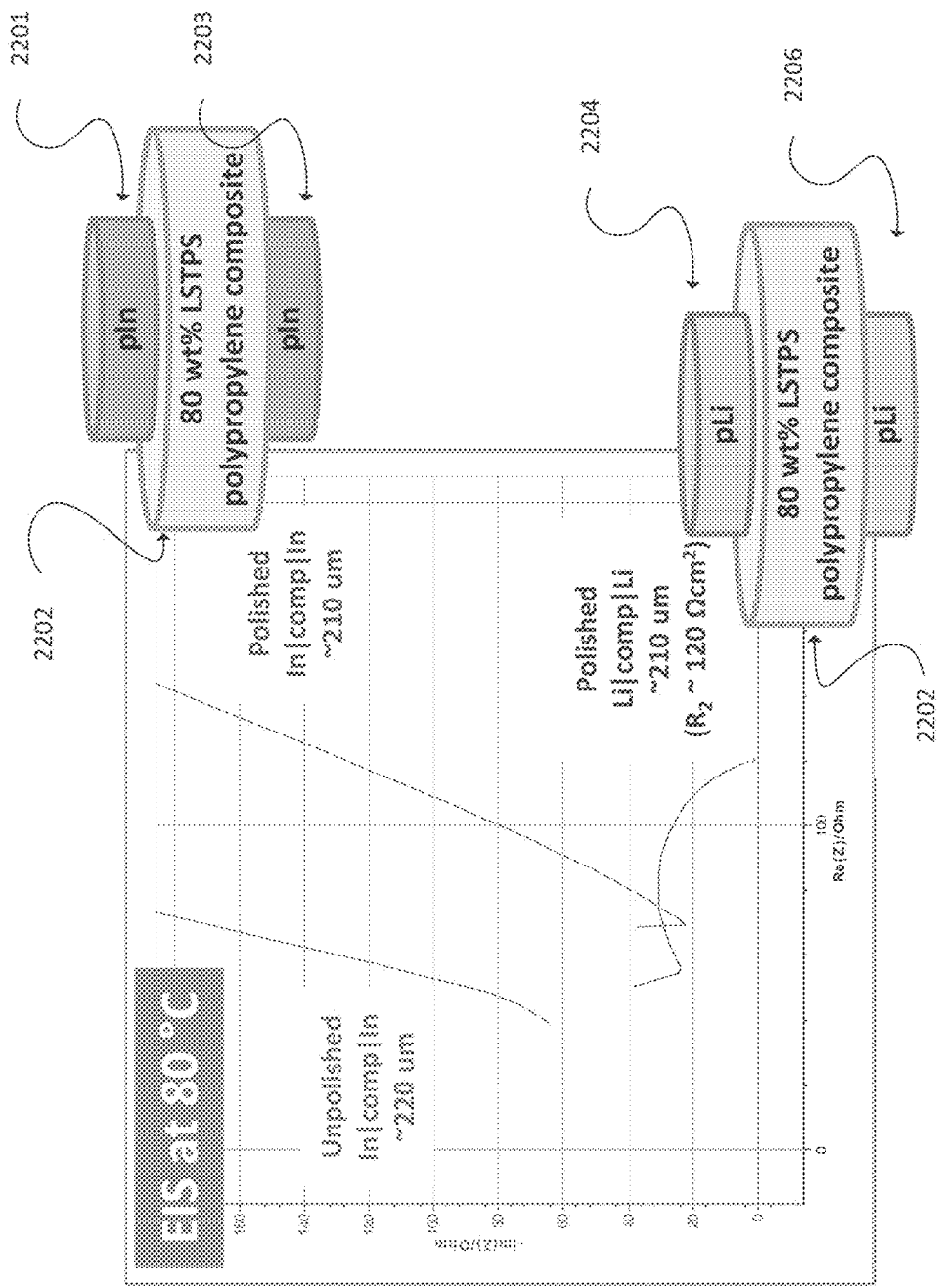
FIG. 22 shows impedance measurements for a sulfide electrolyte composite of 80% w/w LTSPS in polypropylene and demonstrates the effect observed when the composites are polished.

FIG. 22 also shows a benefit of polishing the LSTPS polypropylene composites in this Example. Without being bound to theory, it may be that the polishing removes some polymer material the surface of the LSTPS polypropylene composite film and thereby exposes more solid state LSTPS electrolyte at the sides interfacing the positive or negative electrode.

Figure 23:
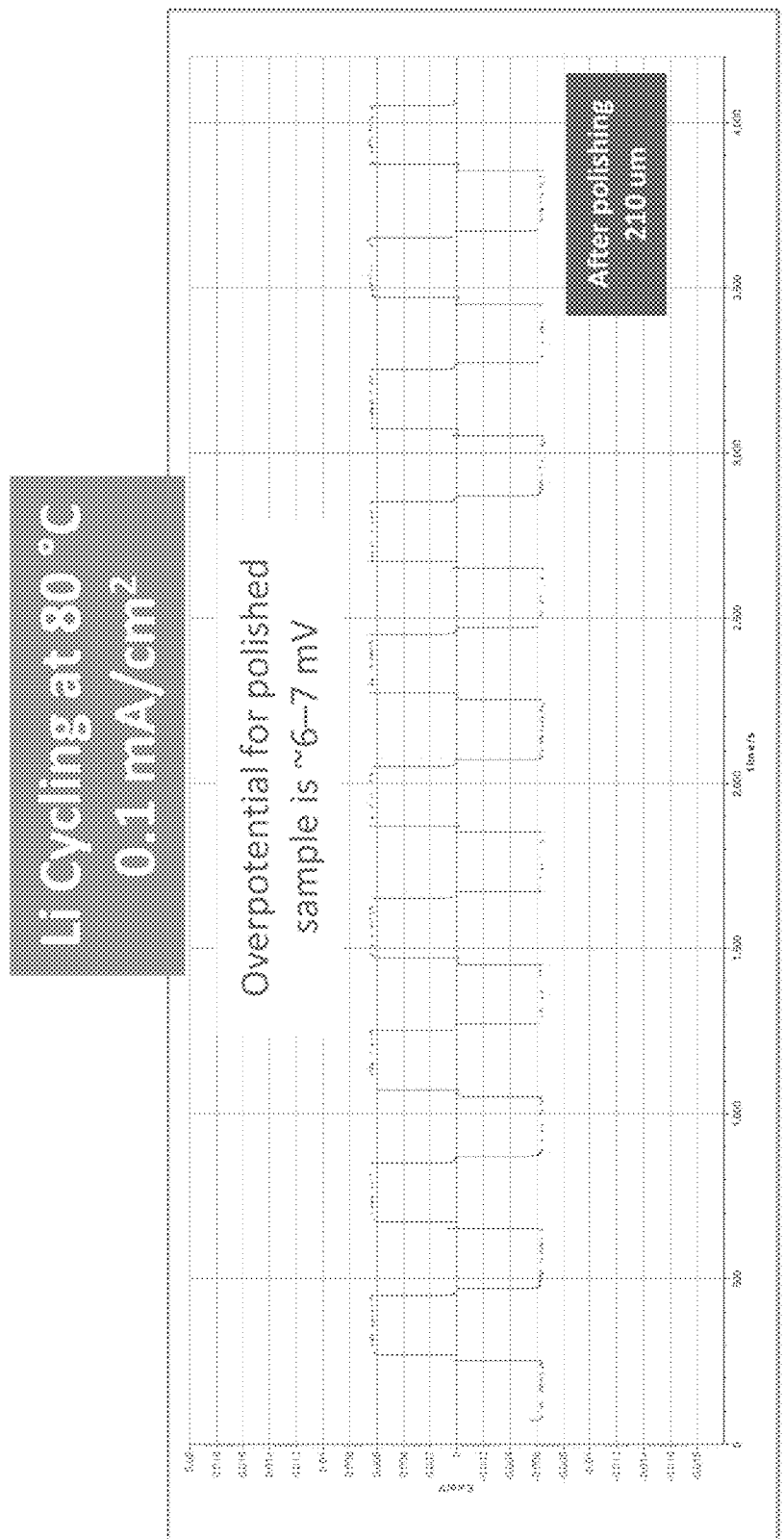
FIG. 23 shows Lithium plating/stripping cycling data for a sulfide electrolyte composite of 80% w/w LTSPS in polypropylene.

FIG. 23 also shows the benefit of polishing the LSTPS polypropylene composite. In this example, a symmetric electrochemical cell having Li electrodes and an LSTPS-polypropylene composite therebetween was cycled at 80° C. and 0.1 mA/cm$^2$. The composite cycled for several cycles with an overpotential of about 6-7 mV.

Figure 24:
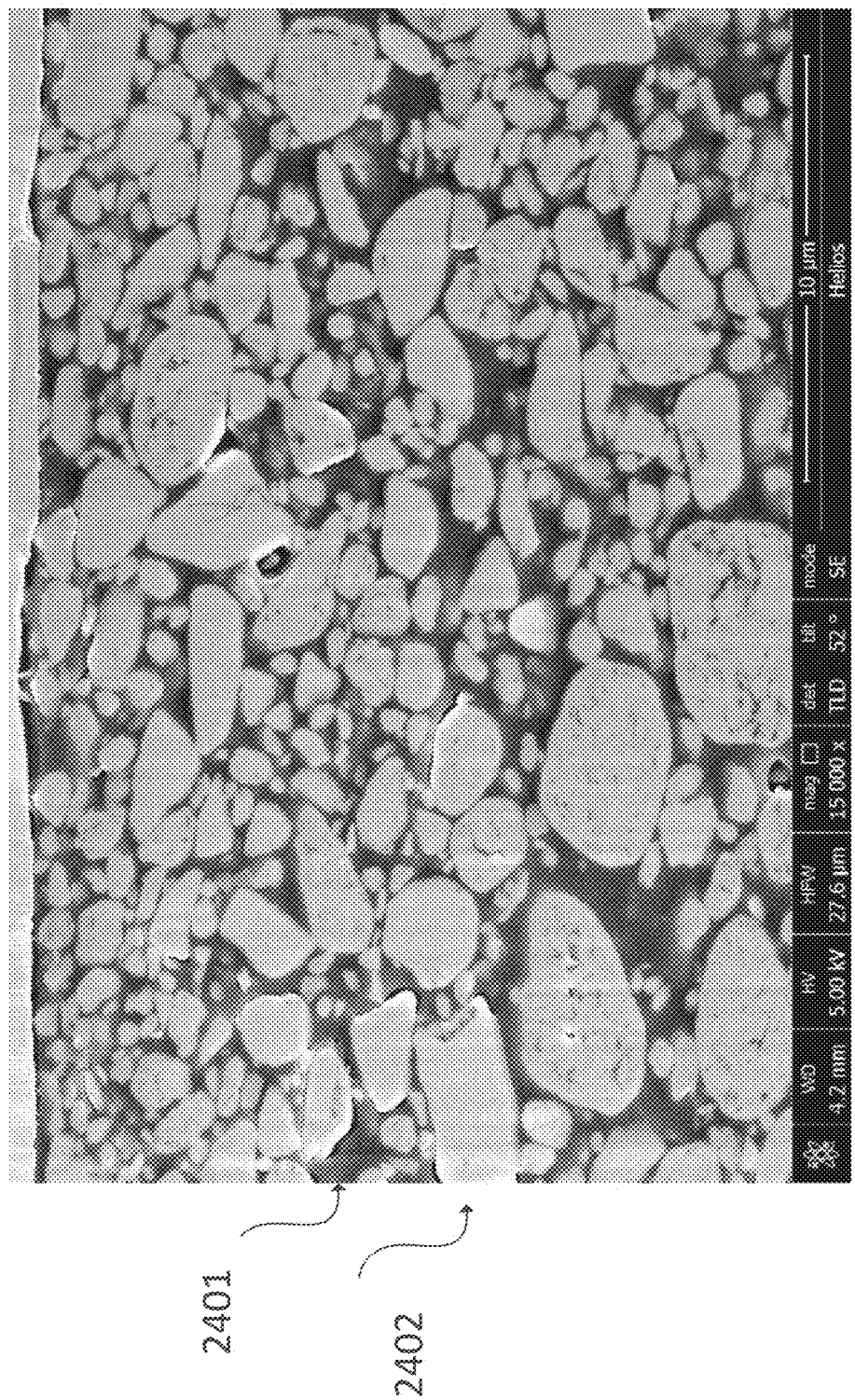
FIG. 24 shows an SEM image for a sulfide electrolyte composite of 80% w/w LTSPS in polypropylene.

FIG. 24 shows an example SEM image of a LSTPS-polypropylene composite described herein. In this image, 2402 represents the LSTPS particles. In this image, 2401 represents the polymer surrounding the LSTPS particles. FIG. 24 also shows that the LSTPS-polypropylene composite is approximately 80% w/w (by weight) of the composite with the remaining 20% w/w being the polymer.

Figure 30:
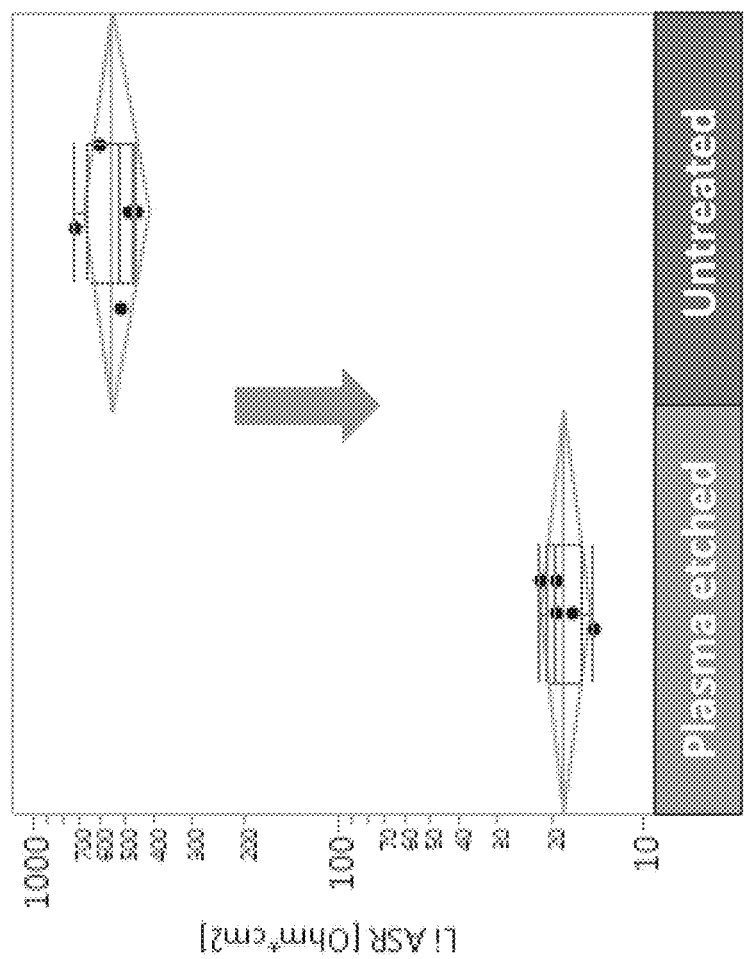
FIG. 30 illustrates the beneficial effect of plasma etching the LSTPS polypropylene composite of Example 5.

FIG. 30 shows the Li area specific resistance (ASR) for two LSTPS-polypropylene composite films described in this Example, one which was treated with an Argon plasma to remove the organic polymer at the surface of the LSTPS-polypropylene composite, and one which was not treated as such. As shown in FIG. 30, by removing the polymer at the surface, and exposing more of the inorganic electrolyte, the ASR was substantially reduced (i.e., improved).

Example 5

Figure 25:
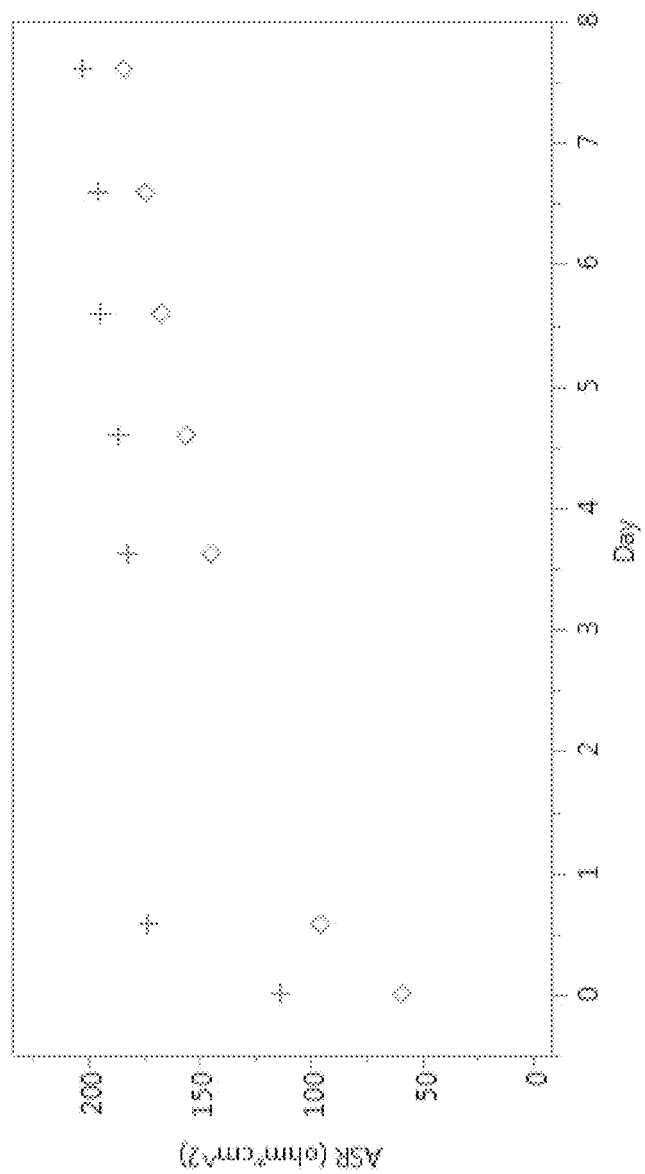
FIG. 25 shows a plot of impedance as a function of time for a composite of LSTPS and polypropylene.

Making and Using Coin Cell Having a Lithium-Silicon-Tin-Phosphorus-Sulfur-Iodide Solid State Electrolyte Composite and a PVDF-Dioxolane-LiTFSI Gel Electrolyte In this example, a coin cell was constructed with the following components assembled in series: a coil cell cap, a wave spring, a 0.5 mm Spacer, 12 mm thick layer of a gel electrolyte, 12 mm thick layer of a 80:20 weight ratio LSTPS polypropylene composite, 10 mm of Indium foil, two 0.5 mm Spacers, and a coin cell case. The gel included PVDF with the solvent dioxolane and the salt, lithium bis(trifluoromethane)sulfonimide (LiTFSI), at 1M concentration. The area-specific resistance (ASR) was measured over 8 days using an potentiostatic electrochemical impedance instrument and a protocol which included 25 mV amplitude at 1 MHz to 100 mHz. The results of this measurement, as shown in FIG. 25, show a moderate rise in impedance over the first day or two. After the first day, the rate of impedance rise is decreased and is significantly slower as time progresses.

Example 6

Figure 26:
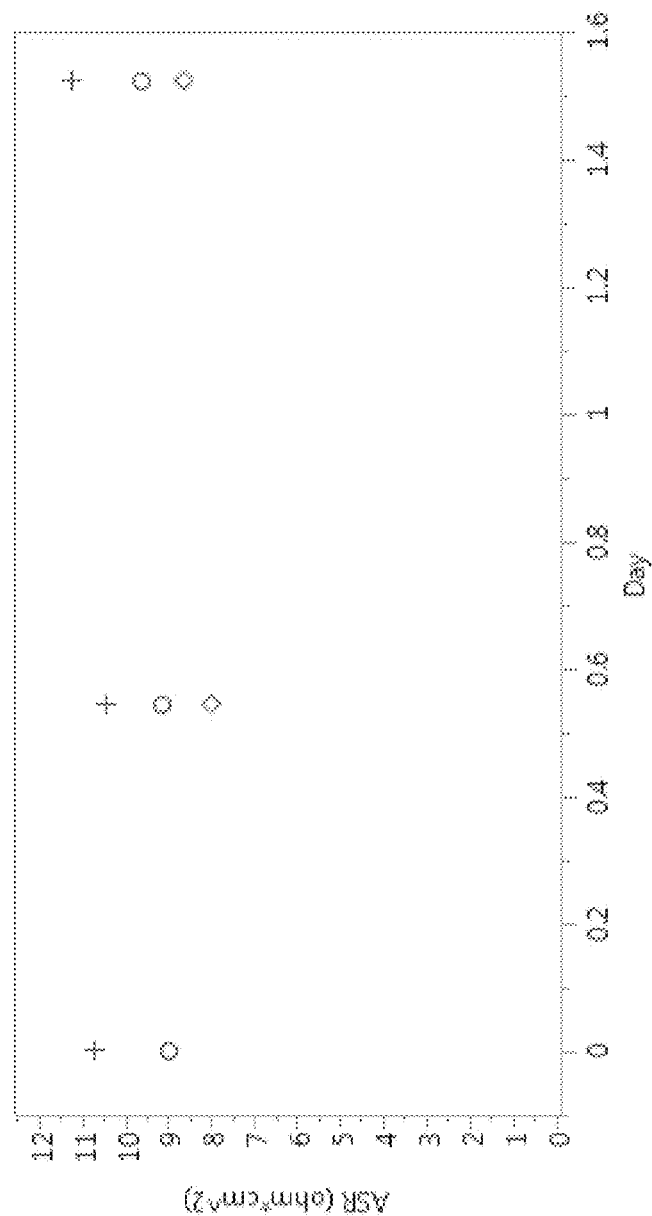
FIG. 26 shows a plot of impedance as a function of time for a composite of LSTPS and polypropylene.

Making and Using Coin Cell Having a Lithium-Silicon-Tin-Phosphorus-Sulfur-Iodide Solid State Electrolyte Composite and a PVDF-EC:DMC:LiPF6 Gel Electrolyte In this example, a coin cell was constructed with the following components assembled in series: a coil cell cap, a wave spring, a 0.5 mm Spacer, 12 mm thick layer of a gel electrolyte, 12 mm thick layer of a 80:20 weight ratio LSTPS polypropylene composite, 10 mm of Indium foil, two 0.5 mm Spacers, and a coin cell case. In this example, the gel included PVDF with the solvent being a mixture of ethylene carbonate (EC): dimethyl carbonate (DMC) and the salt, $LiPF_6$, at 1M concentration. Area-specific resistance (ASR) was measured over several days using an potentiostatic electrochemical impedance instrument and a protocol which included 25 mV amplitude at 1 MHz to 100 mHz. The results in FIG. 26 show that a low initial impedance with only a slight rise in impedance after the first day.

Figure 29:
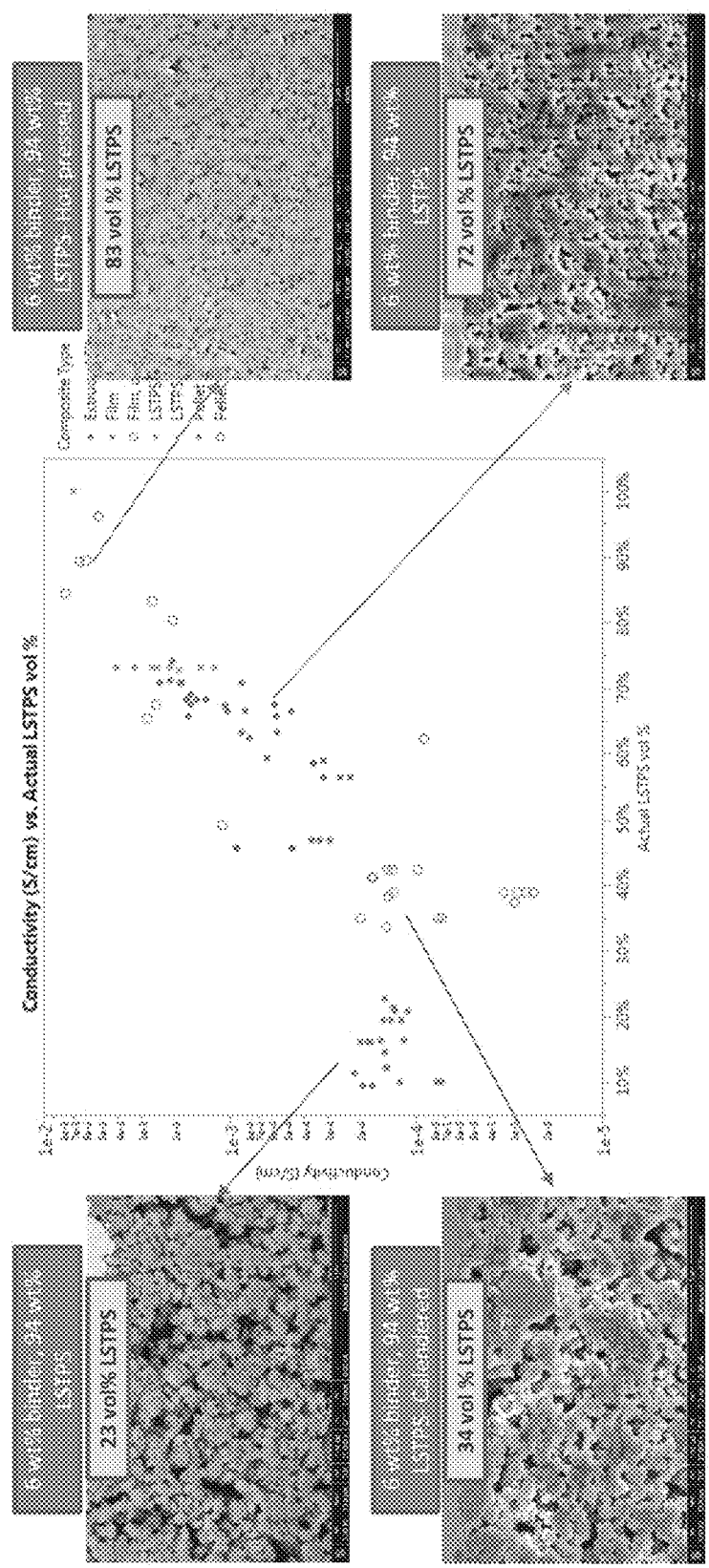
FIG. 29 shows a plot of Conductivity (S/cm) as a function of LSTPS volume %.

Additional LSTPS polypropylene composite were prepared having 23, 34, 72, and 83 volume percentages of LSTPS, with the remainder being a majority polypropylene with a minority amount of binder. As shown in FIG. 29, which plots conductivity as a function of LSTPS volume percent, conductivity was observed to increase in proportion to the volume percent of LSTPS in the composite.

Example 7

Making and Using a Lithium-Boro-Hydride-Iodide PolyPropylene Composite (71 Vol % 3LiBH4:LiI, 29 Vol % Polypropylene)

Figure 27:
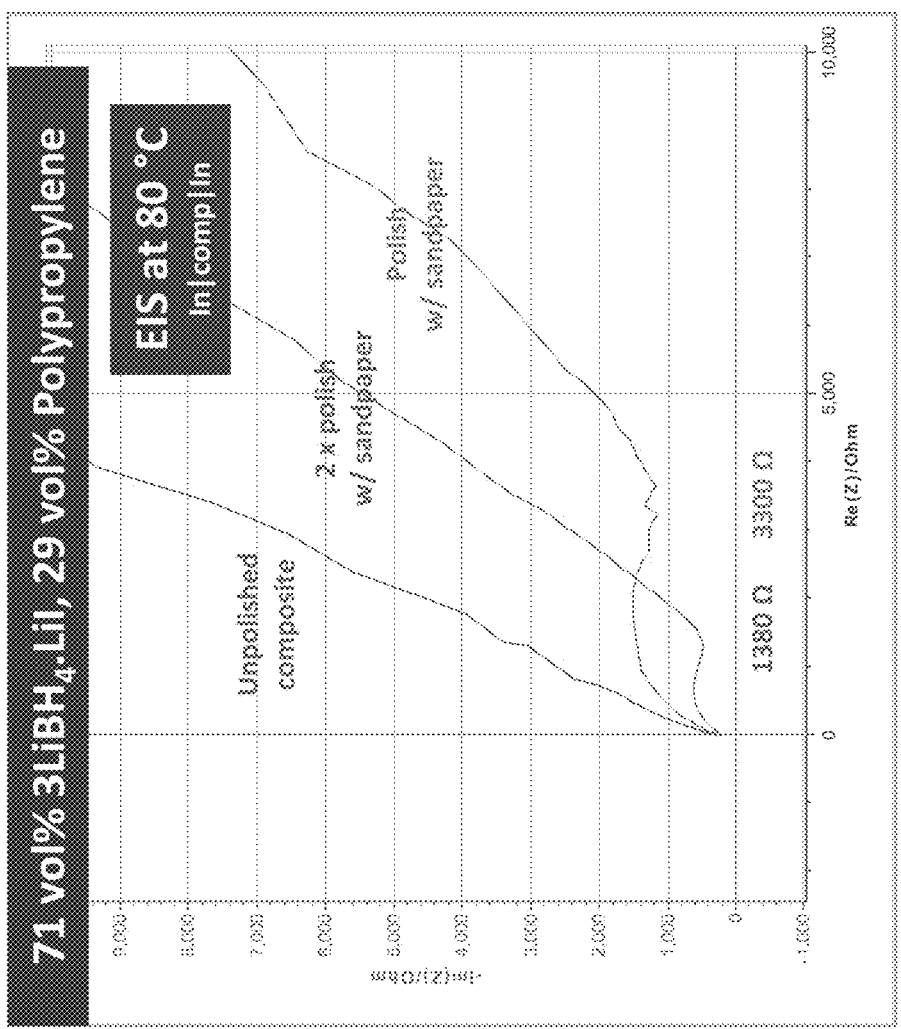
FIG. 27 shows a plot of impedance as a function of time for a composite of $LiBH_4$:LiI and polypropylene.

In this example, $LiBH_4$ was mixed and annealed with LiI in a 3:1 molar ratio. This resulting mixture was then formulated with polypropylene in a 71:29 volumetric ratio and extruded to form a composite. This resulting composite was polished, in one instance, and not polished in another instance. Both the polished and unpolished samples were tested electrochemically. This composite was placed in a symmetric electrochemical cell with In electrodes. Electrochemical impedance spectroscopy (EIS) was performed at 80° C., the results of which are shown in FIG. 27. FIG. 27 shows that the samples which were polished were observed to have a lower ASR than the samples which were not polished.

Example 8

Mechanical Strength Analysis of Solid State Electrolyte Polymer Composites

A set of experiments was conducted to identify stress-stain curves for different composite electrolytes (i.e., different combinations of solid electrolytes and polymers). Unless otherwise specified, the composites in this Example were prepared by hot extrusion of the solid state electrolyte and the polymer.

Figure 31:
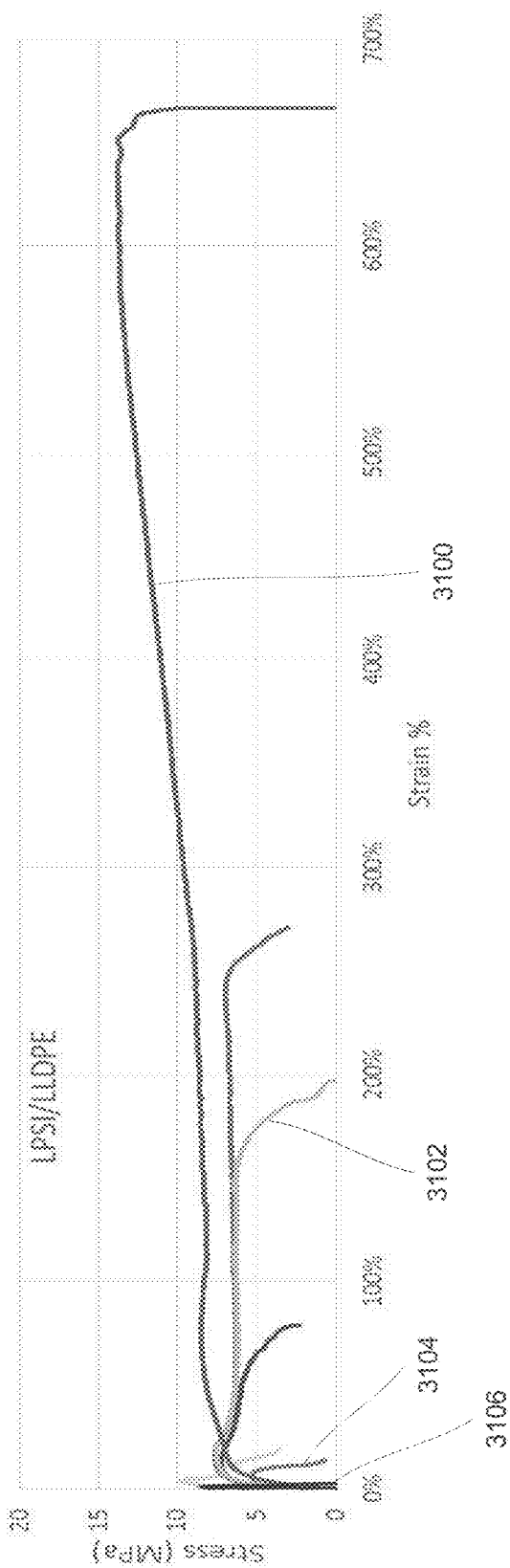
FIG. 31 illustrates stress-stain plots for different combinations of solid electrolyte particles and linear low density polyethylene (LLDPE).

FIG. 31 illustrates stress-stain plots for different combinations of $Li_{7.4}P_{1.6}S_{7.2}I$ (hereinafter "LPSI") electrolyte particles and linear low density polyethylene (LLDPE). LPSI is a material that includes LPS doped with LiI. LPSI is made by milling and mixing $Li_2S$, $P_2S_5$, and LiI, and then heat treating the milled mixture.

Line 3100 in FIG. 31 represents pure LLDPE and is presented herein for reference. Line 3102 represents a combination of 40% by weight of LPSI electrolyte and 60% by weight of LLDPE. Line 3104 represents a combination of 60% by weight of LPSI electrolyte and 40% by weight of LLDPE. Finally, line 3106 represents a combination of 80% by weight of LPSI electrolyte and 20% by weight of LLDPE. Clearly, addition of LPSI electrolyte reduces the strain tolerance of the resulting combination (as evidenced by the lower strain values). While additional LPSI electrolyte may not be desirable from mechanical characteristic standpoint, it may be needed for electrochemical reasons. Yield strength, yield strain, ultimate strength, and ultimate strain of these examples are further described below.

Figure 32:
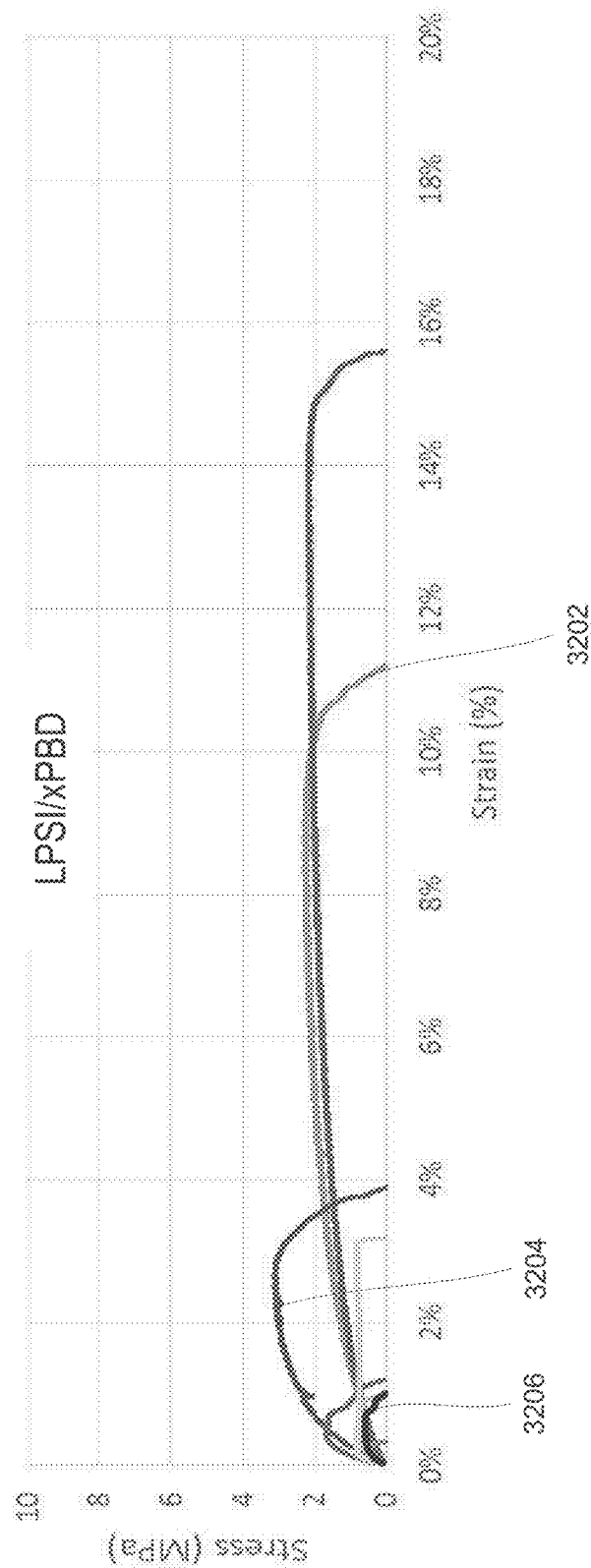
FIG. 32 illustrates stress-stain plots for different combinations of solid electrolyte particles and cross-linked polybutadiene (PB).

FIG. 32 illustrates stress-stain plots for different combinations of LPSI electrolyte particles and cross-linked polybutadiene (PBD). Line 3202 represents a combination of 80% by weight of LPSI electrolyte and 20% by weight of PBD. Line 3204 represents a combination of 82% by weight of LPSI electrolyte and 18% by weight of PBD. Finally, line 3206 represents a combination of 85% by weight of LPSI electrolyte and 15% by weight of PBD. Again, addition of LPSI electrolyte reduces the strain tolerance of the resulting combination (as evidenced by the lower strain values). The effect is quite substantial when comparing lines 3202, 3204, and 3206, which represent very small variations in the overall composition. Specifically, the fracture of 80%-20% combination represented by line 3202 occurred at about 15.5%, while the fracture of 82%-18% combination represented by line 3202 occurred at 4%. In other words, a very minor change (2% by weight) in the relative amounts of PBD and LPSI electrolyte yielded very different mechanical performance. Yield strength, yield strain, ultimate strength, and ultimate strain of these examples are further described below.

Figure 33:
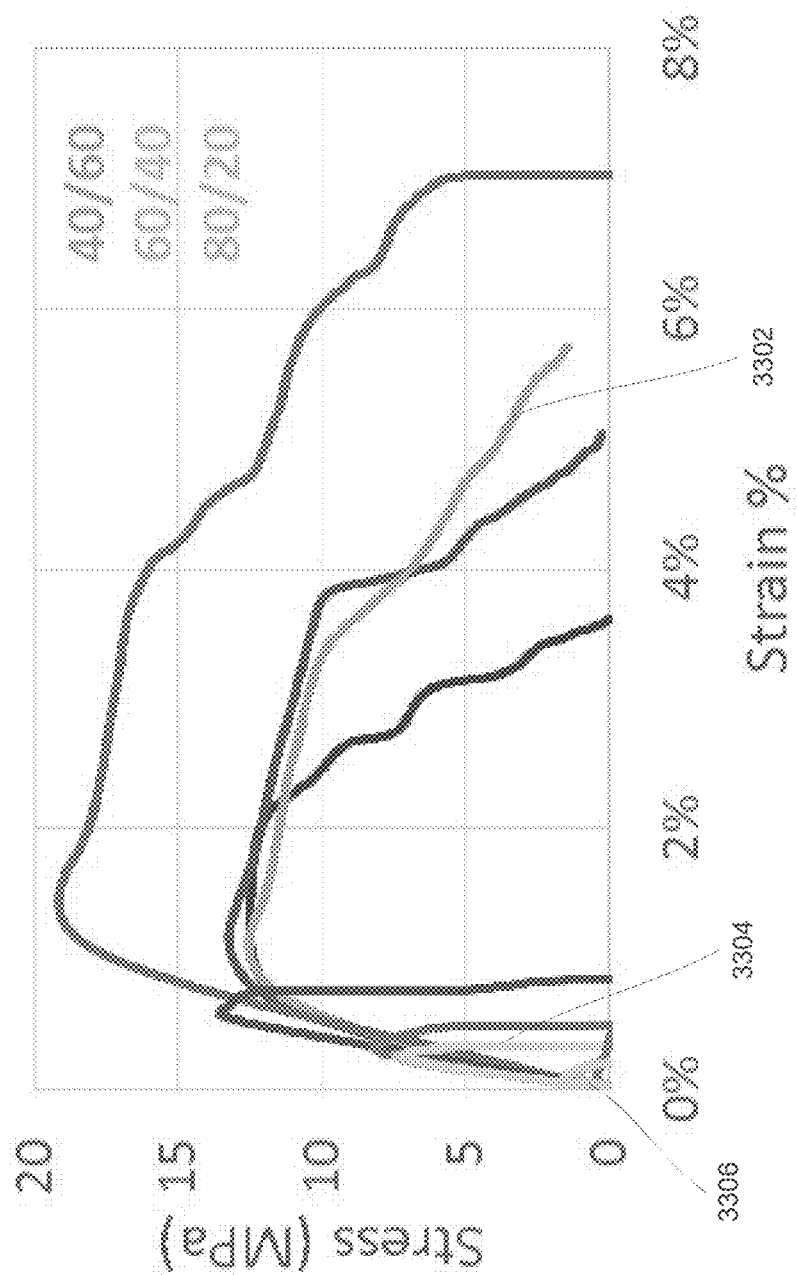
FIG. 33 illustrates stress-stain plots for different combinations of solid electrolyte particles and polypropylene (PP).

FIG. 33 illustrates stress-stain plots for different combinations of LPSI electrolyte particles and polypropylene (PP). Line 3302 represents a combination of 40% by weight of LPSI electrolyte and 20% by weight of PP. Line 3304 represents a combination of 60% by weight of LPSI electrolyte and 40% by weight of PP. Finally, line 3306 represents a combination of 80% by weight of LPSI electrolyte and 20% by weight of PP. Similar to the PBD and LLDPE examples presented above, addition of LPSI electrolyte reduces the strain tolerance of the resulting combination (as evidenced by the lower strain values). Yield strength, yield strain, ultimate strength, and ultimate strain of these examples are further described below.

Figure 34:
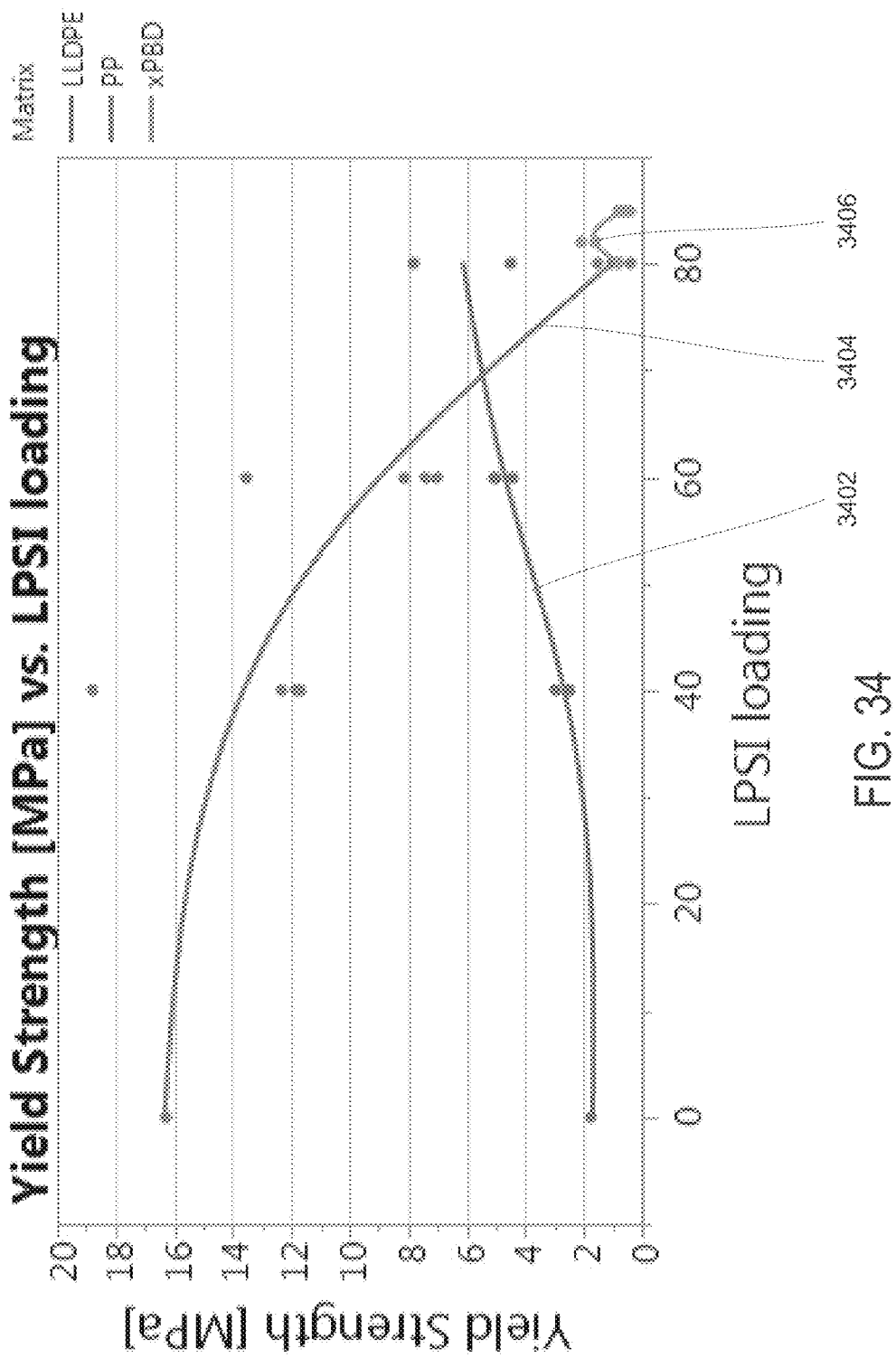
FIG. 34 is a summary of yield strength values plotting these values as a function of solid electrolyte loading.

FIG. 34 is a summary of yield strength values for different composite electrolytes plotting these values as a function of LPSI loading. Line 3402 is a trend-line for all tested LLDPE samples, line 3404 is a trend-line for all tested PP samples, and line 3406 is a trend-line for all tested PBD samples. Depending on the adhesive characteristics of the polymer-ceramic interface, in some cases the yield strength may improve with decreasing polymer content. In other cases, the yield strength will decrease with decreasing polymer content. This data indicates that different polymers behave differently when combined with the same solid electrolyte. This difference is attributable to mechanical characteristics of different polymers as well as to binding of these polymers to LPSI particles. LLDPE appear to perform the best among the three tested polymers at low (at or less than 20% by weight) concentrations of polymers.

Figure 35:
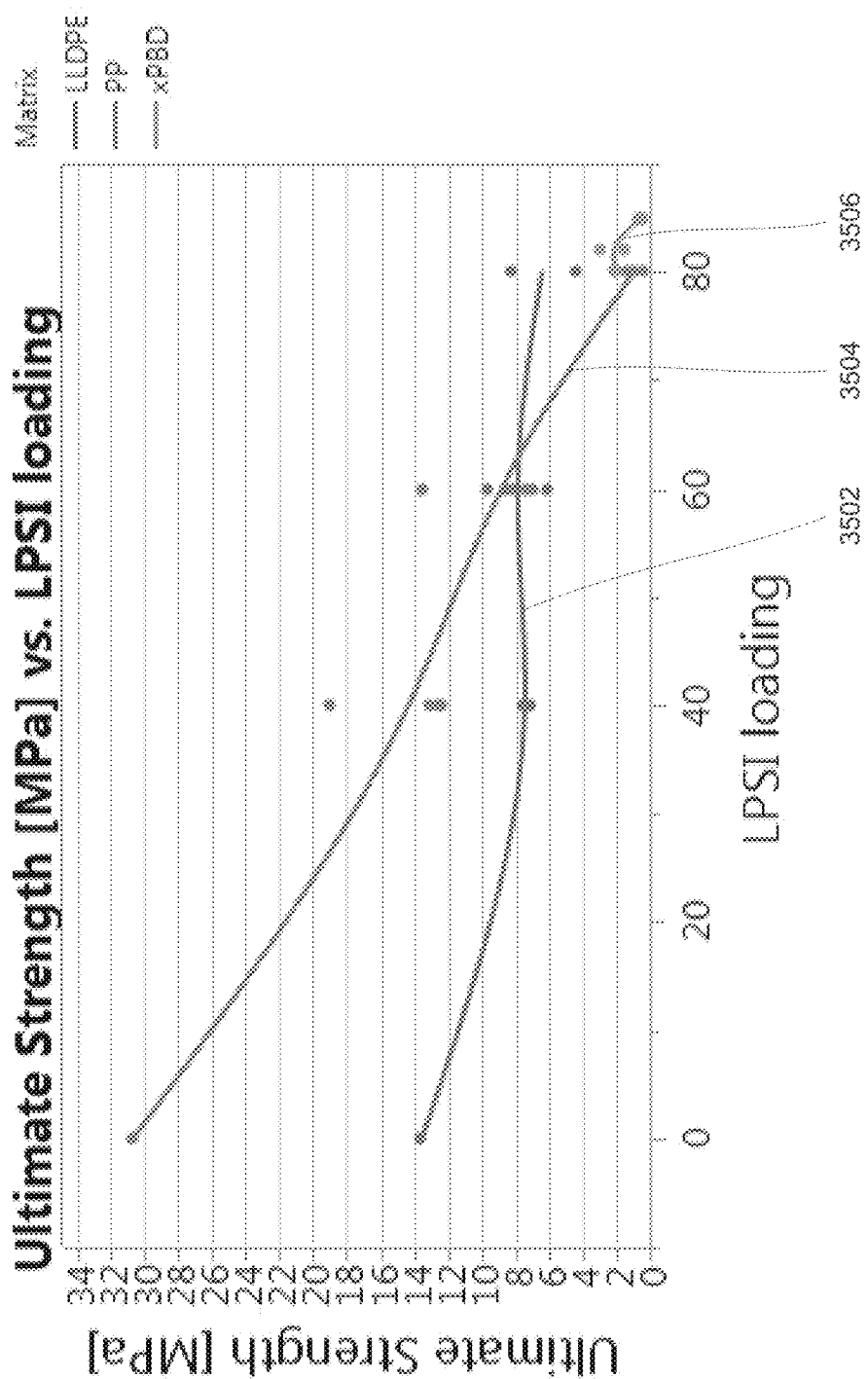
FIG. 35 is a summary of ultimate strength values plotting these values as a function of solid electrolyte loading.

FIG. 35 is a summary of ultimate strength values plotting these values as a function of LPSI loading. Line 3502 is a trend-line for all LLDPE samples, line 3504 is a trend-line for all PP samples, and line 3506 is a trend-line for all PBD samples. The ultimate strength values decrease for all types of polymers with the increase in the LPSI loading. However, the slopes of lines 3502, 3504, and 3506 are different indicating the effects of the LPSI loadings on different polymers are different. For example, changes in the concentration of PP appears to have a greater impact on the ultimate strength than changes in the concentration of LLDPE.

Figure 36:
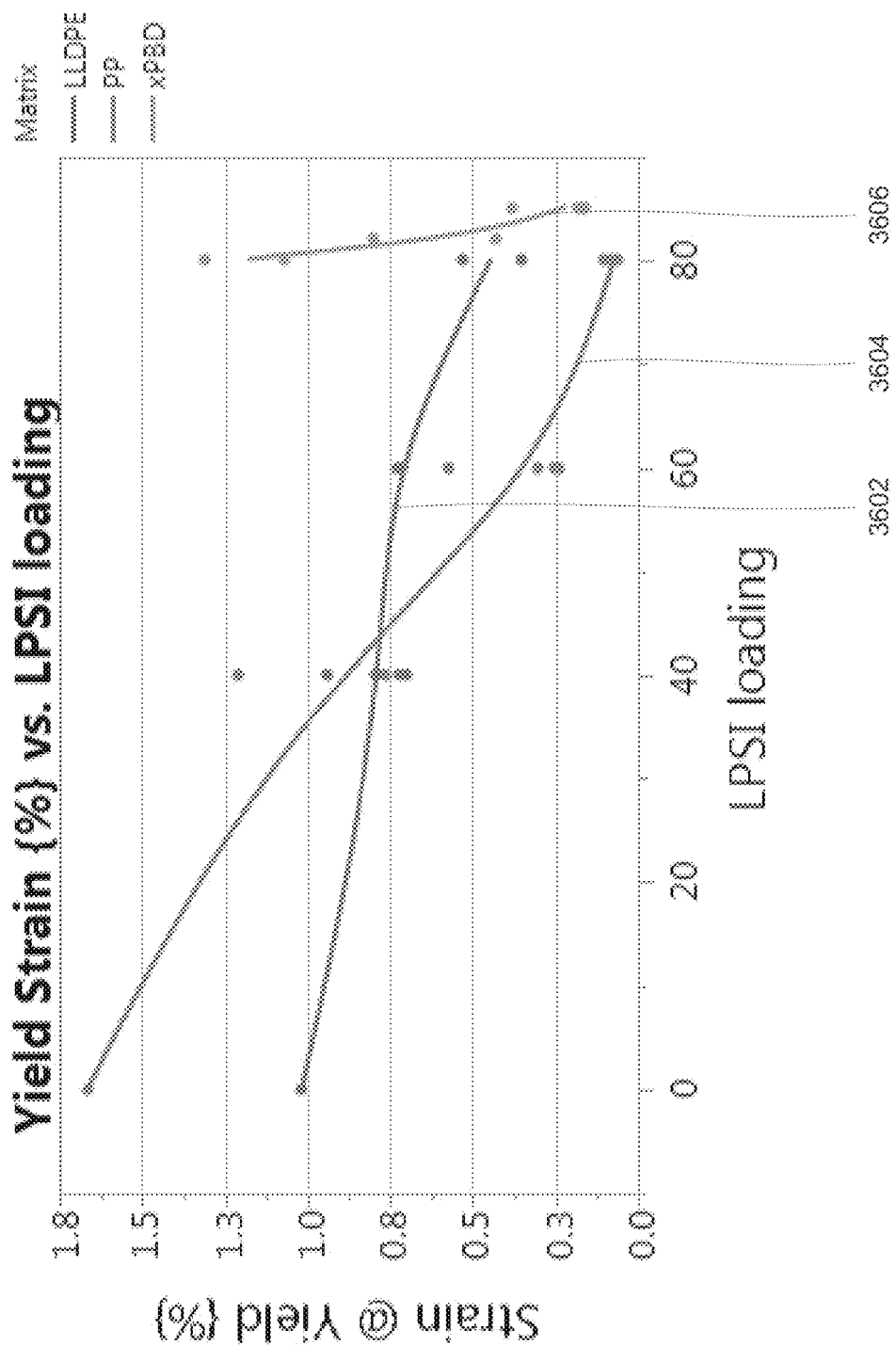
FIG. 36 is a summary of yield strain values plotting these values as a function of solid electrolyte loading.

FIG. 36 is a summary of yield strain values plotting these values as a function of LPSI loading. Line 3602 is a trend-line for all LLDPE samples, line 3604 is a trend-line for all PP samples, and line 3606 is a trend-line for all PBD samples. The yield strain values decrease for all types of polymers with the increase in the LPSI loading with the PBD samples showing the strongest dependence. Line 3606 representing PBD samples has the greatest slope. PBD has the highest elasticity among the three tested polymers, which explains this behavior.

Figure 37:
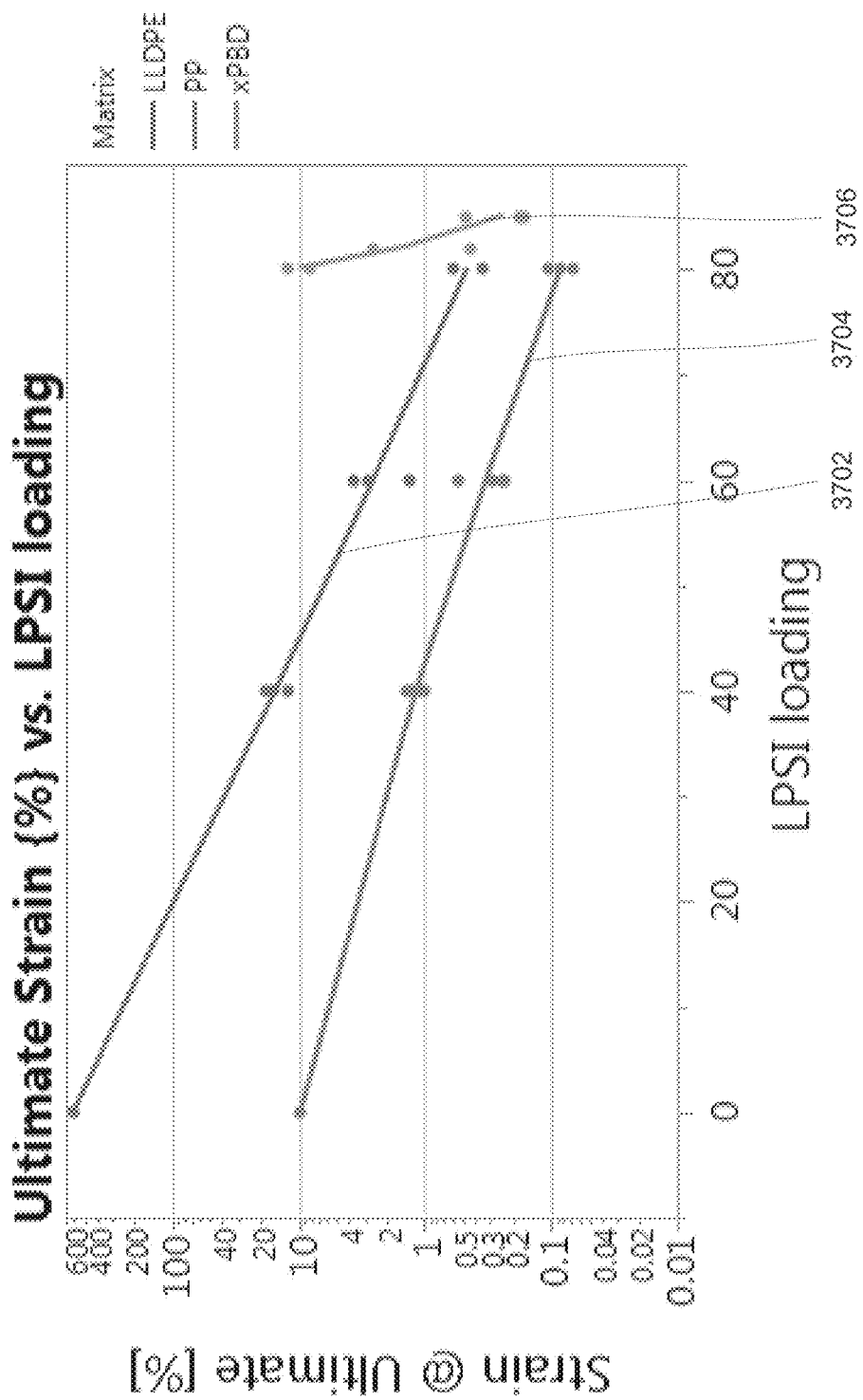
FIG. 37 is a summary of ultimate strain values plotting these values as a function of solid electrolyte loading.

FIG. 37 is a summary of ultimate strain values plotting these values as a function of LPSI loading. Line 3702 is a trend-line for all LLDPE samples, line 3704 is a trend-line for all PP samples, and line 3706 is a trend-line for all PBD samples. Similar to the yield strain values, the ultimate strain values decrease for all types of polymers with the increase in the LPSI loading with the PBD samples showing the strongest dependence.

Figure 38B:
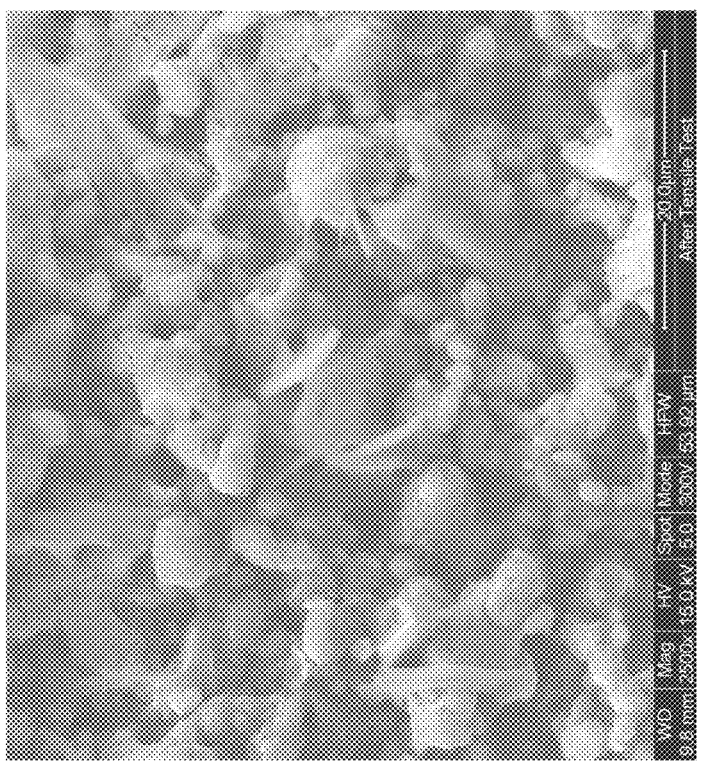
FIGS. 38A and 38B are SEM images of fracture interfaces of two composite electrolytes.
Figure 38A:
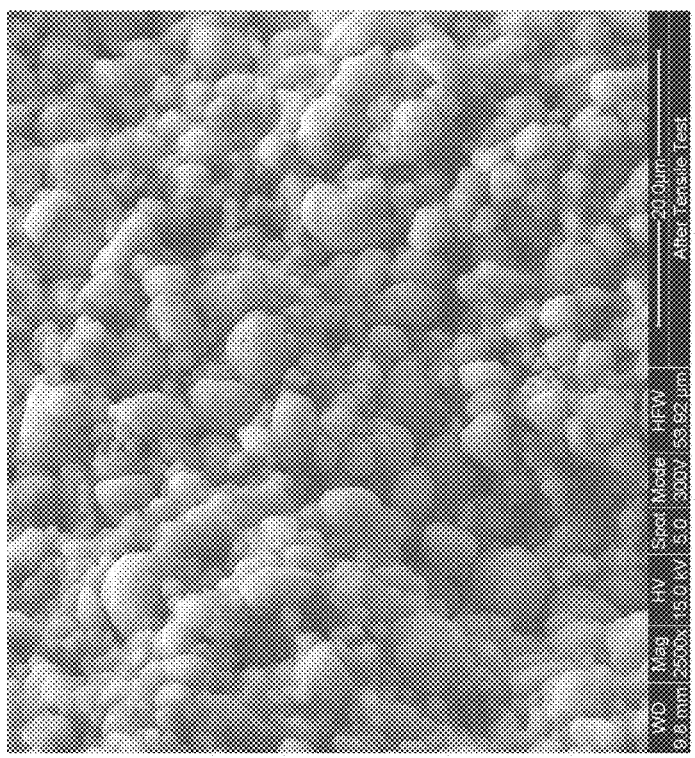

FIG. 38A illustrates an SEM images of a fractured interface of a sample including 82% by weight is LPSI and 18% by weight of PBD. FIG. 38B illustrates an SEM images of a fracture interfaced of a sample including 80% by weight is LPSI and 20% by weight of PBD. It should be noted that even with a very small increase (2% by weight) in the concentration of PBD, the interface has visually more polymer strains extending between LPSI particles. The image of the 82%-18% sample appears to show that the LPSI particles are coated with PBD. However, there are much fewer PBD strands extending between LPSI particles than in the 80%-20% sample.

Example 9

Making Lithium-Phosphorus-Sulfur-Iodide Solid State Electrolytes and Composites Thereof by Free Radical Polymerization Methods and Using the Same In this example, 7 g of LPSI was mixed with 2.3 g of vinyl laurate, 0.6 g of poly(ethylene-co-vinyl acetate) (40 wt % vinyl acetate), and 0.1 g of benzoyl peroxide to form a slurry. The slurry was pressed into a thin film at 23 MPa and heated to 110° C. for 30 minutes to initiate polymerization of the vinyl laurate. Polymerization was monitored visually. Polymerization was completed when the liquid slurry was fully converted into a solid.

Example 10

Making Lithium-Phosphorus-Sulfur-Iodide Solid State Electrolytes and Polybutadiene Composites Thereof by Solvent Mixing Methods and Using the Same In this example, 6 g of LPSI was mixed with 1.06 g of polybutadiene (Mw~200,000), and 7.8 g toluene solvent. Toluene was removed by evaporation, and the resulting polymer composite was pressed into thin films of composite at 23 MPa and 250° C.

Example 11

Making Lithium-Phosphorus-Sulfur-Iodide Solid State Electrolytes and Polybutadiene Composites Thereof by Solvent Mixing and Extrusion Methods and Using the Same In this example, 6 g of LPSI was mixed with 1.06 g of polybutadiene (Mw~200,000), and 7.8 g toluene solvent to form a mixture. Toluene was removed from the mixture by evaporation. The resulting polymer composite was mixed in a twin-screw compounder and extruded to form small pellets. The extruded pellets were pressed into thin films of composite at 23 MPa and 250° C.

Example 12

Making Lithium-Phosphorus-Sulfur-Iodide Solid State Electrolytes and Polybutadiene Composites Thereof by Solvent Crosslinking Methods and Using the Same In this example, 6 g of LPSI was mixed with 0.53 g of polybutadiene (Mw~200,000), 0.53 g of predominantly 1,2-addition polybutadiene (incorporating approximately 90% 1,2-vinyl units), 0.03 g dicumyl peroxide, and 7.8 g toluene solvent. Toluene was removed by evaporation, and the resulting polymer composite was mixed in a twin-screw compounder and extruded to form small pellets. Finally, the extruded pellets were pressed into thin films at 23 MPa and heated to 250° C. for 10 minutes to initiate crosslinking (i.e., vulcanization) of polybutadiene.

Example 13

Making Lithium-Phosphorus-Sulfur-Iodide Solid State Electrolytes and Epoxide Composites Thereof by In-Situ Epoxy Resin Curing Methods and Using the Same In this example, 2 g of LPSI was mixed with 0.4 g of bisphenol A diglycidyl ether, 0.049 g of diethylenetriamine, and 1.2 g toluene solvent. Toluene was removed by evaporation and the resulting dry powder was pressed into a pellet under 280 MPa and heated at 100° C. for 10 minutes to cure the pellet.

Example 14

Figure 39:
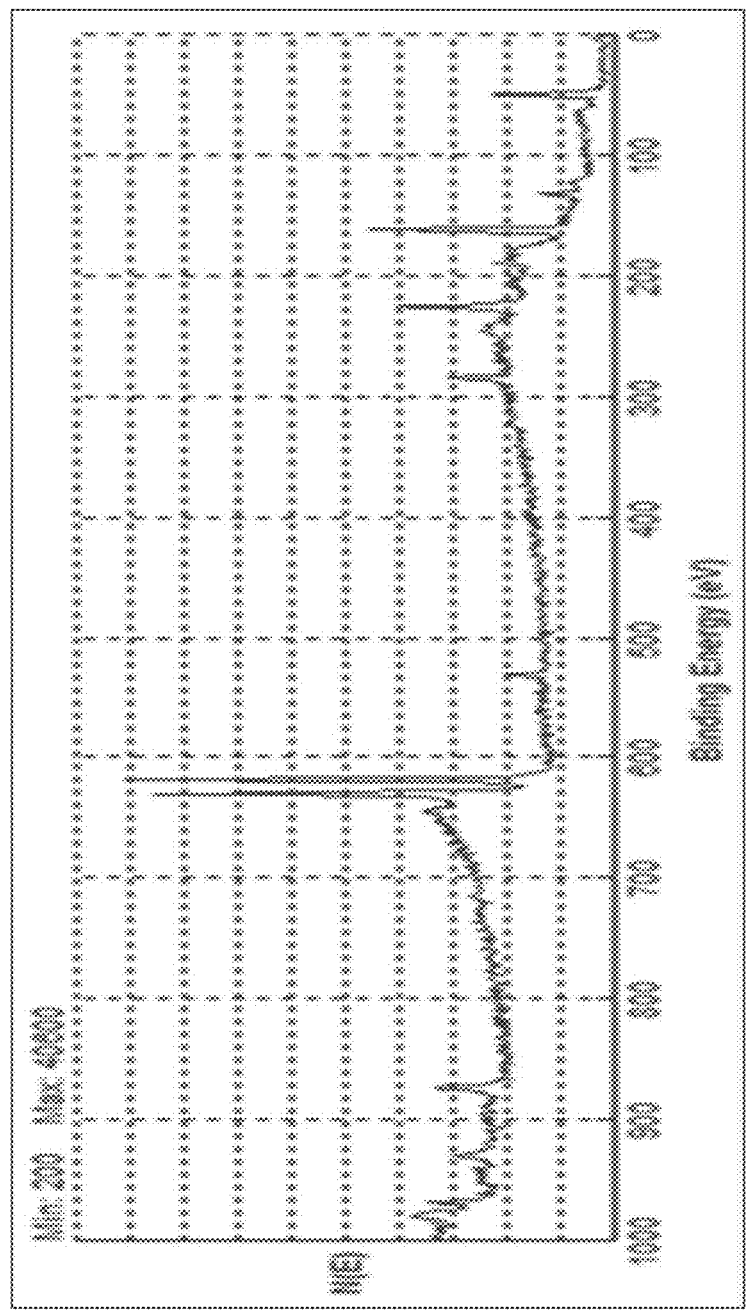
FIG. 39 shows X-ray photo-electron spectroscopy (XPS) for the LPSI material made in Example 14.
Figure 40:
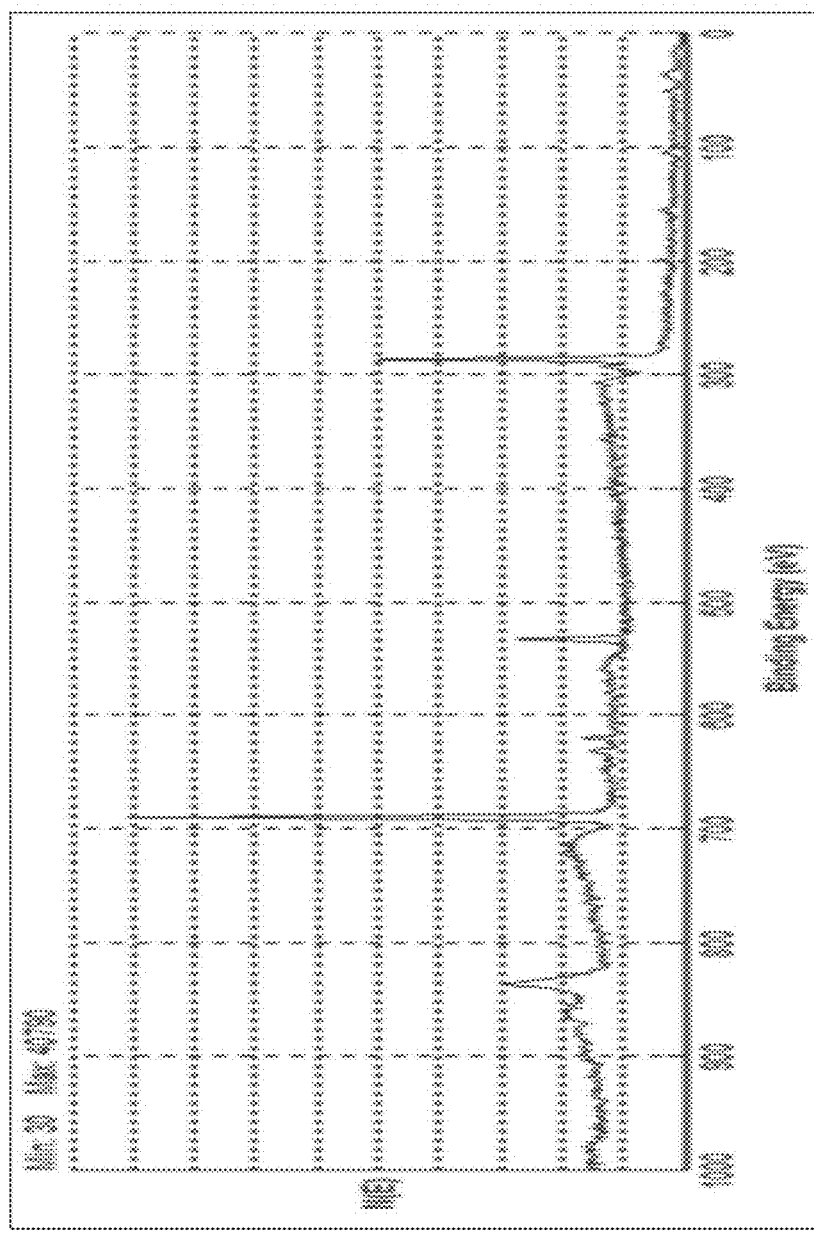
FIG. 40 shows XPS for the LPSI-composite material made in Example 14.

Making Silane-functionalized Lithium-Phosphorus-Sulfur-Iodide Solid State Electrolyte and Composites Thereof In this example, an LPSI ($Li_{7.4}P_{1.6}S_{7.2}I$) electrolyte was functionalized with a silating agent. In one sample, 5 g of LPSI was provided. In a second sample, 5 g of LPSI was mixed with 25 g of a 5 wt % solution of trichloro(1H,1H,2H,2H-perfluorooctyl)silane in toluene and heated at 100° C. for 16 hours, subsequently separated by centrifugation, and then washed three times with toluene. The LPSI with the attached silane was dried under vacuum and then pressed into a pellet at 25° C. under 175 MPa of pressure for 10 seconds. X-ray photoelectron spectroscopy was used to confirm attachment of the surface functionalizing agent via the silane functional group. See FIG. 39 which shows that LPSI without the silane-functionalization. FIG. 39 shows that LPSI without surface treatment shows no appreciable fluorine signal and weak signal at ~320 eV due to adventitious carbon. See FIG. 40 which shows that LPSI with the silane-functionalization. FIG. 40 shows that LPSI after surface treatment with trichloro(1H,1H,2H,2H-perfluorooctyl)silane shows strong fluorine signal at 710 eV, and strengthening of carbon signal at ~320 eV:

Example 15

Making a Surface-functionalized Lithium-Phosphorus-Sulfur-Iodide Solid State Electrolyte and Composites Thereof Using a Polymer Coupling Agent Two methods for incorporating surface coupling agents into LPSI-polymer composites were performed in this Example.

Small Molecule Coupling Agent Approach. One method for incorporating surface coupling agents into LPSI-polymer composites includes using a molecule which includes (a) a functional group capable of surface attachment to sulfide electrolyte with (b) another functional group able to participate in reactions with the polymer binder. Specifically, 5 g of LPSI was mixed with 25 g of a 5 wt % solution of 3-methacryloxypropyltrichlorosilane in toluene and heated at 100° C. for 16 hours to produce LPSI with a covalently attached silane. The LPSI was separated by centrifugation, and then washed three times with toluene. The LPSI with the covalently attached silane was finally dried under vacuum.

Pre-Formed Polymer Coupling Agent Approach. A second method for incorporating surface coupling agents into LPSI-polymer composites includes using a functionalized polymer that incorporates a functional group or groups capable of surface attachment to sulfide electrolyte. Specifically, 5 g of LPSI was mixed with 25 g of a 5 wt % solution of triethoxysilyl-modified poly-1,2-butadiene (a polybutadiene polymer containing reactive silane groups pendant to the main chain) in toluene and heated at 100° C. for 16 hours. The functionalized LPSI was then be separated by centrifugation, and then washed three times with toluene. The LPSI with the covalently attached silane-functionalized polymer was then finally dried under vacuum.

This Example demonstrates that surface coupling agents can be bonded or adsorbed to the LPSI particle surface. This Example demonstrates that it is possible to incorporate a polymer binder phase into the composite and have it associate with the LPSI particle surface. Other methods for incorporating a polymer binder phase into the composite so it associates with the LPSI particle surface include direct covalent coupling reactions, e.g., crosslinking; copolymerization reactions; free radical addition reactions, addition-transfer reactions, or termination reactions; epoxy curing (i.e., epoxide ring-opening) reactions; condensation reactions, or by entanglement or interpenetrating network formation involving polymer chains attached to the sulfide surface and those in the binder phase.

Example 16

Making a Surface-Functionalized Lithium-Phosphorus-Sulfur-Iodide Solid State Electrolyte and Composites Thereof by Free Radical Polymerization This coupling between sulfide and polymer binder in a composite was achieved using either of the two following synthetic methods.

Two Step Approach: In this approach, the first step includes pre-treatment of the sulfide electrolyte with the coupling agent, using the approaches in Example 15. Next, a polymer binder or with a monomer is mixed with the reaction mixture and allowed to cure to form the polymer binder. This results in the coupling agent first attaching to the sulfide surface (step 1), and subsequently to the polymer binder (step 2). Specifically, 5 g of LPSI was be mixed with 25 g of a 5 wt % solution of 3-methacryloxypropyltrichlorosilane in toluene and heated at 100° C. for 16 hours. LPSI was then separated by centrifugation, and then washed three times with toluene. The LPSI with the covalently attached silane was then be dried under vacuum. The dried LPSI with the covalently attached silane was then used in a free radical polymerization reaction to form a composite wherein the methacryloxy groups attached to the LPSI were co-polymerized into the polymer binder. Specifically, 7 g of the surface-functionalized LPSI was mixed with 2.3 g of vinyl laurate, 0.6 g of poly(ethylene-co-vinyl acetate) (40 wt % vinyl acetate), and 0.1 g of benzoyl peroxide. The mixture was pressed into thin films at 23 MPa and heated to 110° C. for 30 minutes to initiate polymerization of vinyl laurate.

One Step Approach: As an alternative to the two step approach, noted above, a one-step approach may also be used. This methods included mixing of the sulfide electrolyte, coupling agent, and polymer binder (or monomer pre-cursor), whereby the coupling agent attaches to both the sulfide electrolyte and the polymer binder in the same step. Specifically, 7 g of LPSI was mixed with 0.12 g of 3-methacryloxypropyltrichlorosilane, 2.3 g of vinyl laurate, 0.6 g of poly(ethylene-co-vinyl acetate) (40 wt % vinyl acetate), and 0.1 g of benzoyl peroxide. The mixture was pressed into thin films at 23 MPa and heated to 110° C. for 30 minutes to initiate polymerization of vinyl laurate and drive reaction between the silane groups and the LPSI surface.

Example 17

Making a Surface-functionalized Lithium-Phosphorus-Sulfur-Iodide Solid State Electrolyte and Composites Thereof by Coupling the Polymer Binder by Crosslinking Reaction Small Molecule Coupling Agent, Two Step Approach: 5 g LPSI was first mixed with 25 g of a 5 wt % solution of octenyltrichlorosilane in toluene and heated at 100° C. for 16 hours. LPSI was separated by centrifugation, and then washed three times with toluene. The LPSI with the covalently attached silane was dried and employed in the polybutadiene composite process described in Example 15 above, such that the vinyl-containing octenyl groups attached to the LPSI were co-crosslinked into the rubber matrix. 6 g of silane-functionalized LPSI was then mixed with 0.53 g of polybutadiene (Mw~200,000), 0.53 g of predominantly 1,2-addition polybutadiene (incorporating approximately 90% 1,2-vinyl units), 0.03 g dicumyl peroxide, and 7.8 g toluene solvent. Toluene was removed by evaporation, and the resulting polymer composite was mixed in a twin-screw compounder and extruded to form small pellets. Finally, the extruded pellets were pressed into thin films at 23 MPa and heated to 250° C. for 10 minutes to initiate crosslinking (vulcanization) of polybutadiene.

Small Molecule Coupling Agent, One Step Approach: 6 g of LPSI was mixed with 0.055 g of octenyltrichlorosilane, 0.53 g of polybutadiene (Mw~200,000), 0.53 g of predominantly 1,2-addition polybutadiene (incorporating approximately 90% 1,2-vinyl units), 0.03 g dicumyl peroxide, and 7.8 g toluene solvent. Toluene was removed by evaporation, and the resulting polymer composite was mixed in a twin-screw compounder and extruded to form small pellets. Finally, the extruded pellets were pressed into thin films at 23 MPa and heated to 250° C. for 10 minutes to initiate crosslinking (vulcanization) of polybutadiene and to drive reaction between the silane groups and the LPSI surface.

Pre-Formed Polymer Coupling Agent, One Step Approach. In another process, a pre-formed polymer containing LPSI attachment groups was used for surface coupling. In this example, 6 g of LPSI was mixed with 0.53 g of triethoxysilyl-modified poly-1,2-butadiene, along with 0.53 g of polybutadiene (Mw~200,000), 0.03 g dicumyl peroxide, and 7.8 g toluene solvent. Toluene was removed by evaporation, and the resulting polymer composite was mixed in a twin-screw micro-compounder and extruded to form small pellets. Finally, the extruded pellets were pressed into thin films at 23 MPa and heated to 250° C. for 10 minutes to initiate crosslinking (vulcanization) of polybutadiene and to drive reaction between the silane functional groups on polybutadiene and the LPSI surface.

Example 18

Making a Polymer Composite Wherein a Surface-Functionalized Sulfide Electrolyte is Coupled to the Polymer Binder by In-Situ Epoxy Resin Curing Small Molecule Coupling Agent, Two Step Approach:

In this example, 5 g LPSI was first mixed with 25 g of a 5 wt % solution of (3-glycidyloxypropyl)trimethoxysilane and heated at 100° C. in toluene for 16 hours. LPSI was separated by centrifugation, and then washed three times with toluene. The LPSI with the covalently attached silane was dried and employed in the epoxy composite process described in Example 13 above, such that the glycidyl groups attached to the LPSI could be co-crosslinked into the epoxy matrix. In this example, 2 g of the surface-functionalized LPSI was mixed with 0.4 g of bisphenol A diglycidyl ether, 0.049 g of diethylenetriamine, and 1.2 g toluene solvent. Toluene was removed by evaporation and the resulting powder was pressed into a pellet under 280 MPa and heated at 100° C. for 10 minutes to effect curing and drive the reaction between the silane groups and the LPSI surface.

Small Molecule Coupling Agent, Two Step Approach:

In this example, 2 g of LPSI was mixed with 0.022 g of (3-glycidyloxypropyl)trimethoxysilane 0.38 g of bisphenol A diglycidyl ether, 0.047 g of diethylenetriamine, and 1.2 g toluene solvent. Toluene was removed by evaporation and the resulting powder was pressed into a pellet under 280 MPa and heated at 100° C. for 10 minutes to effect curing and drive the reaction between the silane groups and the LPSI surface.

The following composites were made and tested based on the above Example methods.

| From Example | Polymer binder | LPSI loading (wt %) | Surface coupling agent | Bulk conductivity at 80° C. (S/cm) |
|---|---|---|---|---|
| 4 | polypropylene | 80 | none | 6.2e−5 |
| 5 | polyethylene | 80 | none | 6.9e−5 |
| 10 | polybutadiene | 85 | none | 3.0e−4 |
| 9 | poly(vinyl laurate), poly(ethylene-co-vinyl acetate) blend | 60 | none | 4.7e−5 |
| 13 | bisphenol A diglycidyl ether, diethylenetriamine epoxy polymer | 82 | none | 8.0e−4 |
| 17 | polybutadiene | 85 | octenyl-trichlorosilane | 3.7e−4 |
| 18 | bisphenol A diglycidyl ether, diethylenetriamine epoxy polymer | 82 | (3-glycidyloxy-propyl)tri-methoxysilane | 7.0e−4 |

Figure 41:
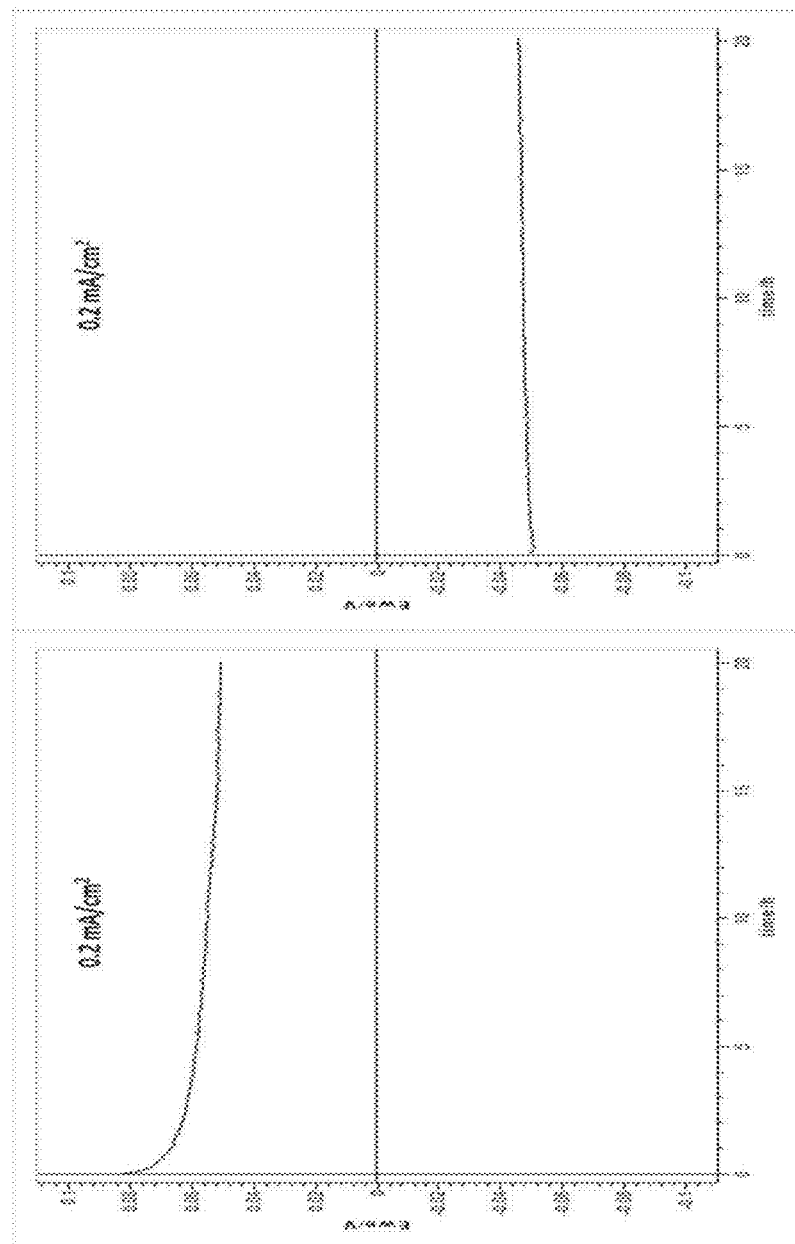
FIG. 41 shows Li—Li symmetric cell cycling for the LPSI composite with polyethylene binder prepared in Example, cycled at 80° C., with 20 um Li per cycle.

The polyethylene sample (from Example 5) in the above Table was tested electrochemically, as shown in FIG. 41.

Figure 42:
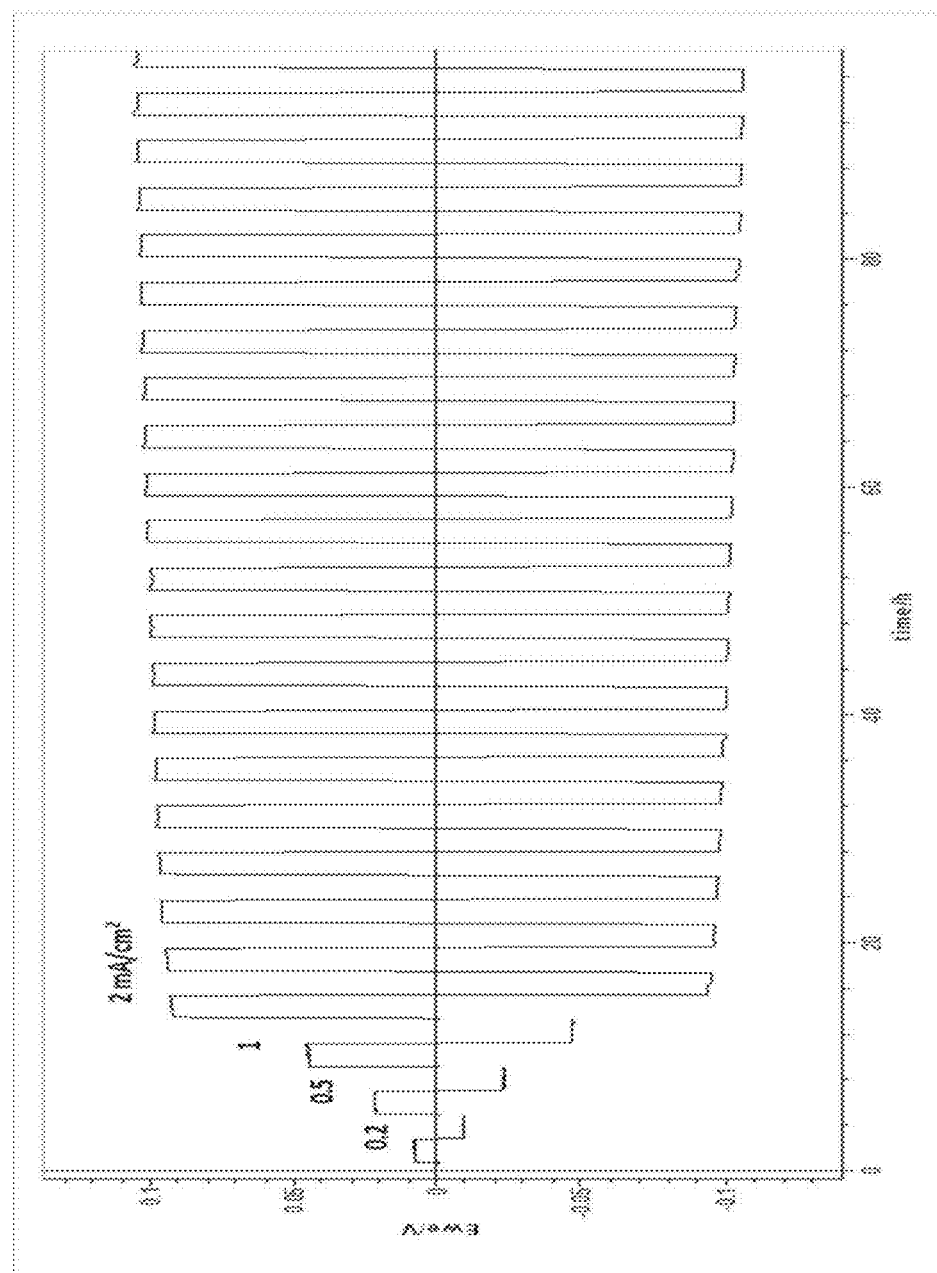
FIG. 42 shows Li—Li symmetric cell cycling for the LPSI composite with polybutadiene binder made in Example, cycled 80° C., with 20 um Li per cycle.

The polybutadiene sample (from Example 10) in the above Table was tested electrochemically, as shown in FIG. 42.

Figure 43:
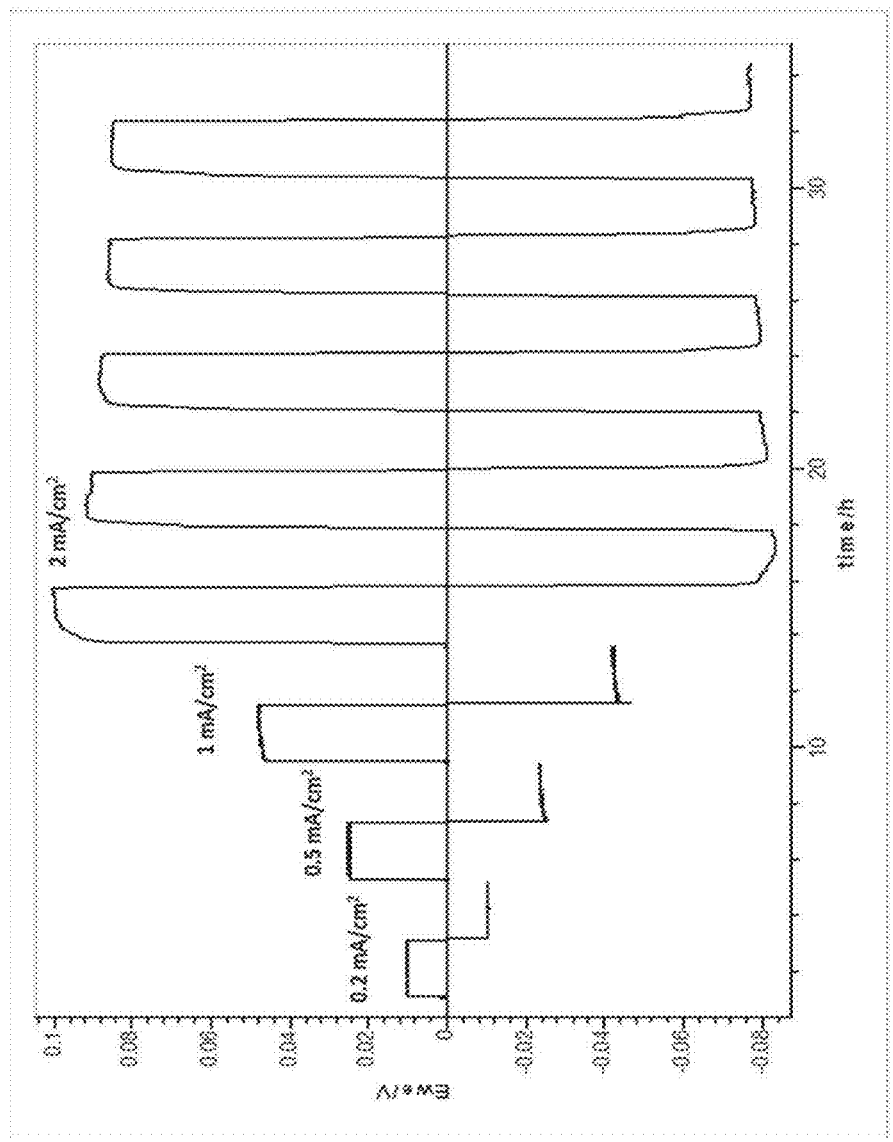
FIG. 43 shows Li—Li symmetric cell cycling for the LPSI composite with epoxy binder made in Example 18, cycled at 80° C., with 20 um Li per cycle.

The bisphenol A diglycidyl ether, diethylenetriamine epoxy polymer sample (from Example 13) in the above Table was tested electrochemically, as shown in FIG. 43.

Example 19

Measuring Fracture Strength

Figure 44:
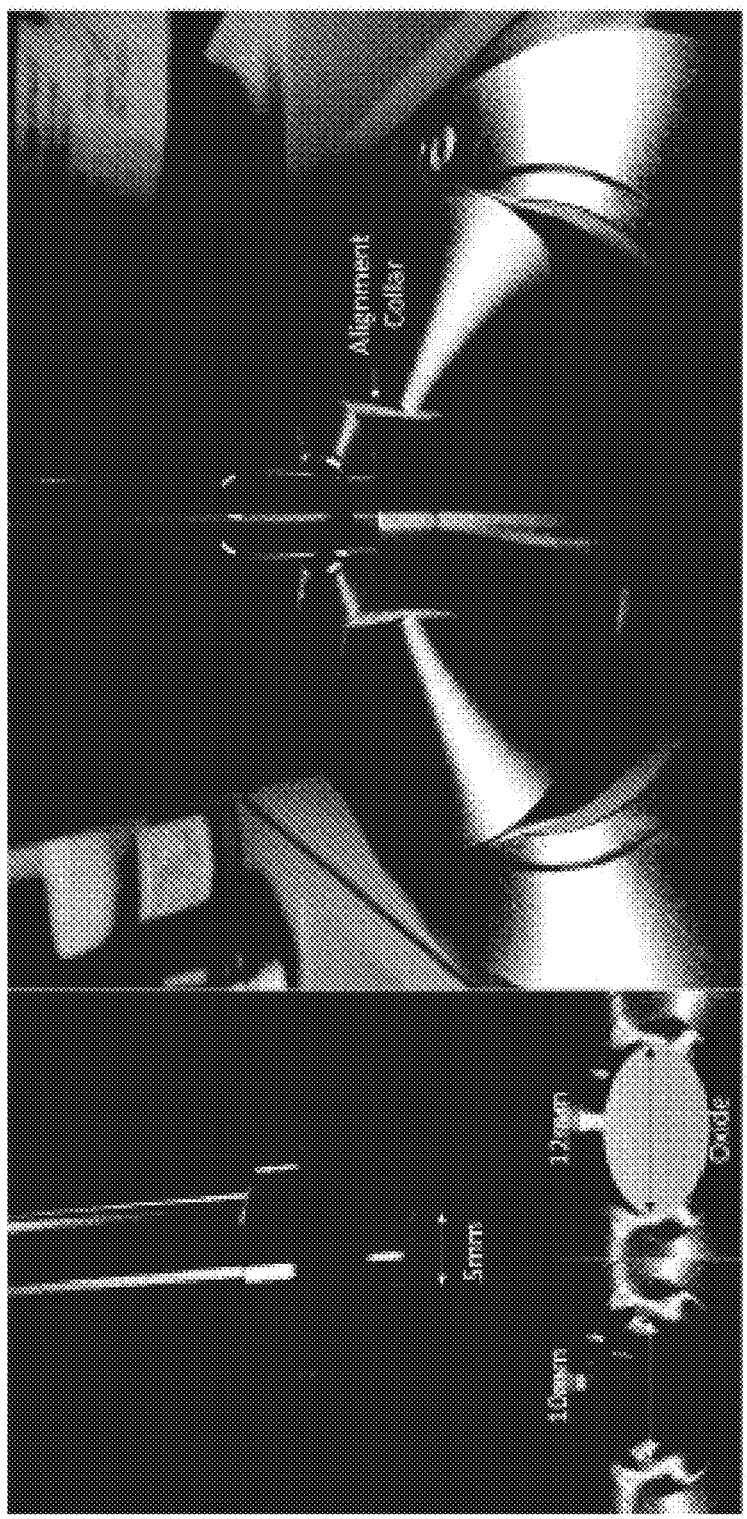
FIG. 44 shows the Concentric Ring Fixture used to measure the ring on ring fracture test.

FIG. 44 shows a ring on ring fracture test apparatus for testing the fracture strength of an electrolyte of the present disclosure. In this test, for example, a 60 μm-thick, thin film composite electrolyte is placed in a test fixture of two concentric rings (one of smaller diameter than the other). The thin film composite electrolyte was circular and 10 mm in diameter. The rings are then brought closer together at a constant velocity. The force is recorded as a function of displacement, as the thin film composite electrolyte film bends and eventually breaks. The thin film composite electrolyte fractures at a force determined by its strength, which corresponds to the moment where the force drops. The fracture forces were recorded and analyzed statistically.

CONCLUSION

The embodiments and examples described above are intended to be merely illustrative and non-limiting. Those skilled in the art will recognize or will be able to ascertain, using no more than routine experimentation, numerous equivalents of specific compounds, materials, devices, and procedures. All such equivalents are considered to be within the scope and are encompassed by the appended claims.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An electrolyte comprising an inorganic material embedded in an organic material; wherein the inorganic material comprises necked particles of inorganic material which form a percolation network for lithium ion conduction through the electrolyte; wherein the organic material has a lithium ion conductivity of less than $10^{-8}$ S/cm at 80° C.;

wherein the inorganic material comprises a surface species which reacts with a functional group selected from an epoxide, a carboxylic acid, an ester, an amide, an amine, a sulfonic acid, a phosphate, a phosphine oxide, a phosphoric acid, an alkoxide, a nitrile, a thioether, thiol, and combinations thereof.

2. The electrolyte of claim 1, wherein the electrolyte has a fracture strength of greater than 5 MPa and less than 250 MPa, as measured in a ring-on-ring test as specified in the ASTM C1499-09 standard.

3. The electrolyte of claim 1, wherein the organic material is bonded to, adsorbed on, molded around, or entangled with the surface of the inorganic material, a surface attached species on the surface of the inorganic material, or an inorganic material particle.

4. The electrolyte of claim 1, wherein the organic material is bonded to the surface of the inorganic material by covalent, ionic, electrostatic, or van Der Waals bonds.

5. The electrolyte of claim 1, wherein the organic material comprises a functional group selected from a carboxylic acid, an amide, an amine, a silane, sulfonic acid, a phosphate, a phosphine oxide, a phosphoric acid, an alkoxide, a nitrile, a thioether, thiol, and combinations thereof.

6. The electrolyte of claim 1, wherein the surface species is selected from a thiol, a hydroxide, a sulfide, an oxide, and a combination thereof.

7. The electrolyte of claim 1, wherein the organic material has polar functional groups.

8. The electrolyte of claim 1, wherein the organic material is entangled with the inorganic material.

9. The electrolyte of claim 1, wherein the organic material is entangled with a surface species which is present on the inorganic material.

10. The electrolyte of claim 9, wherein the surface species is a monomer, oligomer, or polymer attached to the surface of the inorganic material.

11. The electrolyte of claim 1, wherein the electrolyte is a thin film having a thickness between 1 nm and 100 μm.

12. The electrolyte of claim 1, wherein the inorganic material is a solid state electrolyte selected from a lithium-stuffed garnet oxide, an antiperovskite oxide, a lithium borohydride, a lithium iodide-containing material and a lithium sulfide-containing material.

13. The electrolyte of claim 12, wherein the inorganic material is a solid state electrolyte of a lithium-stuffed garnet oxide characterized by the formula $Li_uLa_vZr_xO_y \cdot zAl_2O_3$, wherein u is a rational number from 4 to 10;
v is a rational number from 2 to 4;
x is a rational number from 1 to 3;
y is a rational number from 10 to 14; and
z is a rational number from 0 to 1;
wherein u, v, x, y, and z are selected so that the lithium-stuffed garnet oxide is charge neutral.

14. The electrolyte of claim 12, wherein the lithium-stuffed garnet oxide is characterized by the formula $Li_uLa_3Zr_2O_{12} \cdot zAl_2O_3$, wherein $4 \leq u \leq 10$ and $0 < z \leq 1$.

15. The electrolyte of claim 12, wherein the lithium-stuffed garnet oxide is characterized by the formula $Li_{6.75-7.1}La_3Zr_2O_{12} \cdot 0.5Al_2O_3$ or $Li_{6.4-7.7}La_3Zr_2O_{12} \cdot 0.11Al_2O_3$.

16. The electrolyte of claim 12, wherein the inorganic material is a solid state electrolyte selected from a lithium sulfide characterized by one of the following Formula $Li_aSi_bSn_cP_dS_eO_f$, wherein $2 \leq a \leq 8$, $b+c=1$, $0.5 \leq d \leq 2.5$, $4 \leq e \leq 12$, and $0 < f \leq 10$ ;

$Li_gAs_hSn_jS_kO_l$, wherein $2 \leq g \leq 6$, $0 \leq h \leq 1$, $0 \leq j \leq 1$, $2 \leq k \leq 6$, and $0 \leq l \leq 10$;

$Li_mP_nS_pI_q$, wherein $2 \leq m \leq 6$, $0 \leq n \leq 1$, $0 \leq p \leq 1$, $2 \leq q \leq 6$; or a mixture of $(Li_2S):(P_2S_5)$ having a molar ratio from about 10:1 to about 6:4 and LiI, wherein the ratio of $[(Li_2S):(P_2S_5)]:LiI$ is from 95:5 to 50:50;

a mixture of LiI and $Al_2O_3$;

$Li_3N$;

LPS+X, wherein X is selected from Cl, I, or Br;

$vLi_2S+wP_2S_5+yLiX$;

$vLi_2S+wS_iS_2+yLiX$;

$vL_{i2}S+wB_2S_3+yLiX$;

a mixture of $LiBH_4$ and LiX wherein X is selected from Cl, I, or Br; or $vLiBH_4+wLiX+yLiNH_2$, wherein X is selected from Cl, I, or Br; and wherein coefficients v, w, and y are rational numbers from 0 to 1.

17. The electrolyte of claim 12, wherein the inorganic material is a solid state electrolyte selected from a lithium sulfide characterized by $Li_{10}Si_{0.5}Sn_{0.5}P_2S_{12}$ and $Li_{7.4}P_{1.6}S_{7.2}I$.

18. The electrolyte of claim 1, wherein the organic material is a polymer.

19. The electrolyte of claim 1, wherein the organic material is a polymer selected from the group consisting of polyolefins, natural rubbers, synthetic rubbers, polybutadiene, polyisoprene, epoxidized natural rubber, polyisobutylene, polypropylene oxide, polyacrylates, polymethacrylates, polyesters, polyvinyl esters, polyurethanes, styrenic polymers, epoxy resins, epoxy polymers, poly(bisphenol A-co-epichlorohydrin), vinyl polymers, polyvinyl halides, polyvinyl alcohol, polyethyleneimine, poly(maleic anhydride), silicone polymers, siloxane polymers, polyacrylonitrile, polyacrylamide, polychloroprene, polyvinylidene fluoride, polyvinyl pyrrolidone, polyepichlorohydrin, and blends or copolymers thereof.

20. The electrolyte of claim 19, wherein the molecular weight of the polymer is greater than 50,000 g/mol.

21. The electrolyte of claim 1, wherein the organic material comprises one or more polymerizable or crosslinkable members selected from the group consisting of vinyl esters, acrylates, methacrylates, styrenic monomers, vinyl-functionalized oligomers of polybutadiene, vinyl-functionalized oligomers of polysiloxanes, and mixtures thereof.

22. The electrolyte of claim 1, wherein the organic material comprises one or more crosslinkable members selected from the group consisting of diglycidyl ethers, epoxy resins, polyamines, and mixtures thereof.

23. The electrolyte of claim 1, wherein the organic material comprises one or more polymerizable monomers selected from the group consisting of vinyl esters, acrylates, methacrylates, and styrenic monomers.

24. The electrolyte of claim 1, wherein the organic material comprises one or more crosslinkable members selected from the group consisting of diglycidyl ethers, triglycidyl ethers, epoxy resins, and polyamines.

25. The electrolyte of claim 1, wherein the organic material comprises one or more crosslinkable oligomers selected from the group consisting of vinyl-functionalized oligomers of polybutadiene, polysiloxanes, and mixtures thereof.

26. The electrolyte of claim 1, where the organic material comprises an epoxy resin.

27. The electrolyte of claim 1, where the organic material comprises an epoxy polymer precursor selected from the group consisting of bisphenol A diglycidyl ether (DGEBA), poly(bisphenol A-co-epichlorohydrin) glycidyl end-capped polymers, diethylenetriamine (DETA) and derivatives thereof, tetraethylenepentamine and derivatives thereof, polyethyleneimine, carboxyl-terminated poly(butadiene-co-acrylonitrile), amine-terminated poly(butadiene-co-acrylonitrile), poly(propylene glycol) diglycidyl ether, poly(propylene glycol) bis(2-aminopropyl ether), and combinations thereof.

28. The electrolyte of claim 1, further comprising carboxyl-terminated poly(butadiene-co-acrylonitrile), amine-terminated poly(butadiene-co-acrylonitrile), poly(propylene glycol) diglycidyl ether, poly(propylene glycol) bis(2-aminopropyl ether), or combinations thereof.

29. The electrolyte of claim 1, where the organic material comprises
   (a) an epoxy polymer of bisphenol A diglycidyl ether (DGEBA), diethylenetriamine (DETA), and amine-terminated poly(butadiene-co-acrylonitrile);
   (b) an epoxy polymer of bisphenol A diglycidyl ether (DGEBA), diethylenetriamine; (c) (DETA), and poly (propylene glycol) bis(2-aminopropyl ether);
   (d) an epoxy polymer of bisphenol A diglycidyl ether and diethylenetriamine (DETA);
   (e) an epoxy polymer of bisphenol A diglycidyl ether (DGEBA) and poly(propylene glycol) bis(2-aminopropyl ether);
   (f) an epoxy polymer of bisphenol A diglycidyl ether and diethylenetriamine (DETA); or
   (g) an epoxy polymer of bisphenol A diglycidyl ether (DGEBA) and poly(propylene glycol) bis(2-aminopropyl ether).

30. The electrolyte of claim 29, wherein the poly(propylene glycol) bis(2-aminopropyl ether) has a molecular weight (g/mol) of about 100 to 50,000.

31. The electrolyte of claim 29, wherein the poly(propylene glycol) bis(2-aminopropyl ether) has a molecular weight (g/mol) of about 230 to 4000.

32. The electrolyte of claim 1, wherein the electrolyte has a fracture strength of 25 MPa to 75 MPa.

33. The electrolyte of claim 1, wherein the electrolyte has a total area specific resistance (ASR) of between 0 $\Omega\cdot cm^2$ and 200 $\Omega\cdot cm^2$ at 45° C.

34. The electrolyte of claim 1, wherein the electrolyte comprises an inorganic material and an organic material in a weight ratio of (inorganic material):(organic material) of at least 1:1 to 99:1.

35. The electrolyte of claim 1, wherein the electrolyte comprises an inorganic material and an organic material in a weight ratio of (inorganic material):(organic material) of at least 80:20 to 99:1.

36. The electrolyte of claim 1, wherein the volumetric ratio of inorganic material to organic material is greater than 1.

37. The electrolyte of claim 1, wherein the volumetric ratio of inorganic material to organic material is greater than 1, 2, 3, 4, 5, 6, 7, 8, 9, or 10.

38. The electrolyte of claim 1, wherein the necked particles are sintered necked particles.

39. The electrolyte of claim 1, wherein the necked particles are fuse necked particles.

40. A composition comprising the electrolyte of claim 1 and a gel electrolyte; wherein the composition of claim 1 directly contacts the gel electrolyte.

41. An electrochemical device comprising an electrolyte of claim 1.

42. An electrochemical cell comprising a positive electrode, a negative electrode, and an electrolyte layer, wherein the electrolyte layer comprises an electrolyte selected from any one of the electrolytes in claim 1.

43. An electrochemical cell comprising a positive electrode, a negative electrode, and a composite electrolyte layer;
   wherein the composite electrolyte layer is positioned between the positive electrode and negative electrode;
   wherein the composite electrolyte layer comprises a polymer and an inorganic solid state electrolyte;
   wherein a volumetric ratio of the inorganic solid state electrolyte to the polymer is greater than 1;
   wherein the positive electrode and the negative electrode directly contact the inorganic solid state electrolyte;
   and wherein the composite electrolyte is an electrolyte of claim 1.

44. The electrochemical cell of claim 43, wherein the composite electrolyte has a fracture strength of about 50 to 200 MPa.

45. The electrochemical cell of claim 43, wherein the inorganic solid state electrolyte is sintered or necked.

46. The electrochemical cell of claim 43, wherein the solid state electrolyte is a lithium-stuffed garnet electrolyte characterized by the formula $Li_yLa_3Zr_2O_{12}\cdot X\ Al_2O_3$, wherein $4\le y\le 10$ and $0<X\le 1$.

47. The electrochemical cell of claim 43, wherein the solid state electrolyte is a sulfide electrolyte characterized by the formula
   $Li_aSi_bSn_cP_dS_eO_f$, wherein $2\le a\le 8$, $b+c=1$, $0.5\le d\le 2.5$, $4\le e\le 12$, and $0<f\le 10$ ;
   $Li_gAs_hSn_jS_kO_l$, wherein $2\le g\le 6$, $0\le h\le 1$, $0\le j\le 1$, $2\le k\le 6$, and $0\le l\le 10$;
   $Li_mP_nS_pI_q$, wherein $2\le m\le 6$, $0\le n\le 1$, $0\le p\le 1$, $2\le q\le 6$; or
   a mixture of $(Li_2S):(P_2S_5)$ having a molar ratio from about 10:1 to about 6:4 and
   LiI, wherein the ratio of $[(Li_2S):(P_2S_5)]$:LiI is from 95:5 to 50:50;
   a mixture of LiI and $Al_2O_3$;
   $Li_3N$;
   LPS+X, wherein X is selected from Cl, I, or Br;
   $vLi_2S+wP_2S_5+yLiX$;
   $vLi_2S+wS_iS_2+yLiX$;
   $vL_{i2}S+wB_2S_3+yLiX$;
   a mixture of $LiBH_4$ and LiX wherein X is selected from Cl, I, or Br; or
   $vLiBH_4+wLiX+yLiNH_2$, wherein X is selected from Cl, I, or Br; and
   wherein coefficients v, w, and y are rational numbers from 0 to 1.

48. An electrolyte comprising an inorganic material and an organic material, wherein the inorganic material is embedded in the organic material, and the organic material is molded around, adsorbed to, bonded to, or entangled with the surface of the inorganic material or a particle thereof; and wherein the inorganic material comprises necked particles of inorganic material which form a percolation network for lithium ion conduction through the electrolyte; wherein the organic material has a lithium ion conductivity of less than $10^{-8}$ S/cm at 80° C.; wherein the inorganic material comprises a surface species which reacts with a functional group selected from an epoxide, a carboxylic acid, an ester, an amide, an amine, a sulfonic acid, a phosphate, a phosphine oxide, a phosphoric acid, an alkoxide, a nitrile, a thioether, thiol, and combinations thereof.

* * * * *